US009942833B2

(12) United States Patent
Bhasin et al.

(10) Patent No.: US 9,942,833 B2
(45) Date of Patent: Apr. 10, 2018

(54) MOBILE TERMINAL DEVICES, MOBILE BASEBAND MODEMS, AND METHODS OF DETECTING NETWORK ACCESS POINTS

(71) Applicant: Intel IP Corporation, Santa Clara, CA (US)

(72) Inventors: Sheetal Bhasin, Bangalore (IN); Bent Rysgaard, Aalborg (DK); Abhishek Raj, Bangalore (IN); Prasanna Prabhakaran, Bangalore (IN); Bernd Kemmer, Eichenau (DE); Ralf Zimmermann, Munich (DE); Karl-Heinz Rathgeb, Mering (DE); Henrik Dalsgaard, Storvorde (DK); Nirlesh Koshta, Bangalore (IN); Manish Gupta, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/864,870

(22) Filed: Sep. 25, 2015

(65) Prior Publication Data

US 2017/0094589 A1 Mar. 30, 2017

(51) Int. Cl.
*H04W 4/00* (2009.01)
*H04W 48/16* (2009.01)
(Continued)

(52) U.S. Cl.
CPC ........... *H04W 48/16* (2013.01); *H04W 48/18* (2013.01); *H04W 84/042* (2013.01); *H04W 88/06* (2013.01)

(58) Field of Classification Search
CPC ..... H04W 48/16; H04W 8/245; H04W 28/08; H04M 1/72516; H04B 1/3816
(Continued)

(56) References Cited

U.S. PATENT DOCUMENTS 9,497,789 B1 * 11/2016 Kosireddy .......... H04W 76/023
2007/0211669 A1   9/2007 Umatt et al.
(Continued)

FOREIGN PATENT DOCUMENTS

EP   2302971 A2   3/2011

OTHER PUBLICATIONS

European Search Report based on Application No. 16185139.9 (17 pages) dated Feb. 13, 2017 (Reference Purpose Only).
(Continued)

*Primary Examiner* — Danh Le
(74) *Attorney, Agent, or Firm* — Viering, Jentschura & Partner mbB

(57) ABSTRACT

A mobile terminal device includes a radio processing circuit and a baseband processing circuit adapted to interact with the radio processing circuit. The mobile terminal device is configured to detect network access points on one or more carrier channels using a first radio scan and a second radio scan by obtaining one or more scan results of the first radio scan, each of the scan results of the first radio scan corresponding to a carrier channel targeted for radio scan by the first radio scan, identifying one or more selected scan results from the one or more scan results of the first radio scan, each of the one or more selected scan results of the first radio scan corresponding to a carrier channel targeted for radio scan by the second radio scan, and selecting the one or more selected scan results of the first radio scan as scan results of the second radio scan, and performing mobile communications using the scan results of the first radio scan or the scan results of the second radio scan.

16 Claims, 14 Drawing Sheets

(51) Int. Cl.
*H04W 48/18* (2009.01)
*H04W 84/04* (2009.01)
*H04W 88/06* (2009.01)

(58) Field of Classification Search
USPC ............... 455/434, 418, 558, 550.1; 370/329
See application file for complete search history.

(56) References Cited

U.S. PATENT DOCUMENTS

| | | | |
|---|---|---|---|
| 2010/0136968 A1* | 6/2010 | Srivastava | H04W 48/16 455/434 |
| 2012/0264425 A1* | 10/2012 | Krishnamoorthy | H04W 48/16 455/434 |
| 2015/0034575 A1* | 2/2015 | Warpup | H02S 20/10 211/41.1 |
| 2015/0065132 A1 | 3/2015 | Ramkumar et al. | |
| 2015/0079985 A1* | 3/2015 | Vuchula | H04W 48/16 455/435.1 |
| 2015/0126187 A1 | 5/2015 | Ponukumati et al. | |
| 2015/0131625 A1* | 5/2015 | Son | H04L 1/00 370/336 |
| 2015/0264139 A1* | 9/2015 | Son | H04L 67/1002 709/208 |
| 2015/0264640 A1* | 9/2015 | Feng | H04W 8/183 455/558 |
| 2015/0296364 A1* | 10/2015 | Peruru | H04W 8/005 455/434 |
| 2015/0334575 A1* | 11/2015 | Joshi | H04W 72/0453 370/329 |

OTHER PUBLICATIONS

Partial European Search Report based on Application No. 16 18 5139.9 (7 Pages) dated Nov. 25, 2016 (Reference Purpose Only).

* cited by examiner

MOBILE TERMINAL DEVICES, MOBILE BASEBAND MODEMS, AND METHODS OF DETECTING NETWORK ACCESS POINTS

TECHNICAL FIELD

Various embodiments relate generally to mobile terminal devices, mobile baseband modems, and methods of detecting network access points.

BACKGROUND

Mobile terminals with multiple Subscriber Identity Modules (SIMs) have increased in popularity in recent years. Due to the desire to support simultaneous operation of multiple SIMs, such multi-SIM mobile terminals may have increased complexity.

Each SIM may support multiple Radio Access Technologies (RATs), and may be associated with the same, overlapping, or different Public Land Mobile Networks (PLMNs). Users may desire for each SIM to operate substantially independently of any other present SIM in a seamless manner. Accordingly, many multi-SIM designs may implement separate protocol stacks that run in parallel. In many cases, each protocol stack instance may operate independently from the other protocol stack instances.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
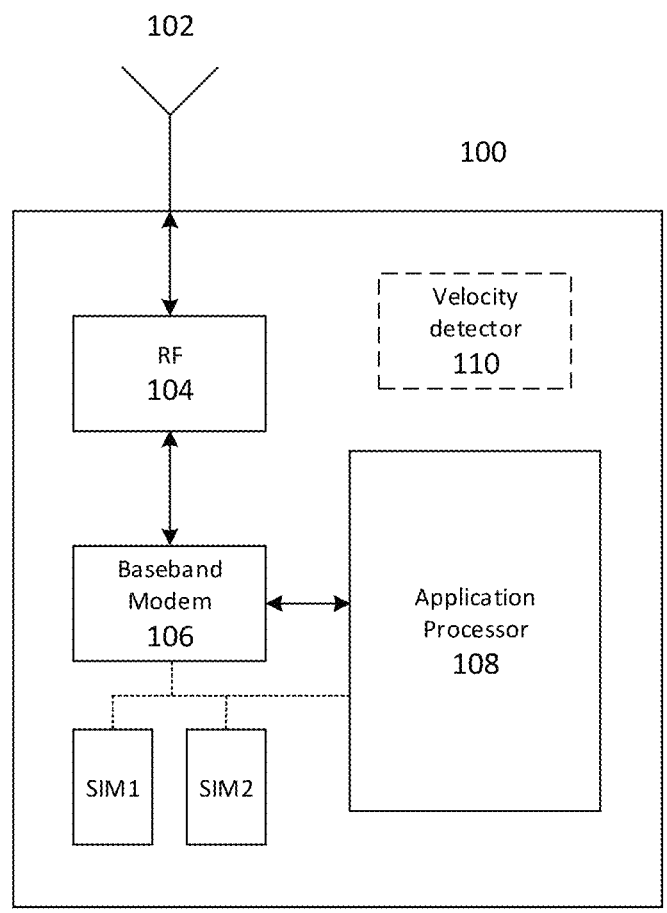
FIG. 1 shows an exemplary internal configuration of a mobile terminal.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

Similarly, a "processing circuit" (or equivalently "processing circuitry") is understood as referring to a circuit that performs processing on a signal, such as e.g. any circuit that performs processing on an electrical or optical signal. A processing circuit may thus refer to any analog or digital circuitry that alters a characteristic or property of an electrical or optical signal. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), microprocessor(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

The term "base station" used in reference to an access point of a mobile communication network may be understood as a macro base station, micro base station, Node B, evolved NodeBs (eNB), Home eNodeB, Remote Radio Head (RRHs), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wirelesss local area network), WiFi, UMTS (Universal Mobile Telecommunications System), GSM (Global System for Mobile Communications), Bluetooth, CDMA (Code Division Multiple Access), Wideband CDMA (W-CDMA), Time Division Synchronous Code Division Multiple Access (TD-SCDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both a wireless access component of a network (e.g. a radio access network (RAN) component) and a core component of a network (e.g. a core network component). As utilized herein, the term "idle mode" used in reference to a mobile terminal refers to a radio control state in which the mobile terminal is not allocated at least one dedicated communication channel of a mobile communication network. The term "connected mode" used in reference to a mobile terminal refers to a radio control state in which the mobile terminal is allocated at least one dedicated communication channel of a mobile communication network.

Mobile terminals having multiple Subscriber Identity Modules (SIMs) may feature designs intended to provide seamless parallel operation of multiple SIMs. Accordingly, such multi-SIM designs may involve multiple corresponding cellular protocol stacks running in parallel, i.e. multiple protocol stack instances corresponding to the same RAT. For example, a multi-SIM design having multiple SIMs that both have Long Term Evolution (LTE, as specified by the Third Generation Partnership Project (3GPP)) capability may involve two separate LTE protocol stacks running in parallel. Parallel protocol stack execution of $2^{nd}$ Generation (2G) and $3^{rd}$ Generation (3G) protocol stacks (e.g. Global System for Mobile Communications (GSM), Universal Mobile Telecommunications System (UMTS), etc.) may be similarly applied for multi-SIM designs including multiple 2G- and/or 3G-capable SIMs.

Regardless of Radio Access Technology (RAT), each cellular protocol stack ("or protocol stack instance") may need to perform detection and/or measurement of various access points in a mobile communication network, such as base stations including base transceiver stations (BTSs), nodeBs, evolved nodeBs (eNodeBs or eNBs), etc. Specific examples include Public Land Mobile Network (PLMN) scans and cell scans, which may both involve detection of proximate cells on one or more carrier channels over one or more bands.

In PLMN scans, a user equipment (UE) may need to scan for available mobile communication networks (i.e. PLMNs) in order to identify and register with one or more mobile communication networks. Exemplary scenarios warranting PLMN scans may include UE power-on sequences, exit from airplane mode, recover from Out of Coverage (OOC) scenarios in which one or more SIMs exit coverage area, recovery from Limited Service when one or more SIMs are in limited service areas, Home PLMN (HPLMN) or Higher Priority PLMN (HPPLMN) scans, and manual PLMN scan. In such scenarios, a UE may execute a PLMN scan in which the UE may scan over one or more available carrier channels in one or more available frequency bands in order to identify a supported PLMN, such as a home PLMN (HPLMN), HPPLMN, or registered PLMN (RPLMN). A UE may thus scan multiple available carrier channels over multiple bands in order to find the strongest cell on each carrier channel and read the PLMN identity (PLMN ID) from system information transmitted by the cell. As it is assumed that each cell at a given carrier channel has the same PLMN ID (i.e. is part of the same PLMN), a UE may identify the PLMN at each carrier channel by reading the PLMN ID from the strongest cell (although it is possible for any cell to be similarly utilized). In LTE, a UE may read the PLMN ID from System Information Block 1 (SIB1). Alternatively, a UE may read the PLMN ID from the Master Information Block (MIB) in UMTS and the System Information Type 2 message in GSM.

Cell scan (i.e. cell search) may similarly involve detection of proximate cells, and may be implemented as part of cell selection, cell reselection, and/or measurement reporting. During cell scan, a UE may scan carrier channels on one or more bands in order to detect proximate cells. A UE may perform identification of proximate cells (such e.g. as by determining cell identity (ID) in the form of Physical Cell Identity (PCI) for LTE, Primary Scrambling Code (PSC) for UMTS, or Cell ID (CID) for GSM), reading system information (System or Master Information Blocks for LTE/UMTS or System Information Type messages for GSM), and/or perform measurement of cells (including e.g. Received Signal Strength Indicator (RSSI), Received Signal Code Power (RSCP), Energy per Chip over Noise Power Density (Ec/No), Reference Signal Received Power (RSRP), and/or Reference Signal Received Quality (RSRQ)).

Accordingly, both PLMN (referring to any PLMN scan, including manual PLMN and HPPLMN scans) and cell scans (collectively referred to herein as "scans") may involve scanning one or more carrier channels on one or more bands in order to detect and identify proximate cells on each of the carrier channels. A PLMN scan may commonly involve searching entire bands by detecting cells and identifying PLMN IDs therewith on all carrier channels of the band (which may e.g. correspond to radio frequency channel numbers). Cell scans may commonly involve selecting carrier channels known to be associated with a particular PLMN and/or RAT in order to detect cells, e.g. during cell selection, reselection, or measurement reporting. The carrier channels may each correspond to a center frequency (in accordance with the allocated system bandwidth of each network) and may e.g. be identified according to radio frequency channel number, e.g. Enhanced Absolute Radio Frequency Number (EARFCN), UMTS Absolute Radio Frequency Channel Number (UARFCN), or Absolute Radio Frequency Channel Number (ARFCN). Each carrier channel targeted for scan may therefore be referred to as a "scan target", where the set of scan targets may be the collective set of scan targets (corresponding to one or more bands) targeted for PLMN or cell scan. Each PLMN and cell scan may produce a set of scan results detailing the results corresponding to each scan target, which may include PLMN ID, Location Area Code (LAC), cell ID, cell measurement information, timestamps, etc.

In a multi-SIM design, multiple instances of corresponding protocol stacks (i.e. associated with equivalent RATs) may need to perform such PLMN and cell scans. In certain cases, multiple protocol stack instances may need to perform scans on the same bands and/or carrier channels on the same band, i.e. may have common scan targets (utilized herein to refer to common carrier channels targeted for PLMN and/or cell scan on a specific RAT). Furthermore, multiple protocol stack instances may perform scans on common scan targets simultaneously or in quick succession. A particular scenario of interest is PLMN scan during a power-on sequence or after an OOC scenario, during which the protocol stack instance associated with each SIM may need to perform a PLMN scan in order to establish a connection with a respective PLMN. A further scenario of interest is during the aforementioned HPPLMN scans, in which multiple protocol stack instances may need to perform periodic HPPLMN scans while roaming. As mandated by 3GPP, HPPLMN scans may demand scan of all supported bands to detect PLMNs. Accordingly, scenarios may occur in which corresponding protocol stack instances may need to perform scans with common scan targets.

In a conventional multi-SIM design, the protocol stack instances associated with each SIM may simply perform independent scans on the assigned scan targets, which may overlap (occurring simultaneously in parallel) or occur in relatively close succession (occurring serially in close proximity in time). Accordingly, each protocol stack instance may separately search any common scan targets (i.e. carrier channels on a specific RAT), thereby leading to redundant scan of common search targets. For example, a first protocol stack instance associated with a first SIM may be assigned to perform a PLMN scan all carrier channels over multiple entire bands. A second protocol stack instance may also be assigned to perform a PLMN scan on the carrier channels of the same entire band. As the first and second protocol stack instance may operate in parallel in a substantially independent manner, both protocol stack instances may scan the same carrier channels of the same bands, i.e. may perform a scan on common scan targets.

Such redundant PLMN or cell scans of common scan targets by two or more separate corresponding protocol stack instances may be demonstrably inefficient. As scan of each common scan target is repeated, a UE may utilize increased battery power. Furthermore, scans may take longer to complete in scenarios where corresponding protocol stack instances are performing simultaneous parallel scans as such parallel scans may require apportionment of processing resources utilized for scans.

Recovery time may be of increased importance in the aforementioned reduced service recovery scenarios (power-on sequence, exit from airplane mode, OOC recovery, Limited Service recovery, HPLMN/HPPLMN scan, manual PLMN scan, etc.), as a UE may be forced to continue operation in reduced service conditions (including no service, OOC, Limited Service, roaming, etc.) until a successful scan is completed to allow recovery of service.

Accordingly, in an advantageous aspect of the disclosure, a multi-SIM design may share scan results between PLMN and/or cell scans occurring on multiple corresponding protocol stack instances (i.e. protocol stack instances corresponding to the same RAT). Alternatively, a multi-SIM design may share scan results between PLMN and/or cell scans occurring on multiple non-corresponding protocol stack instances, i.e. protocol stack instances corresponding to different RATs. Additionally, periodic HPPLMN scans may be synchronized in order to allow effective sharing of scan results between multiple protocol stack instances.

Such approaches may avoid redundant scans on common scan targets (i.e. same carrier channels on a specific RAT) between corresponding protocol stack instances, thereby improving both scan completion time and battery usage. This multi-SIM PLMN/cell scan optimization may be implemented with an arbitration component and a shared database in order to facilitate sharing of common scan results. Furthermore, scans by corresponding protocol stack instances may be synchronized, such as by implementing coordinated scans in either a serial or parallel configuration such that common scan targets are not repeatedly scanned by multiple corresponding protocol stack instances. Additionally, each protocol stack instance may store obtained scan results in the shared database for later access by other protocol stack instances. The shared database may be distributed based on protocol stack layer, such as by having one or more RAT-specific database sections (e.g. between the Access Strati of protocol stack instances corresponding to the same RAT) or may have database sections that are shared between common protocol stack layers of any RAT (e.g. between Layer is of differing RATs to share e.g. Received Signal Strength Indication (RSSI)). Alternatively, the shared database may be shared between different RATs, e.g. for scenarios in which frequency bands overlap, i.e. have shared sections, between different RATs. It is appreciated that such sharing of scan results may save an appreciable amount of time dependent on the common scan targets, such as whether any full or partial bands are targeted by multiple protocol stack instances.

Protocol stack instances may also perform a validity check on stored scan results during potential retrieval of such from the shared database. Corresponding protocol stack instances may thus share a wide range of information by sharing of scan results, including bands scanned, carrier channels scanned, PLMN ID, LAC, cell identification, timestamps, and measurement information.

FIG. 1 shows a block diagram illustrating an internal configuration of mobile terminal 100 according to an aspect of the disclosure. Mobile terminal 100 may be configured to facilitate sharing of scan results between PLMN and/or cell scans for each of SIM1 and SIM2. The PLMN and/or cell scans may be executed by baseband modem 106, which may be configured to execute multiple protocol stack instances in accordance with the radio access technology configurations of SIM1 and SIM2.

As illustrated in FIG. 1, mobile terminal 100 may include antenna 102, radio frequency (RF) transceiver 104, baseband modem 106, application processor 108, SIM1, and SIM2. Mobile terminal 100 may also optionally include velocity detector 110. As shown in in FIG. 1, the aforementioned components of mobile terminal 100 may be implemented as separate components. However, it is appreciated that the architecture of mobile terminal 100 depicted in FIG. 1 is for purposes of explanation, and accordingly one or more of the aforementioned components of UE 100 may be integrated into a single equivalent component or divided into two separate components with collective equivalence. It is understood that mobile terminal 100 may have one or more additional components, such as additional hardware, software, or firmware elements. For example, UE 100 may further include various additional components including hardware, firmware, processors, microprocessors, memory, and other specialty or generic hardware/processors/circuits, etc., in order to support a variety of additional operations. UE 100 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of UE 300, in particular, RF transceiver 104, baseband modem 106, application processor 108, and velocity detector 110 may be implemented in a number of different manners, such as by hardware, firmware, software executed on hardware (e.g. a processor), or any combination thereof. Various option include analog circuit(s), digital circuit(s), logic circuit(s), processor(s), microprocessor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in an aspect of the disclosure mobile terminal 100 may be a mobile terminal device having a radio processing circuit (RF transceiver 104) and a baseband processing circuit (baseband modem 106) adapted to interact with the radio processing circuit. Mobile terminal 100 may be configured to detect network access points on one or more carrier channels using a first radio scan and a second radio scan by obtaining one or more scan results of the first radio scan, each of the scan results of the first radio scan corresponding to a carrier channel targeted for radio scan by the first radio scan, identifying one or more selected scan results from the one or more scan results of the first radio scan, each of the one or more selected scan results of the first radio scan corresponding to a carrier channel targeted for radio scan by the second radio scan, and selecting the one or more selected scan results of the first radio scan as scan results of the second radio scan, and performing mobile communications using the scan results of the first radio scan or the scan results of the second radio scan.

As will be detailed, in another aspect of the disclosure, mobile terminal 100 may be a mobile terminal device having a radio processing circuit (RF transceiver 104) and a baseband processing circuit (baseband modem 106) adapted to interact with the radio processing circuit. Mobile terminal 100 may be configured to detect network access points on one or more carrier channels using a first radio scan and a second radio scan by identifying one or more common carrier channels using the first radio scan and the second radio scan, each of the one or more common carrier channels being a carrier channel targeted for scan by the first radio scan and the second radio scan, identifying a substitute radio scan using a first repetition period of the first radio scan and a second repetition period of the second radio scan, executing the substitute radio scan on the one or more common carrier channels to obtain one or more common scan results, and utilizing the one or more common scan results as scan results of the first radio scan or scan results of the second radio scan.

In an abridged overview of the operation of mobile terminal 100, mobile terminal 100 may be configured to receive and/or transmit wireless signals according to multiple different wireless access protocols or radio access technologies (RATs), including any one of, or any combination of, LTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), Time Division Synchronous Code Division Multiple Access (TD-SCDMA) etc. The RAT capabilities of mobile terminal 100 may be established base on the capabilities of SIM1 and SIM2. It is appreciated that separate components may be provided for each distinct type of compatible wireless signals, such as a dedicated LTE antenna, RF transceiver, and baseband modem for LTE reception and transmission and a dedicated WiFi antenna, RF transceiver, and baseband modem for WiFi reception and transmission. Alternatively, one or more components of mobile terminal 100 may be shared between different wireless access protocols, such as e.g. by sharing antenna 102 between multiple different wireless access protocols. In an exemplary aspect of disclosure, RF transceiver 104 and/or baseband modem 106 may be operate according to multiple mobile communication access protocols (i.e. "multi-mode"), thus may be configured to support one or more of LTE, UMTS, and/or GSM access protocols.

Further according to the abridged overview, RF transceiver 104 may receive radio frequency wireless signals via antenna 102, which may be implemented as e.g. a single antenna or an antenna array composed of multiple antennas. RF transceiver 104 may include various reception circuitry elements, which may be e.g. analog circuitry, configured to process externally received signals, such as mixing circuitry to convert externally received RF signals to baseband and/or intermediate frequencies. RF transceiver 104 may also include amplification circuitry to amplify externally received signals, such as power amplifiers (PAs) and/or Low Noise Amplifiers (LNAs), although it is appreciated that such components may also be implemented separately. RF transceiver 104 may additionally include various transmission circuitry elements configured to transmit internally received signals, such as e.g. baseband and/or intermediate frequency signals provided by baseband modem 106, which may include mixing circuitry to module internally received signals onto one or more radio frequency carrier waves and/or amplification circuitry to amplify internally received signals before transmission. RF transceiver 104 may provide such signals to antenna 102 for wireless transmission. Although not explicitly depicted in FIG. 1, RF transceiver 104 may be additionally be connected to application processor 108.

Figure 2:
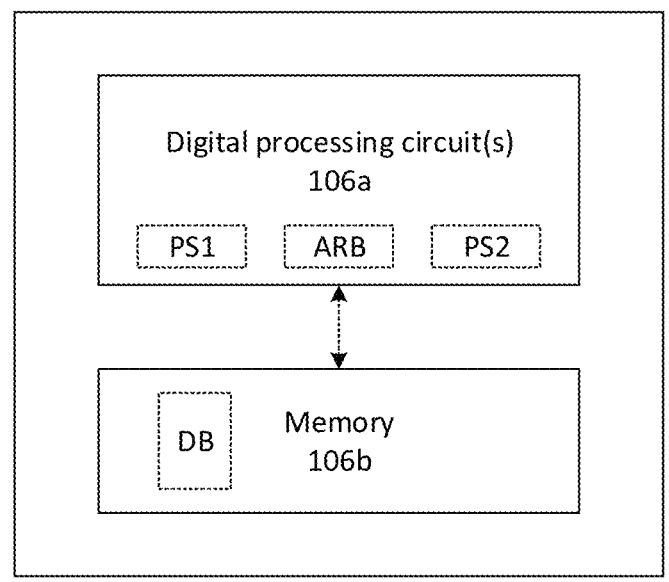
FIG. 2 shows an exemplary internal configuration of a baseband modem.

In accordance with an exemplary multi-SIM design, RF transceiver 104 may include sufficient circuitry to support two or more separate wireless channels, thereby allowing two or more separate protocol stack instances of baseband modem 106 (as will be detailed) to operate wireless connections with mobile communication networks FIG. 2 shows a block diagram illustrating an internal configuration of baseband modem 106 according to an aspect of the disclosure. Baseband modem 106 may include digital processing circuit(s) 106a (i.e. one or more digital processing circuits) and baseband memory 106b. Although not explicitly shown in FIG. 2, baseband modem 106 may contain one or more additional components, including one or more analog circuits.

Digital processing circuit(s) 106a may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 106a may include hardware, software, or a combination of hardware and software. Specifically, digital processing circuit(s) 106a of baseband modem 106 may include one or more logic circuits, processors, microprocessors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 106 may be detailed herein substantially in terms of functional operation in recognition that a person of skill in the art may readily appreciate the various possible structural realizations of baseband modem 106 using digital processing circuitry that will provide the desired functionality.

Baseband memory 106b may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. Baseband memory 106b may be configured to store software elements, which may be retrieved and executed using a processor component of digital processing circuitry 106a. Although depicted as a single component in FIG. 1, baseband memory 106b may be implemented as one or more separate components in baseband modem 106. Baseband memory 106b may also be partially or fully integrated with digital processing circuitry 106a.

Baseband modem 106 be configured to operate one or more protocol stacks, such as a GSM protocol stack, a UMTS protocol stack, an LTE protocol stack, etc. Baseband modem 106 may be "multimode" and may thus be configured to operate in accordance with multiple RATs by executing multiple protocol stack instances simultaneously. Digital processing circuitry 106a may therefore include a processor configured to execute program code in accordance with the protocol stacks of each associated RAT. Baseband memory 106a may be configured to store the aforementioned program code. Although not explicitly depicted in FIG. 1, baseband modem 106 may be configured to control one or more further components of UE 100, in particular one or more microphones and/or speakers, such as by providing output audio signals to one or more speakers and/or receiving input audio signals from one or more microphones.

The protocol stack(s) of baseband modem 106 may be configured to control operation of baseband modem 106, such as in order to transmit and receive mobile in accordance with the corresponding RAT(s).

As will be detailed, baseband modem 106 may have digital processing circuitry (digital processing circuit 106a) and a memory (baseband memory 106b). Baseband modem 106 may be configured to detect network access points on one or more carrier channels using a first radio scan and a second radio scan by obtaining one or more scan results of the first radio scan, each of the scan results of the first radio scan corresponding to a carrier channel targeted for radio scan by the first radio scan, identifying one or more selected scan results from the one or more scan results of the first radio scan, each of the one or more selected scan results of the first radio scan corresponding to a carrier channel targeted for radio scan by the second radio scan, and selecting the one or more selected scan results of the first radio scan as scan results of the second radio scan, and performing mobile communications using the scan results of the first radio scan or the scan results of the second radio scan.

Application processor 108 may be implemented as a Central Processing Unit (CPU), and may function as a controller for UE 100. Application processor 108 may be configured to execute various applications and/or programs of UE 100, such as e.g. applications corresponding to program code stored in a memory component of UE 100 (not explicitly shown in FIG. 1). Application processor 108 may also be configured to control one or more further components of UE 100, such as user input/output devices (display(s), keypad(s), touchscreen(s), speaker(s), external button(s), camera(s), microphone(s), etc.), peripheral devices, memory, power supply, external device interfaces, etc.

Although baseband modem 106 and application processor 108 are depicted separately in FIG. 1, it is appreciated that this illustration is not limiting in nature. Accordingly, it is understood that baseband modem 106 and application processor 108 may be implemented separately, implemented together (i.e. as an integrated unit), or partially implemented together.

Velocity detector 110 may be a component or integrated device of mobile terminal 100 configured to detect the velocity of mobile terminal 100. Alternatively velocity detector 110 may be a peripheral device. As will be detailed, velocity measurements by velocity detector 110 may be utilized to determine if previously stored PLMN and/or cell scan results are valid or have expired. Velocity detector 110 may be based on e.g. Global Positioning System (GPS) technology, and may be able to determine the speed (i.e. velocity) of mobile terminal 100 at any given time. Velocity measurements provided by velocity detector 110 may be raw instantaneous measurements or e.g. measurements based on previously obtained velocity measurements, such as an average. Velocity detector 110 may be directly connected to baseband modem 106 or indirectly connected to baseband modem 106 through application processor 108. Baseband modem 106 may therefore be configured to receive velocity measurements from velocity detector 110. Alternatively, baseband modem 106 may be configured to receive mobility information of mobile terminal 100 derived from the velocity measurements of velocity detector.

Mobile terminal 100 may also be adapted to support multiple SIMs, i.e. at least SIM1 and SIM2. Although the exemplary configuration of mobile terminal 100 shown in FIG. 1 includes two SIMs, it is appreciated that mobile terminal 100 may contain more than two SIMs. It is understood that the approaches detailed herein are considered demonstrative in nature, and thus may be readily applied in realizations having any number of SIMs.

As shown in FIG. 1, SIM1 and SIM2 may be connected to baseband modem 106 and/or application processor 108. Baseband modem 106 may thus be adapted to support operation of multiple-SIMs. Each of SIM1 and SIM2 may be configured to operate according to one or more radio access technologies, i.e. have distinct RAT capabilities. For example, SIM1 and SIM2 may both be configured to support a 2G RAT, 3G RAT, and 4G RAT, e.g. GSM, UMTS, and LTE, respectively. However, it is appreciated that the RAT capabilities of SIM1 and SIM2 may be different, i.e. the sets of radio access technologies supported by SIM1 and SIM2 may not be identical.

In an exemplary aspect of the disclosure, baseband modem 106 may be "multi-mode", i.e. capable of supporting multiple different radio access technologies. For example, baseband modem 106 may be configured to execute a protocol stack instance for each radio access technology. Baseband modem 106 may therefore be configured to execute e.g. a GSM protocol stack, a UMTS protocol stack, and an LTE protocol stack. In order to support operation of multiple SIMs, baseband modem 106 may be further configured to execute e.g. one or more GSM protocol stacks, one or more UMTS protocol stacks, one more LTE protocol stacks, etc., concurrently in parallel.

Each of SIM1 and SIM2 may have a Home PLMN (HPLMN), which may be a preferred PLMN to which each SIM may place the highest priority on establishing connection to, i.e. HPLMN1 and HPLMN2 corresponding to SIM1 and SIM2, respectively. Each of SIM1 and SIM2 may also have one or more Equivalent Home PLMNs (EHPLMN), which each SIM may also place high priority on establishing connection to in the event that the respective HPLMN is not available. Each of SIM1 and SIM2 may have a list ranking one or more PLMNs (i.e. by PLMN ID) according to priority, i.e. where any HPLMN or EHPLMN are ranked as having the highest priority.

Baseband modem 106 may therefore support connections to different PLMNs and/or RATs in accordance with the configuration of SIM1 and SIM2 by executing multiple protocol stack instances according to SIM1 and SIM2. For example, baseband modem 106 may allow mobile terminal 100 to establish two separate connections (corresponding to a receive-only connection in an idle mode or a transmit-receive connection in a connected mode) to two separate PLMNs by virtue of executing two protocol stack instances, i.e. a protocol stack instance for each of SIM1 and SIM2. Alternatively baseband modem 106 may allow mobile terminal 100 to establish two separate connections to the same PLMN by virtue of executing two protocol stack instances, i.e. a protocol stack instance for each of SIM1 and SIM2. The separate connections may be with the same RAT or different RATs.

Accordingly, baseband modem may execute a first protocol stack instance PS1 (as depicted in FIG. 2) in accordance with the RAT capability and PLMN priority of SIM1 and a second protocol stack instance PS2 (as depicted in FIG. 2) in accordance with the RAT capability and PLMN priority of SIM2. PS1 and PS2 may be executed as software by a processor of digital processing circuit(s) 106*a*, and accordingly may correspond to code stored in memory 106*b* which is retrieved and executed by digital processing circuit(s) 106*a*. Although the corresponding software for PS1 and PS2 may be stored in memory 106*b*, PS1 and PS2 are depicted in FIG. 2 as components within digital processing circuit(s) 106*a* to indicate that PS1 and PS2 are executed on digital processing circuit(s) 106*a*, e.g. on a processor. PS1 and PS2 may thus control certain operations of baseband modem 106 in accordance with the corresponding RAT of PS1 and PS2.

Baseband modem 106 may also include arbitrator ARB and shared scan result database DB. ARB may be implemented as e.g. software, and thus may be executed on digital processing circuit(s) 106*a* as program code stored in memory 106*b*, e.g. similarly to PS1 and PS2. Shared scan result database DB may be implemented as a memory component, and thus may be implemented as part of memory 106*b* as depicted in FIG. 2. Baseband modem 106 may utilize ARB and DB in order to synchronize PLMN and cell scans (including HPPLMN scans) between PS1 and PS2 (and any other protocol stack instances, such as protocol stack instances for other radio access technologies according to the RAT capabilities of SIM1 and SIM2) and to share scan results between PS1 and PS2.

During a power-on sequence or another of the reduced service recovery scenarios introduced above (including power-on sequence, exit from airplane mode, OOC recovery, Limited Service recovery, HPLMN/HPPLMN scan, manual PLMN scan, etc.), mobile terminal 100 may seek to establish service with one or more PLMNs in accordance with SIM1 and SIM2. Accordingly, PS1 and PS2 may attempt to recover from reduced service to establish full service.

PS1 and PS2 may thus perform PLMN scans in order to identify available PLMNs and subsequently register, camp, and/or connect to suitable PLMNs. PS1 and PS2 may therefore need to perform a PLMN scan on one or more carrier channels (corresponding to a channel, e.g. a channel frequency number) on one or more bands (e.g. 700 MHz band, 1900 MHz band, 850 MHz band, etc.). Each carrier channel on a specific RAT targeted for scan may thus be referred to as a scan target. The set of scan targets of each of PS1 and PS2 may depend on SIM1 and SIM2, respectively. Furthermore, the set of scan targets of each of PS1 and PS2 may depend on the capabilities of mobile terminal 100, such as the supported bands of baseband modem 106 (and by extension potentially RF transceiver 104 an antenna 102).

PS1 and PS2 may perform PLMN scans on a given carrier channel by detecting the strongest cell on the given carrier channel and reading the PLMN ID from system information messages, such as SIB1 (LTE), MIB (UMTS), or System Information Type 1 (GSM). As all cells at any given carrier channel are assumed to have the same PLMN ID (i.e. correspond to the same PLMN), PS1 and PS2 may identify the PLMN ID associated with each scan target, i.e. each searched carrier channel on a specific RAT. Upon detecting a suitable PLMN, e.g. an HPLMN or EHPLMN, PS1 and PS2 may proceed to register with the suitable PLMN and subsequently establish a connection (idle or connected mode) with the selected PLMN. If no HPLM or EHPLMN is detected for one of PS1 or PS2, PS1 or PS2 may select the next most suitable PLMN, such as according to a PLMN priority list provided by SIM1 and SIM2, to register with.

Such PLMN scans by PS1 and/or PS2 may involve fully or partially scanning all carrier channels in one or more given bands. In other words, PS1 and/or PS2 may perform PLMN scans on an entire band by scanning all carrier channels on a given band (also referred to herein as a "band scan"). PS1 and PS2 may perform such band scans on multiple bands in order to detect available PLMNs over a wide range of bands, i.e. over many carrier channels on multiple bands.

If one or both of PS1 and PS2 do not find an assigned HPLMN or EHPLMN of SIM1 or SIM2, i.e. HPLMN1 and HPLMN2, respectively, during an initial PLMN scan, PS1 and/or PS2 may need to register with and operate on a Visited PLMN (VPLMN) (e.g. roaming). In addition to HPLMNs and EHPLMNs, SIM1 and SIM2 may specify a list of PLMNs ranked according to priority, with the HPLMN and any EHPLMNs assigned higher priority than VPLMNs. Additionally, the VPLMNs may also be ranked, where SIM1 and SIM2 may rank certain VPLMNs as higher priority than other VPLMNs. If PS1 or PS2 is roaming and detects a PLMN having higher priority than the current PLMN, PS1 and PS2 may register and/or establish connection with the new higher priority PLMN. As will be detailed, PS1 and/or PS2 may perform periodic Higher Priority PLMN (HPPLMN) scans while roaming in order to search for available HPLMNs, EHPLMN, and other higher priority PLMNs than a current VPLMN. As will be detailed, such HPPLMN scans may be periodically triggered by a roaming protocol stack, i.e. PS1 and/or PS2, and may involve scanning all supported bands, i.e. scanning for available PLMNs on each carrier channels of every band supported by mobile terminal 100.

Additionally, PS1 and/or PS2 may initiate manual PLMN scans, which may be manually triggered by a user. PS1 and/or PS2 may then perform a PLMN scan in order to identify available PLMNs and e.g. provide the available PLMNs to a user for manual PLMN selection. Manual PLMN scans triggered by a user may initiate scans for both PS1 and PS2, which may then occur at substantially the same time, e.g. partially or fully overlapping in parallel.

Each of PS1 and PS2 may have a set of scan targets for a PLMN scan, i.e. a first set of scan targets specified by SIM1 and a second set of scan targets specified by SIM2. Each scan target may be a carrier channel on a specific RAT which PS1 or PS2 desires to search, i.e. scan for available PLMNs. PS1 and PS2 may scan each scan target to determine if a PLMN is available on each scan target (i.e. if there are active cells of the specific RAT on the carrier channel of the scan target) by detecting the strongest cell at the carrier channel and reading the PLMN ID from the corresponding system information message. As previously detailed, PS1 and/or PS2 may perform PLMNs scans on one or more entire bands, i.e. where the first and/or second set of scan targets contain all carrier channels on the one or more bands.

In addition to PLMN scans, PS1 and/or PS2 may also perform cell scans, which may be a part of cell selection, cell reselection, measurement reporting, and/or handover, and may be triggered accordingly. Similarly to PLMN scans, PS1 and/or PS2 may have a first and second set of scan targets, respectively, to search in order to detect cells. PS1 and/or PS2 may search for and identify one or more cells at the carrier channels specified as the scan targets. Although other variations may exist, such sell scans by PS1 and/or PS2 may involve scanning specific carrier channels for cells, such as carrier channels corresponding to a particular RAT and/or PLMN.

As previously indicated, PS1 and PS2 may operate substantially in parallel without interruption from one another. PS1 and PS2 may therefore perform PLMN and/or cell scans independently from one another.

However, regardless of HPLMN and/or EHPLMNs of SIM1 and SIM2, PS1 and PS2 may perform PLMN and/or cell scans on common scan targets, i.e. may search one or more of the same carrier channels. For example, PS1 and PS2 may even perform band scans on the same bands during PLMN and/or cell scan, which may involve repeated scan of many of the same carrier channels.

In certain scenarios, PS1 and PS2 may perform scans on common scan targets simultaneously or in quick succession. For example, both PS1 and PS2 may perform PLMN scans at substantially the same time during recovery from reduced service scenarios in which both PS1 and PS2 lost full service, such as during a power-up or OOC recovery. PS1 and PS2 may therefore control baseband modem 106 to perform multiple parallel PLMN scans simultaneously.

Baseband modem 106 may therefore need to allocate processing resources (i.e. of digital processing circuit(s) 106a) to both the PS1 PLMN scan and the PS2 PLMN scan. Accordingly, scan completion time of the PS1 PLMN scan and the PS2 PLMN scan may be increased compared to execution of a single PLMN scan. Power usage by baseband modem 106 may additionally be increased, thereby enacting a high power penalty on mobile terminal 100.

As the PS1 PLMN scan and the PS2 PLMN scan may have common scan targets, the carrier channels of the common scan targets may as a result be searched twice, e.g. a first time by the PS1 PLMN scan and a second time the PS2 PLMN scan. Assuming the scans are performed substantially concurrently or in relatively proximate succession, the results of the PS1 PLMN scan and the PS2 PLMN scan (i.e. the detected PLMN IDs in addition to other scan results, as will be detailed) may be substantially the same. Accordingly, repeated search on common scan targets by both the PS1 PLMN scan and the PS2 PLMN scan may be largely unnecessary. Such redundant searches of common scan targets may therefore increase recovery time (by extending completion time of PLMN scans) and battery power usage.

Accordingly, mobile terminal 100 may share scan results between protocol stack instances PS1 and PS2. It is noted that PS1 and PS2 may be instances of the same RAT or may be instances of different RATs, such as in scenario in which different RATs utilize overlapping frequency bands (as will be later detailed). Mobile terminal 100 may additionally synchronize PS1 scans and PS2 scans to facilitate effective scan result sharing between PS1 and PS2, such as by using serialized or parallelized synchronization. Coordination of PS1 and PS2 scans may additionally be applied for HPPLMN scans, during which HPPLMN scan timers may be adjusted to align HPPLMN scans by PS1 and PS2 to occur simultaneously. Similarly, manual PLMN scans for initiated for both PS1 and PS2 by e.g. a user may be aligned. The resulting multi-SIM scan optimization may avoid redundant search of common scan targets, and may be implemented at baseband modem 106, which as previously detailed may execute PS1 and PS2 corresponding to SIM1 and SIM2 as software on e.g. a processor of digital processing circuitry 106a by retrieving and executing program code corresponding to PS1 and PS2 from memory 106b.

As previously detailed, various scenarios may occur that warrant such scans. For example, PLMN scans may be initiated by PS1 and PS2 at baseband modem 106 in the event of power-on sequence of mobile terminal 100, OOC recovery, Limited Service recovery, background HPLMN/EHPLMN/HPPLMN scan when roaming, or manual PLMN scans. It is appreciated that such scenarios may conventionally warrant parallel PS1 PLMN scans and PS2 PLMN scans. In such a scenario, baseband modem 106 may instead ensure that scan targets are only searched one time by PS1 and PS2 and may subsequently share common scan results between the PS1 PLMN scan and the PS2 PLMN scan.

In addition to PLMN scans, mobile terminal 100 may share cell scan results between PS1 and PS2. For example, PS1 and PS2 may perform cell scans as part of cell selection, cell reselection, measurement reporting, and handover. Mobile terminal 100 may synchronize the PS1 cell scan and the PS2 cell scan and share common scan results (if any) between PS1 and PS2 if the PS1 cell scan and the PS2 cell scan occur concurrently. If the PS1 cell scan and the PS2 cell scan do not occur concurrently, mobile terminal 100 may store cell scan results with a validity timer, which the later occurring PS cell scan may utilize for scan results during the validity time as opposed to performing a second scan on common scan targets (if any). Retrieval of scan results may provide beneficial reductions in scan completion time, as PS1 and PS2 may be able to retrieve valid scan results from a shared database as opposed to performing a fresh scan on the corresponding scan targets.

Accordingly, mobile terminal 100 may share scan results for common scan targets between PS1 and PS2 PLMN and/or cell scans. As will be detailed, baseband modem 106 may perform arbitration in order to facilitate scan result sharing and synchronization between PS1 scans and PS2 scans, such as by utilizing arbitrator ARB and shared scan result database DB.

For example, baseband modem 106 may detect (such as with an arbitrator ARB, as will be detailed) that PS1 and PS2 both wish to initiate PLMN scans, such as by monitoring for scan indications in baseband modem 106, receiving notification from PS1 and/or PS2 that a scan is desired, or evaluating HPPLMN scan timers. Baseband modem 106 may therefore analyze the first set of scan targets of PS1 and the second set of scan targets of PS2 in order to identify a set of common scan targets. If common scan targets exist, baseband modem 106 may synchronize the PS1 and PS2 scans (e.g. in series or parallel) to ensure that common scan targets are only scanned by one of PS1 and PS2, and that obtained common scan results are subsequently available to both PS1 and PS2 (i.e. shared). If no common scan targets exist, i.e. if there are no carrier channels present in both the first set of scan targets of PS1 and the second set of scan targets of PS2, baseband modem 106 may forego synchronization of the PS1 and PS2 scan. PS1 and PS2 may then perform the PLMN scans independently while utilizing any available stored search results in the shared database to complete the respective PLMN scans.

Figure 3:
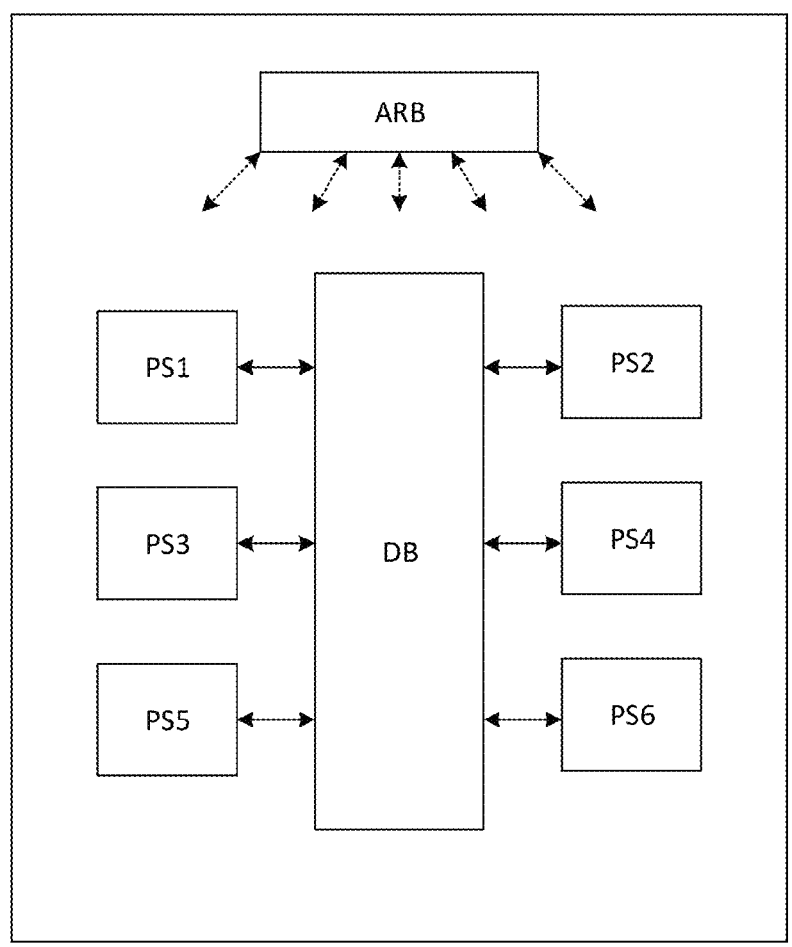
FIG. 3 shows an exemplary configuration of protocol stack instances of a baseband modem.

Accordingly, the multi-SIM scan optimization procedure of baseband modem 106 may be functionally implemented as depicted in FIG. 3. As previously indicated, baseband modem 106 may include protocol stack instances PS1 and PS2 (corresponding to the same or different RAT(s)) and arbitrator ARB, which may be executed by digital processing circuit(s) 106a (e.g. on a processor) and stored as program code in memory 106b. Baseband modem 106b may also include shared scan result database DB, which may be implemented as part of memory 106b. However, it is appreciated that memory 106b may be composed of separate memory components, such as a separate memory component to store program code for each of PS1, PS2, and ARB in addition to separate memory component storing data for DB.

Additionally, baseband modem 106a may contain protocol stack instances PS3-PS6, which may correspond to protocol stack instances for additional radio access technologies according to the RAT capabilities of SIM1 (protocol stack instances PS1, PS3, and PS5) and SIM2 (protocol stack instances PS2, PS4, and PS6). For example, SIM1 and SIM2 may each be configured to operate according to a 2G, 3G, and 4G radio access technology. Accordingly, PS1 and PS2 may correspond to LTE protocol stack instances, PS3 and PS4 may correspond to UMTS protocol stack instances, and PS5 and PS6 may correspond to GSM protocol stack instances. While the following description may largely focus on PLMN and cell scan optimization for PS1 and PS2, it is appreciated that the approaches detailed herein may be similarly applied to any arbitrary protocol stack instance pair, including both protocol stack instances corresponding to the same radio access technology or different radio access technologies. Accordingly, references to PS1 or PS2 may be interpreted as a first arbitrary protocol stack instance corresponding to a first SIM and a second arbitrary protocol stack instance corresponding to a second SIM, respectively. Furthermore, while FIG. 3 illustrates shared scan result database DB as being shared between PS1-PS6, it is appreciated that DB may be implemented as multiple separate shared scan result databases that each share scan results with protocol stack instances, including protocol stack instances corresponding to the same radio access technology or protocol stack instances corresponding to different radio access technologies. For example, shared scan result database DB as shown in FIG. 3 may be split into first shared scan result database DB1 for PS1 and PS2, second shared scan result database DB2 for PS3 and PS4, and third shared scan result database DB3 for PS5 and PS6. It is appreciated that further protocol stack instances, i.e. PS7, PS8, etc., may additionally be provided and similarly incorporated according to the corresponding radio access technology of each protocol stack instance. Alternatively, as will be later detailed regarding protocol stack instances corresponding to different radio access technologies, DB may be shared between all available protocol stack instances, including both protocol stack instances corresponding to the same radio access technology and/or protocol stack instances corresponding to different radio access technologies. The accessibility of DB by certain protocol stack instances is thus appreciated to not be limited.

Arbitrator ARB may execute the control of synchronization and scan result sharing between protocol stack instances (corresponding to the same radio access technology or different radio access technologies). ARB may therefore be connected to substantially all the components depicted in 106 in order to control operation thereof.

Figure 4:
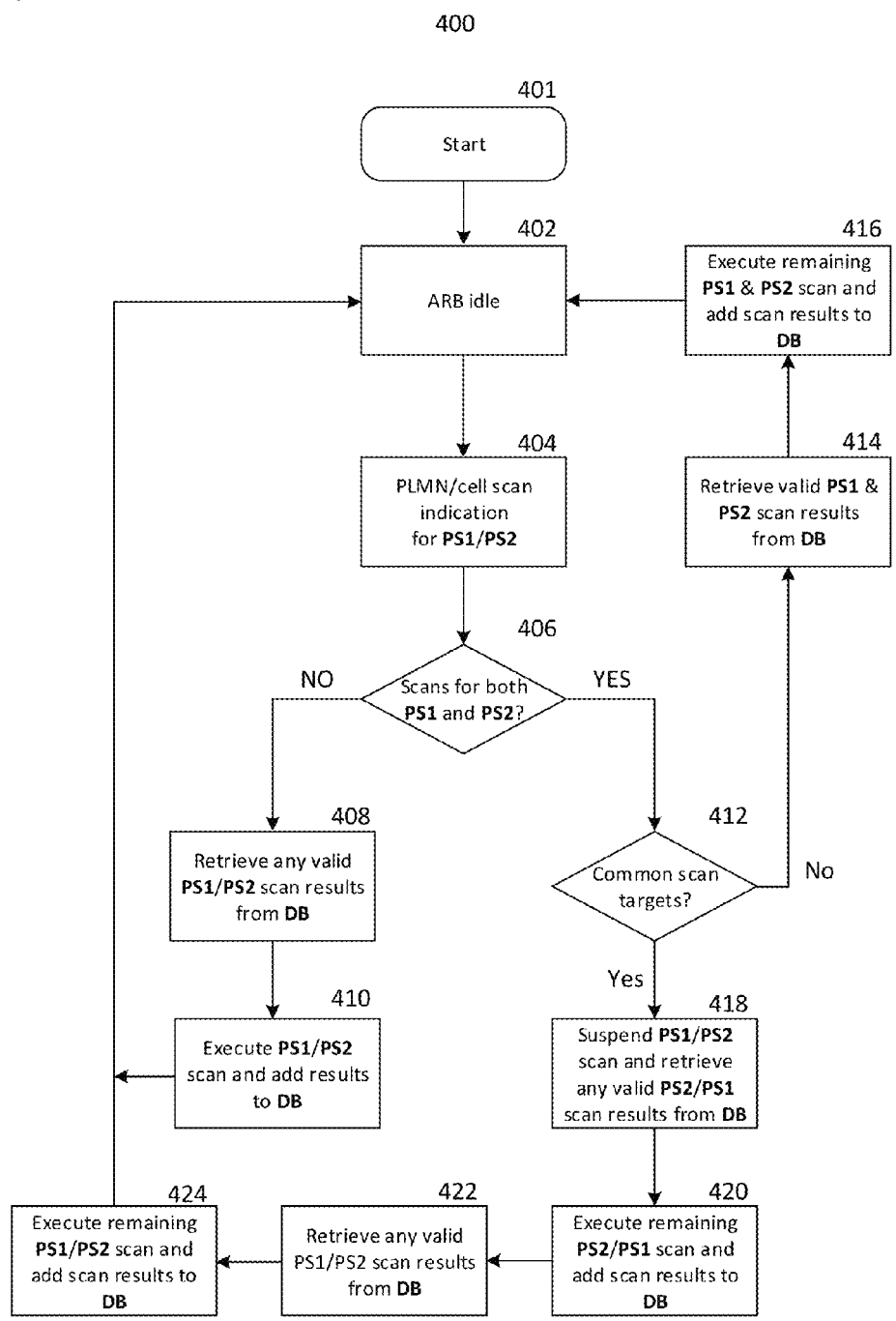
FIG. 4 shows a flow chart illustrating a serialized multi-SIM scan procedure.

FIG. 4 shows a flow chart illustrating a multi-SIM optimized PLMN and/or cell scan procedure 400 utilizing serialized coordination of conflicting common scans. The multi-SIM optimized PLMN and/or cell scan procedure 400 may incorporate various components of baseband modem 106, including PS1, PS2, ARB, and DB. It is appreciated that reference to PS1 and PS2 may refer to any arbitrary pair of protocol stack instances, which may correspond to either the same or different radio access technologies. It is appreciated that reference to PS1 and PS2 may refer to an arbitrary pair of protocol stack instances out of any two or more protocol stack instances. Furthermore, it appreciated that PS1 and PS2 may be any two arbitrary protocol stack instances in e.g. a multi-SIM design with any number of SIMs and corresponding protocol stack instances, such as two SIMs, three SIMs, four SIMs, etc. corresponding to two protocol stack instances, three protocol stack instances, four protocol stack instances, etc. Depending on the RAT capabilities of SIM1 and SIM2, arbitrator ARB may similarly perform the multi-SIM optimized PLMN and/or cell scan procedure 400 on any two (or more) protocol instances.

Method 400 may start in 401. ARB be in an idle state in 402. In 404, ARB may detect or receive an indication, from e.g. one of PS1 or PS2, indicating intent to perform a PLMN or cell scan at PS1 or PS2, which may include an HPPLMN scan according to a respective HPPLMN scan timer. In 406, ARB may determine if both PS1 and PS2 (or e.g. also a third protocol stack instance PS3) have indicated intent to perform a PLMN/cell scan. If both PS1 and PS2 have indicated intent to perform a PLMN/cell scan, ARB may proceed to 412 to analyze the first set of scan targets (i.e. center frequencies targeted for search) of the PS1 scan and the second set of scan targets of the PS2 scan. ARB may determine if the first set of scan targets and the second set of scan targets contain any common scan targets, i.e. center frequencies targeted for search in both the first set of scan targets and the second set of scan targets.

If ARB fails to identify any common scan targets between the first set of scan targets and the second set of scan targets (i.e. the first set of scan targets and the second set of scan targets are mutually exclusive), ARB may decide to not perform any synchronization of the PS1 and PS2 scans. ARB may therefore allow the PS1 and PS2 scans to continue independently, such as by retrieving any applicable valid scan results from shared scan result DB in 414 (as will be further detailed) and executing the PS1 and PS2 scans on the remaining scan targets of the first and second sets of scan targets in 416.

If ARB identifies common scan targets in 412, ARB may initiate arbitration of the PS1 scan and PS2 scan in 418 by synchronizing the PS1 and PS2 scans through serialization. For example, ARB may suspend one of the PS1 scan or the PS2 scan and initiate the other of the PS1 scan or the PS2 scan (i.e. suspend the PS1/PS2 scan and proceed with the PS2/PS1 scan). For example, ARB may simply select to suspend the PS scan that occurred most recently in time, or may e.g. pick one of the PS1 scan and PS2 scan to suspend at random. Furthermore, one of the PS1 or PS2 scan may have previously initiated, i.e. may already be executing. Accordingly, ARB may delay the succeeding PS1 or PS2 scan until the preceding PS1 or PS2 scan has completed.

In an exemplary scenario, ARB may select to suspend the PS1 scan and allow the PS2 scan to continue. ARB may then access shared scan result database DB to determine if any of the second set of scan targets for the PS2 scan correspond to a scan result stored in database DB. For example, one of PS1 or PS2 may have previously performed a PLMN or cell scan in which a first carrier channel of the second set of scan targets was searched, where the first carrier channel additionally corresponds to one of the second set of scan targets.

In an exemplary scenario, PS1 may have previously performed a PLMN/cell scan which searched the first carrier channel. Accordingly, PS1 may have obtained scan results for the first carrier channel (such as e.g. one or more of PLMN ID, LAC, cell information, timestamps, and measurement results) and subsequently stored the scan results in shared scan result database DB along with retrieval information specifying that the scan results correspond to the first carrier channel (also corresponding to a specific band). In order to ensure that scan results stored in DB are valid before subsequent repeated use, PS1 may have recorded a timestamp corresponding to a point in time which the first carrier channel was searched. ARB may therefore determine whether the scan results for the first carrier channel are valid based on the timestamp.

If ARB determines that the scan results for the first carrier channel are still valid, ARB may supply the scan results for the first carrier channel to PS2. Alternatively, PS2 may directly access DB to retrieve the scan results, or may e.g. retrieve or be supplied with the scan results directly from PS1 (or e.g. vice versa in a counterpart scenario where PS2 occurs before PS1). Accordingly, PS2 may no longer need to perform a new search on the first carrier channel and may instead utilize the scan results for the first carrier channel retrieved from DB.

Alternatively, ARB or another controller component may periodically evaluate the scan results in DB in order to determine if any scan results have expired, i.e. are no longer valid. ARB may then simply remove or delete expired scan results in order to maintain DB. Assuming such a validity check on DB is performed with sufficient frequency, ARB may simply identify and retrieve scan results in DB corresponding to scan targets for an active scan without performing a validity check before every retrieval.

The "writer_PS" for a given scan result (i.e. the protocol stack instance that enters a given scan result into DB) may be responsible for assigning a validity time to the given scan result, such as by recording a timestamp corresponding to the entry time along with the given scan result in DB. Alternatively, the writer_PS may instead calculate and enter a validity time relative to the entry time indicating how long the given scan result will remain valid.

Both validity time recording and validity evaluations may be performed based on device speed, i.e. the current or previous velocity/velocities of mobile terminal 100. For example, baseband modem 106 may be configured to receive velocity measurements for mobile terminal 100 from velocity detector 110 (e.g. directly or e.g. indirectly via application processor 108). Baseband modem 106 may then apply the received velocity measurements in order to assign validity times to scan results stored in DB and/or perform validity evaluations.

For example, ARB (or PS1/PS2 depending on the specific read/write access rules) may identify that DB contains a desired scan result, which may be associated with a timestamp (or may be e.g. stored as a set of scan results including a timestamp corresponding to a single scan target). ARB may then determine the velocity of mobile terminal 100, i.e. to determine whether mobile terminal 100 has is e.g. moving or stationary or e.g. moving quickly, moving slowly, stationary, etc. Based on the velocity of mobile terminal 100, ARB may determine that it is likely or unlikely that mobile terminal is sufficiently close to the previous location of mobile terminal during which the scan result was obtained. ARB may rely on instantaneous velocity measurements (i.e. only indicating the current speed of mobile terminal 100), average velocity measurements (i.e. an average velocity measurement over a set period of time), or a set of historical velocity measurements (i.e. a plurality of velocity measurements indicating the velocity of mobile terminal 100 at multiple previous times).

If velocity detector 110 indicates a high velocity for mobile terminal 100 (or e.g. a sequence of high velocity measurements in the case of historical velocity measurements), ARB may utilize a reduced validity time, i.e. scan results in DB may only be valid for a short period of time following entry into DB. Alternatively, velocity detector 110 indicates a low velocity for mobile terminal 100 (or e.g. a sequence of low velocity measurements in the case of historical velocity measurements), ARB may utilize an increased validity time, i.e. scan results in DB may be valid for a slightly longer period of time following entry into DB.

Alternatively, baseband modem 106 may utilize a default validity time. Accordingly, all scan results may simply be valid for a set period of time following entry into DB.

Alternatively, baseband modem 106 may evaluate the validity time during retrieval based on the requisite accuracy of the scan being performed. For example, during scan result retrieval of e.g. measurement results from DB for a cell scan at PS1/PS2, ARB may only identify measurement results as valid if a short amount of time has passed since the scan results were entered into DB. If a PLMN scan is being performed, ARB may utilize a longer validity time, as it is unlikely that mobile terminal 100 has moved far enough to a location where a carrier channel is assigned to a different PLMN. Such an approach may additionally be combined with velocity measurements to obtain more accurate validity evaluations.

There may be a set of read/write access rules for shared scan result database DB, such as defining the permitted actions of the writer_PS (i.e. the protocol stack instance that enters a given scan result into DB) and any "reader_PS" (i.e. any other protocol stack instance(s) that are able to access DB). Assuming no scan results are stored in DB for a given scan target (i.e. specific carrier channel), a protocol stack instance that has obtained a set of scan results corresponding to the scan target may assume the writer_PS role and write the scan results (such as e.g. one or more of PLMN ID, LAC, cell information, timestamps, and measurement results) into DB. The writer_PS may store the set of scan results in DB according to scan target (i.e. carrier channel, such as e.g. by radio frequency channel number) to allow a subsequent writer_PS to locate and potentially retrieve sets of scan results according to scan target. Each set of scan results (corresponding to a single scan target) may thus be assigned a writer_PS based on the protocol stack instance that entered the set of scan results into DB, where all other protocol stack instances assume a reader_PS role.

Accordingly, valid scan results in DB may only be cleared or updated by the writer_PS, while any reader_PS may only retrieve valid scan results. However, if a reader_PS identifies a desired set of scan results (corresponding to the set of scan targets of the reader_PS) in DB that has expired, i.e. is no longer valid, the reader_PS may then assume the writer_PS role to obtain an updated set of scan results for the corresponding scan target (by e.g. performing a fresh scan) and store the new set of scan results for the corresponding scan target in DB.

Accordingly, the scan results in DB may be maintained on a per-carrier channel basis (i.e. per-scan target), where each set of scan results (corresponding to a common scan target) is assigned a writer_PS and one or more reader_PS (depending on how many other protocol stack instances correspond to the same RAT as writer_PS).

Alternatively, the scan results in DB may be maintained on a per-band basis (i.e. per band of carrier channels), which may offer reduced complexity over assigning a writer_PS to each set of scan results. As scans (in particular PLMN scans) may commonly span entire bands (i.e. all carrier channels on a given band), a protocol stack instance entering scan results into DB may enter in sets of scan results corresponding to all carrier channels on a given band. Accordingly, the writing protocol stack may assume the writer_PS role for the entire band. The writer_PS may maintain the writer_PS role for the given as long as the scan results for the given band remain valid. A reader_PS that accesses scan results in DB for a specific band and finds expired scan results may then clear the band and assume the reader_PS role for band.

In some cases, the writer_PS may scan only a partial band, i.e. a subset of the carrier channels in a given band. Such a scenario may occur when a protocol stack instance assumes the writer_PS role for a given band in DB and begins a scan on the carrier channel of the given band. However, after obtaining and evaluating scan results for a partial section of the band, the writer_PS may determine that the scan results are satisfactory, e.g. in a case where the writer_PS detects the HPLMN on a carrier channel of the band. The writer_PS may then halt the scan on the given band in order to register and initiate a connection with the HPLMN. Accordingly, only partial scan results for the given band may be stored in DB.

A reader_PS may then attempt to access scan results for the given band from DB, and may seek scan results for scan targets (carrier channels) that were not entered by writer_PS due to the partial scan. Accordingly, the reader_PS may need to continue the scan to obtain the absent scan results (i.e. sets of scan results for scan targets that are not stored in DB). In alternate aspects of the disclosure, the reader_PS may either retain a reader_PS role (i.e. not assume the writer_PS role for the band) or may assume the writer_PS role. For example, the reader_PS may write the new scan results corresponding to the absent scan results into DB but remain a reader_PS, thereby allowing the writer_PS to maintain write control of the band in DB. Alternatively, reader_PS may assume the writer_PS role for the band in DB upon entering in the new scan results.

ARB may be further involved in the read/write access rules for DB. For example, read/write operations may be performed through ARB. In this case, protocol stack instances may send read/write requests to ARB, which may then process the read/write requests by directly interacting with DB to read scan results from DB to provide to a requesting protocol stack instance and/or write scan results to DB from a providing protocol stack instance. DB may in this case be responsible for maintaining the writer_PS/reader_PS for the scan results stored in DB.

Additionally, the read/write access by one or more protocol stack instances may be done in real-time, i.e. writing/ reading scan results upon availability/need, or intermittently, i.e. reading/writing multiple scan results at certain intervals.

It is appreciated that stored scan results in shared scan result database DB may be maintained on a per-RAT basis. In other words, the scan results in DB may be stored according to RAT, where e.g. LTE protocol stack instances (e.g. PS1 and PS2 in the example of FIG. 3) may interact with an LTE scan result section of DB, UMTS protocol stack instances (e.g. PS3 and PS4 in the example of FIG. 3) may interact with a UMTS scan result section of DB, GSM protocol stack instances (e.g. PS5 and PS6 in the example of FIG. 3) may interact with a GSM scan result section of DB, etc. Shared scan result database DB may therefore be split into multiple RAT-specific databases or have multiple RAT-specific database sections. Alternatively, shared scan result database DB may only be utilized for a single RAT, and thus may only offer multi-SIM scan optimization for a single radio access technology. Such is further detailed regarding FIG. 5.

Returning to the exemplary scenario introduced above in which ARB suspends PS1 and triggers PS2, ARB may retrieve (or allow PS2 to retrieve) in 418 any valid stored scan results corresponding to the second set of scan targets from DB, which may be e.g. according to the read/write access rules for DB detailed above. 418 may include retrieval of valid scan results of any common scan targets by PS2 from DB, which may be facilitated by ARB or done directly by PS2, which may then be utilized by PS2 as scan results.

ARB may then trigger PS2, thus allowing PS2 to execute the PS2 scan in 420 on the remaining scan targets (i.e. any scan targets of the second set of scan targets that do not have corresponding valid scan results stored in DB). PS2 may then write the resulting sets of scan results (such as e.g. one or more of PLMN ID, LAC, cell information, timestamps, and measurement results) for the remaining scan targets into DB e.g. according to the read/write access rules for DB detailed above.

After completing the PS2 scan and entering any new scan results into DB, ARB may retrieve (or allow PS1 to retrieve) any valid stored scan results corresponding to the first set of scan targets from DB in 422. 422 may include retrieval of valid scan results of any common scan targets by PS1 from DB, which may be facilitated by ARB or done directly by PS1. The common scan results have been entered into DB by PS2 at e.g. 420 or may have been entered into DB at an earlier time.

ARB may then trigger PS1, thus allowing PS1 to execute the PS1 scan in 424 on any remaining scan targets (i.e. any scan targets of the second set of scan targets that do not have corresponding valid scan results stored in DB). PS1 may then write the resulting sets of scan results (such as e.g. one or more of PLMN ID, LAC, cell information, timestamps, and measurement results) for the remaining scan targets into DB e.g. according to the read/write access rules for DB detailed above.

As ARB has previously triggered and executed the PS2 scan, all common scan targets identified in 412 may have been previously obtained and stored in DB by PS2 (or may have been previously stored in DB by an unrelated prior scan (e.g. by PS1, PS2, or another protocol stack instance) and retrieved by PS2 as a valid scan result). Accordingly, upon execution PS1 may simply obtain the stored scan results from DB for the common scan targets, thereby avoiding the need to perform a fresh scan. Such retrieval may save an appreciable amount of time dependent on the number of common scan targets, which may encompass partial or entire frequency bands.

Alternatively, as ARB may have previously identified common scan targets in 412, ARB may pre-emptively prepare scan results for the common scan targets for quicker access by PS1 in 424. For example, ARB may store any common scan results obtained by PS2 from a performance of a fresh scan or retrieval from DB in 420 to a temporary scan result buffer, which may offer faster retrieval time than retrieval from DB. PS1 may therefore simply access the temporary scan result buffer in 422 as opposed to accessing DB, thereby reducing retrieval time. Alternatively, PS2 may directly provide any common scan results to PS1, thereby avoiding any access time delays for the common scan results (although PS1 may nevertheless still access DB for other valid stored scan results).

Accordingly, at the conclusion of 424 both PS1 and PS2 may have obtained scan results for the first and second sets of scan targets, respectively, where the scan results may have been obtained via fresh scan of scan targets or retrieval of stored scan results from DB. Due to the coordination of the PS1 and PS2 scans by ARB in 412-424, common scan targets may only have been searched (or retrieved from DB) a single time. Such multi-SIM scan optimization may reduce recovery time and conserve battery power.

Returning to 406, if only one of PS1 and PS2 has indicated intent to perform a scan, ARB may simply retrieve any valid PS1/PS2 scan results from DB in 408, e.g. according to the read/write access rules for DB detailed above. ARB may then trigger the PS1/PS2 scan in 410, thereby allowing PS1/PS2 to obtain any remaining scan results via a fresh scan. ARB may then add scan results of the PS1/PS2 scan to DB e.g. according to the read/write access rules for DB detailed above. Alternatively, PS1/PS2 may directly retrieve any valid PS1/PS2 scan results from DB and/or add the PS1/PS2 scan results directly to DB, which may be e.g. on a permission-grant basis provided by ARB.

Accordingly, the multi-SIM scan optimization procedure 400 may optimize both PLMN and cell scans. For example, PLMN-relevant scan results, including e.g. PLMN ID, LAC, cell information, timestamps, and measurement results (e.g. RSSI) may be utilized by a requesting protocol stack instance to quickly determine which carrier channels correspond to a particular PLMN of interest. For example, a protocol stack instance attempting to locate an HPLMN may access scan results for a given band in order to identify whether any of the carrier channels of the band correspond to the HPLMN, where a protocol stack instance has previously read the PLMN ID from the strongest cell and stored resulting scan results in DB. As opposed to executing a fresh scan, the requesting protocol stack instance may utilize retrieved scan results from DB (assuming validity) in order to save time and conserve power.

Similarly, a protocol stack instance performing a cell scan (during e.g. cell selection, cell reselection, or measurement reporting) may access scan results in DB to obtain cell information on a particular carrier channel of interest. As opposed to performing a fresh cell scan on a particular carrier channel, the requesting protocol stack instance may instead utilize stored scan results for the carrier channel, such as cell ID, LAC, and measurement results (including e.g. RSSI, RSCP, Ec/No, RSRP, RSRQ, etc., dependent on radio access technology) to obtain the desired results of the cell scan. It is appreciated that such cell scan results, e.g. in particular measurement results, may be assigned lower validity times than PLMN scan results, e.g. PLMN ID, as such measurement results may be more volatile (i.e. prone to variation over time) than PLMN ID of cells on a specific carrier channel.

Scan results may then be utilized by protocol stack instances to e.g. perform PLMN selection by registering and potentially establish connection with a PLMN (e.g. HPLMN or EHPLMN)), perform cell selection/reselection, perform measurement reporting, or facilitate handover. For example, during a PLMN scan (including e.g. an HPPLMN scan), a protocol stack instance may utilize DB to select and camp on a PLMN. Alternatively, during a cell scan, a protocol stack instance may utilize DB to identify proximate cells and perform cell selection/reselection.

As previously indicated, PS1 and PS2 may correspond to the same radio access technology or may correspond to different radio access technologies. While appreciably greater quantities of common scan targets may exist between PS1 and PS2 if PS1 and PS2 correspond to the same radio access technology, there may exist certain degrees of overlap between scan targets even if PS1 and PS2 correspond to different radio access technologies. For example, certain different radio access technologies may share frequency bands, i.e. certain radio access technologies may utilize frequency bands that overlap with frequency bands utilized by other different radio access technologies. In particular, GSM supports common bands with both UMTS and LTE. Similarly, UMTS and LTE support common bands. Such may be particularly useful for scan results that specify e.g. a detected RAT of a given carrier channel (i.e. scan target).

Accordingly, in an exemplary scenario in which PS1 is an LTE protocol stack instance and PS2 is a UMTS protocol stack instance, PS1 and PS2 may utilize scan results from the a radio scan of the counterpart protocol stack instance in order to identify the RAT of a given carrier channel. For example, PS1 may first perform a first radio scan on a first set of carrier channels in a given frequency band. PS1 may obtain scan results specifying that a first carrier channel is an LTE carrier channel, such as by detecting an LTE cell on the first carrier channel. As PS2 is a UMTS protocol stack instance, a later-occurring PS2 scan (within any provided validity time) may utilize the scan result of the first carrier channel from the PS1 scan to determine that the first carrier channel is an LTE carrier channel, and thus does not need to be scanned in order to detect UMTS cells/PLMNs. Accordingly, depending on the system bandwidth (e.g. 1.4, 2, 5, 10, 15, or 20 MHz) of the LTE first carrier channel (i.e. a scan result of the PS1 scan), PS2 may avoid scanning the first carrier channel in addition to any neighboring carrier channels (dependent on the LTE system bandwidth) for UMTS carrier channels, as the PS1 scan results already indicate that such carrier channels occur in an LTE band. Similarly, an earlier PS2 scan may identify a second carrier channel as a UMTS carrier channel, thus potentially providing a scan result to a later PS1 scan indicating that the second carrier channel is a UMTS carrier channel. The later PS1 scan may utilize the PS2 scan result to avoid scanning the second carrier channel and any potential neighboring channels (corresponding to a 5 MHz UMTS system bandwidth) for LTE carrier channels. Such may similarly be applied to GSM, although it is appreciated that an earlier scan by a GSM protocol stack instance may not be as beneficial due to the smaller 200 kHz GSM system bandwidth. Accordingly, scan results indicating the RAT of a given carrier channel (i.e. scan target) may be useful for sharing between protocol stack instances corresponding to different radio access technologies. DB may thus hold scan results that are potentially relevant to all protocol stack instances regardless of the corresponding radio access technology. It is thus appreciated that the scan result sharing approaches detailed herein may apply both to protocol stack instances of the same radio access technology in addition to protocol stack instances of different radio access technologies.

Figure 5:
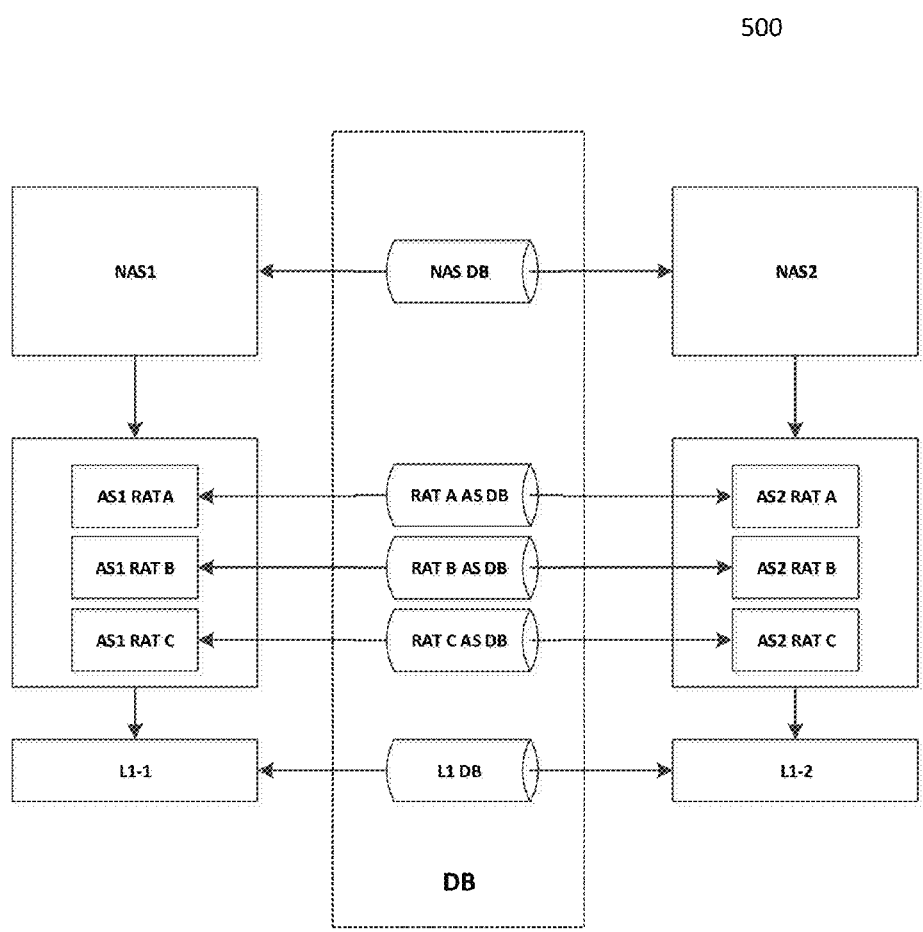
FIG. 5 shows an exemplary configuration of protocol stack layers of a baseband modem.

FIG. 5 shows exemplary architecture 500 of the allocation of shared scan result database DB across different layers of various protocol stack instances. As shown in FIG. 5, DB may be present across non-access strati NAS1 and NAS2, access strati AS1 and AS2, and Layer 1 stack layers L1-1 and L1-2. As denoted in FIG. 5, access strati AS-1 and AS-2 may correspond to RAT A, RAT B, and RAT C, which may each be different radio access technologies. NAS1, AS1, and L1-1 may each correspond to SIM1, e.g. to the protocol stack instances executed in baseband modem 106 corresponding to SIM1. Likewise, NAS2, AS2, and L1-2 may each correspond to SIM2, e.g. to the protocol stack instances executed in baseband modem 106 corresponding to SIM2.

FIG. 5 may be understood as detailing an exemplary architecture in which certain sections of DB are shared between protocol stack instances corresponding to the same radio access technology. As previously detailed, it is appreciated that DB may alternatively be available for access by protocol stack instances of any radio access technology, and according scan results may be shared between protocol stack instances of different radio access technologies (as detailed regarding FIGS. 3 and 4)

Shared scan result database DB may thus be distributed across the non-access stratum, access stratum, and Layer 1 (L1) protocol stack layers. Accordingly, database subdivisions NAS DB, RAT A AS DB, RAT B AS DB, RAT C AS DB, and L1 DB may each be accessed by the corresponding layers of the protocol stack instances associated with SIM1 and SIM2, such as to access specific scan results associated with each protocol stack layer. The RAT-specific database subdivisions RAT A AS DB, RAT B AS DB, RAT C AS DB may be of particular importance, as corresponding RATs (i.e. AS1 RAT A and AS2 RAT A, AS1 RAT B and AS2 RAT B, and AS1 RAT C and AS2 RAT C) may share scan results between protocol stack instances of SIM1 and SIM2. For example, measurement results obtained by L1-1 and/or L1-2 may be written to L1 DB for future access by L1-1 and/or L1-2, such as during cell scan to obtain measurements results for cell selection/reselection. Similarly, AS DB may hold timestamps, measurement results, PLMN ID, etc. NAS DB may hold PLMN ID, etc.

Figure 6:
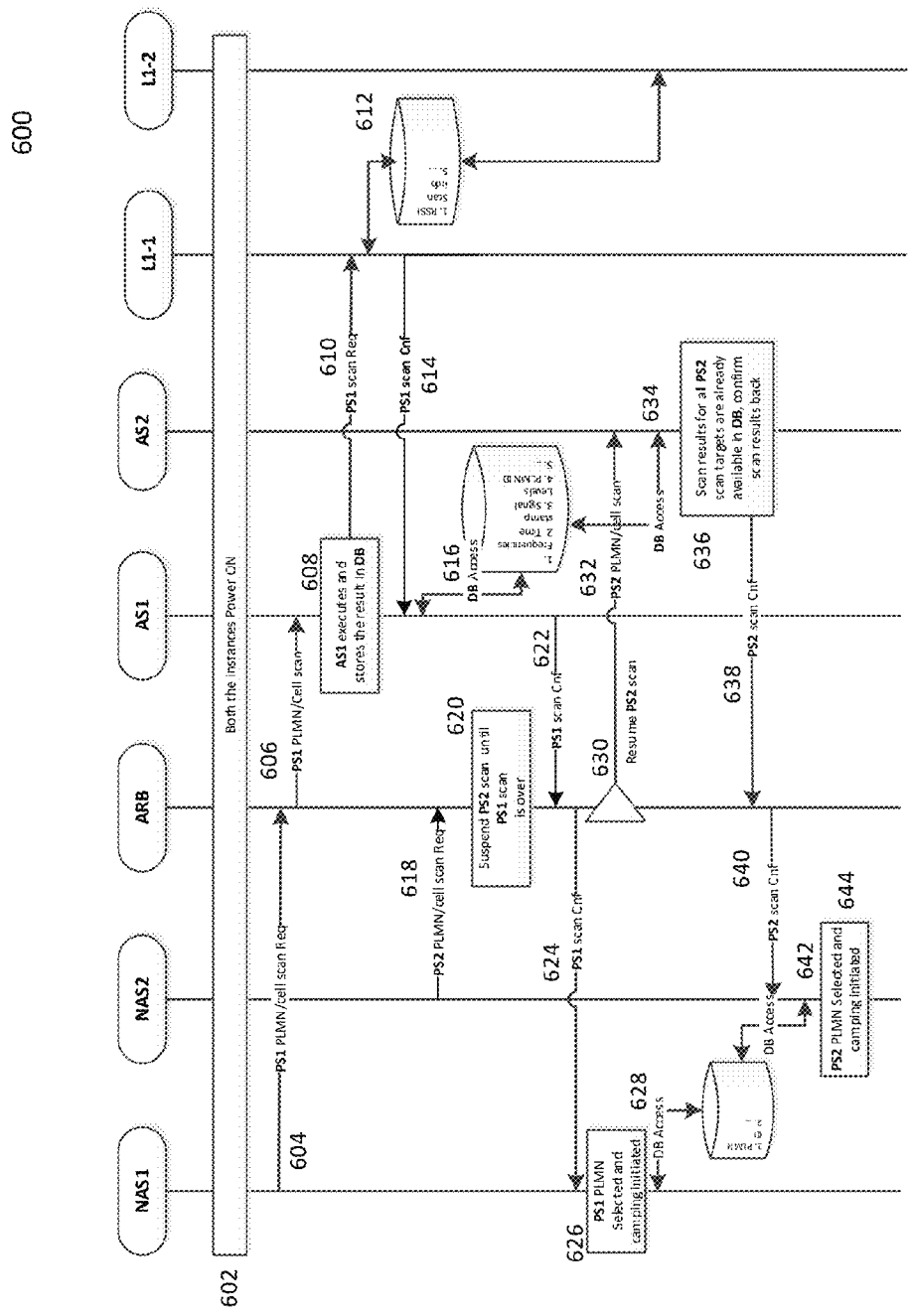
FIG. 6 shows a message sequence chart detailing a first exemplary scan scenario.

FIG. 6 shows message sequence chart 600 illustrating an exemplary realization of the multi-SIM scan optimization procedure 400 according to the non-access strati NAS1 and NAS2, access strati AS1 and AS2, and Layer 1 stack layers L1-1 and L1-2 of FIG. 5. NAS1, AS1, and L1-1 may correspond to protocol stack layers of PS1 while NAS2, AS2, and L1-2 may correspond to protocol stack layers of PS2. Alternatively, it is appreciated that reference to PS1 and PS2 may refer to an arbitrary pair of protocol stack instances out of any two or more protocol stack instances. Furthermore, it appreciated that PS1 and PS2 may be any two arbitrary protocol stack instances in e.g. a multi-SIM design with any number of SIMs and corresponding protocol stack instances, such as two SIMs, three SIMs, four SIMs, etc. corresponding to two protocol stack instances, three protocol stack instances, four protocol stack instances, etc.

In the exemplary scenario of message sequence chart 600, the first set of scan targets and the second set of scan targets may be identical, i.e. may contain only common scan targets. Accordingly, the later-occurring scan (the PS2 scan in the exemplary scenario of message sequence chart 600) may simply retrieve all scan results from DB and may not need to perform a fresh scan on any scan targets.

In 602, PS1 and PS2 may power on. NAS1 may then request a PLMN or cell scan (i.e. PS1 scan) in 604, which may be provided to arbitrator ARB. ARB may thus be responsible for coordinating scans between the protocol stack layers of PS1 and PS2.

ARB may grant the PS1 scan in 606 by instructing AS1 to initiate a scan, i.e. on a first set of scan targets corresponding to the PS1 scan. AS1 may then transmit a search request to L1-1 in 610, which may execute the PS1 scan on the first set of scan targets. As DB may be empty (due to power on at 602), L1-1 may perform a fresh scan on the first set of scan targets, which may channel frequencies spanning one or more partial or entire bands.

L1-1 may access L1 DB at 612 to update L1 DB based on the fresh PS1 scan results. L1-1 may then confirm the PS1 scan to AS1 at 614. AS1 may then access AS DB at 620 to update AS DB based on the fresh PS1 scan result.

PS2 may then request a PLMN/cell scan at 618, where NAS2 transmits a PS2 PLMN/cell scan request to ARB. As the PS1 search is not complete, ARB may suspend the PS2 scan at 620 until PS1 concludes. ARB may thus coordinate conflicting scan requests AS1 may then confirm the conclusion of the PS1 scan to ARB at 622. ARB may transmit the PS1 scan confirmation to NAS1 at 624. NAS1 may receive the PS1 scan confirmation at 626 and e.g. select a PLMN based on the PS1 scan results in order to register and begin camping on the PLMN.

As the PS1 scan has concluded, ARB may resume the PS2 scan in 630. ARB may transmit the PS2 scan request to AS2 at 632. NAS1 may access NAS DB at 628.

As previously indicated, in the exemplary scenario of message sequence chart 600, the first set of scan targets may be identical to the second set of scan targets, i.e. both PS1 and PS2 (by way of NAS1 and NAS2) may request the same channel frequencies over entire or partial bands be scanned. As all of the scan targets are common scan targets, DB may already contain scan results for all the scan targets by way of PS1 scan. A fresh scan at L1-2 may thus not be needed.

Accordingly, AS2 may access AS DB at 634 to retrieve all common scan results (or e.g. any other scan results previously stored in AS DB) for the second set of scan targets (i.e. all of the second set of scan targets in the exemplary scenario of message sequence chart 600) from AS DB. AS2 may then confirm the scan results back to ARB at 636 by transmitting a PS2 scan confirmation at 638. ARB may transmit a PS2 scan confirmation back to NAS2 at 640. NAS2 may then access NAS DB at 642 and select a PLMN for PS2 to begin camping at 644.

As the PS1 and PS2 scans had identical scan targets, the PS2 scan did not require a fresh scan, and instead relied upon the scan results obtained in the PS1 scan. Accordingly, the multi-SIM scan optimization procedure may decrease recovery time and conserve battery power by reducing the occasions when fresh scans are needed in addition to avoiding redundant scans.

Method x4y00 and message sequence chart x6y00 thus detail an approach where one of the pending scans, i.e. the PS1 scan or the PS2 scan, is executed and completed in its entirety before executing the second scan on any remaining scan targets (and e.g. utilizing DB to retrieve any valid scan results). Alternatively, the initially triggered radio scan, e.g. the PS1 scan in an exemplary scenario, may initially only execute on the common scan targets, i.e. the scan targets shared between PS1 and PS2. After the PS1 scan has completed on the common scan targets, PS1 and/or PS2 may execute serialized or parallelized radio scans on the remaining scan targets for PS1 and PS2, respectively, such as by selecting one of the PS1 or PS2 scan to execute first or executing both the PS1 and PS2 scans simultaneously.

Accordingly, common scan results for PS1 and PS2 may be obtained prior to any remaining scan results. The common scan results may then be made available to both PS1 and PS2, i.e. prior to radio scan of the remaining scan results, which may potentially allow PS1 and/or PS2 to establish full service at an earlier point in the event recovery from a reduced service scenario, as the common scan results may be sufficient to establish full service. Accordingly, the remaining scan results may not be needed. As will be further detailed, there exist many such variations for performing the PS1 and PS2 scans in order to share scan results.

Figure 7:
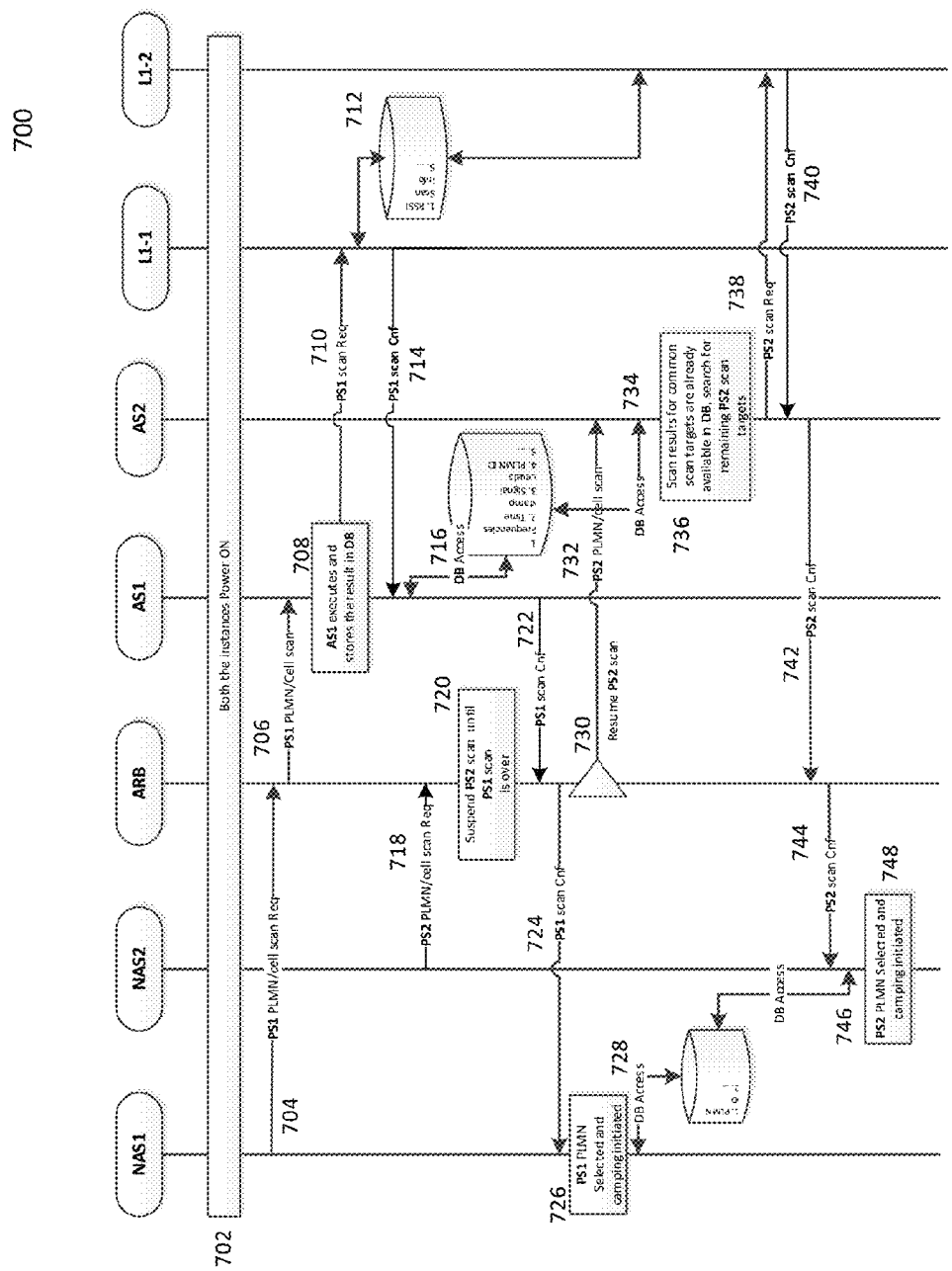
FIG. 7 shows a message sequence chart detailing a second exemplary scan scenario.

FIG. 7 shows message sequence chart 700 illustrating another exemplary realization of the multi-SIM scan procedure 400 corresponding to the non-access strati NAS1 and NAS2, access strati AS1 and AS2, and Layer 1 stack layers L1-1 and L1-2 of FIG. 5. Similarly as to message sequence chart 600, NAS1, AS1, and L1-1 may correspond to protocol stack layers of PS1 while NAS2, AS2, and L1-2 may correspond to protocol stack layers of PS2. Alternatively, it is appreciated that reference to PS1 and PS2 may refer to an arbitrary pair of protocol stack instances out of any two or more protocol stack instances. Furthermore, it appreciated that PS1 and PS2 may be any two arbitrary protocol stack instances in e.g. a multi-SIM design with any number of SIMs and corresponding protocol stack instances, such as two SIMs, three SIMs, four SIMs, etc. corresponding to two protocol stack instances, three protocol stack instances, four protocol stack instances, etc.

In the exemplary scenario of message sequence chart 700, the first set of scan targets may be different from the second set of scan targets, i.e. may not contain exclusively identical elements. However, there may exist one or more common scan targets between the first set of scan targets and the second set of scan targets. Accordingly, the later-occurring scan (the PS2 scan in the exemplary scenario of message sequence chart 700) may retrieve the corresponding common scan results from DB in order to avoid performing a fresh scan on the common scan targets, which may be redundant to the earlier-occurring scan (the PS1 scan in the exemplary scenario of message sequence chart 700).

Arbitrator ARB may similarly coordinate the PS1 and PS2 scans by serializing the scans. Accordingly, 702-734 may be substantially identical to 602-634 as detailed in message sequence chart 600. Thus, at 734 AS2 may access AS DB to obtain any scan results for any common scan targets (or e.g. any scan results previously obtained and stored in AS DB).

However, the first set of scan results (i.e. the current contents of AS DB) may be different than the second set of scan results. Accordingly, PS2 may need to scan any remaining scan targets to obtain search results corresponding thereto.

Accordingly, AS2 may transmit a PS2 scan request specifying the remaining scan targets to L1-2 at 738. L1-2 may then perform a scan on the remaining scan targets and confirm the PS2 scan back to AS2 at 740.

AS2 may then confirm the PS2 scan back to ARB at 742. ARB may then confirm the PS2 scan to NAS2 at 744. NAS2 may then access NAS DB at 746 and select a PLMN to begin camping at 748.

Figure 8:
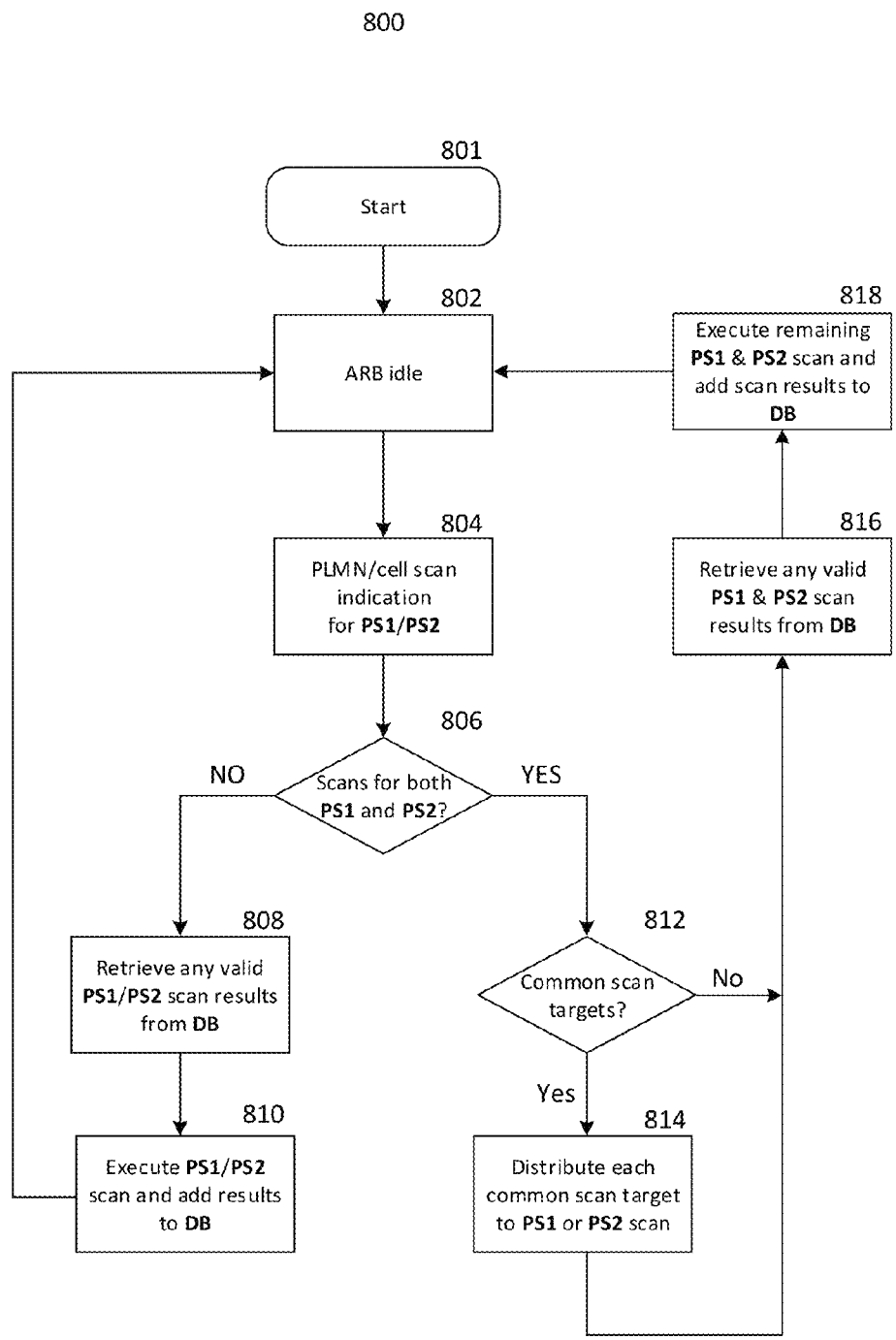
FIG. 8 shows a flow chart illustrating a parallelized multi-SIM scan procedure

The descriptions detailed above have thus far detailed coordination of conflicting protocol stack instance PLMN and/or cell scans through serialization, i.e. by suspending a first scan, executing a second scan, and resuming the first scan after the second scan has completed. Such coordination, e.g. by arbitrator ARB within baseband modem 106, may avoid redundant scan of common scan targets by the first and second scans, as the second scan may store any common scan results in a shared scan result database for subsequent retrieval (depending on validity time) by the first scan. Redundant scans on scan targets corresponding to valid scan results stored in the shared scan result database may thus be avoided. Furthermore, later-occurring scans may simply retrieve valid scan results from the shared scan result database as opposed to executing a fresh scan, thereby potentially reducing scan execution time. Such retrieval may save an appreciable amount of time dependent on the number of common scan targets, which may encompass partial or entire frequency bands FIG. 8 shows a flow chart illustrating a multi-SIM optimized PLMN and/or cell scan procedure 800 utilizing parallelized coordination of conflicting common scans. The multi-SIM optimized PLMN and/or cell scan procedure 800 may incorporate various components of baseband modem 106, including PS1, PS2, ARB, and DB. It is appreciated that reference to PS1 and PS2 may refer to any arbitrary pair of protocol stack instances (i.e. corresponding to the same or different radio access technologies). It is appreciated that reference to PS1 and PS2 may refer to an arbitrary pair of protocol stack instances out of any two or more protocol stack instances. Furthermore, it appreciated that PS1 and PS2 may be any two arbitrary protocol stack instances in e.g. a multi-SIM design with any number of SIMs and corresponding protocol stack instances, such as two SIMs, three SIMs, four SIMs, etc. corresponding to two protocol stack instances, three protocol stack instances, four protocol stack instances, etc. Depending on the RAT capabilities of SIM1 and SIM2, arbitrator ARB may similarly perform the multi-SIM optimized PLMN and/or cell scan procedure 800 on any two (or more) protocol instances.

In contrast to the multi-SIM optimized PLMN and/or cell scan procedure 400, ARB may utilize parallelization to coordinate conflicting common scans between PS1 and PS2. For example, as opposed to suspending one of PS1/PS2 in the event of common scan targets in the first and second sets of scan targets, ARB may instead distribute each of common scan targets to one of PS1 or PS2 and allow PS1 and PS2 to execute independent scans (which may be e.g. parallel or serial) on the updated first and second sets of scan targets (i.e. updated where each common scan target only appears in one of either the first or second sets of scan targets). For example, ARB may identify the common scan targets in the first and second sets of scan targets and remove the common scan targets from one of either the first or second set of scan targets, thereby yielding updated first and second sets where each common scan target only appears in one of either the first or second sets of scan targets. Other variations are possible, such as removing common scan targets from each of the first and second sets of scan targets such that the updated first and second sets of scan targets contain the same amount of scan targets. ARB may therefore update the first and second sets of scan targets in order to ensure that the PS1 and PS2 scans require similar execution times to complete scan of the updated first and second sets of scan targets, respectively. It is further appreciated that such re-arrangement for example to e.g. balance the first and second sets of scan targets is not limited to parallel scan coordination and may be similarly applied to serialized coordination, such as to balance the first and second sets of scan targets such that the PS1 and PS2 scans finish at approximately similar times.

Accordingly, ARB may perform 801-812 in a substantially identical manner of 401-412, respectively. However, after analyzing (e.g. comparing) the first and second sets of scan targets in 812, ARB may proceed to either 814 or 816. If common scan targets exist between the first and second sets of scan targets, ARB may proceed to 814 to distribute each common scan target to one of the PS1 or PS2 scan, i.e. to either the first set of scan targets or the second set of scan targets, and subsequently proceed to 816. If no common scan targets exist between the first and second sets of scan targets, ARB may proceed to 816.

ARB may thus proceed to 816 either occur after distribution of common scan targets in 814 or directly following common scan target identification in 812. In 816, ARB may retrieve (or allow PS1 and/or PS2 to retrieve directly) any valid scan results corresponding to the PS1 and PS2 scans (i.e. corresponding to the first and second sets of scan targets) from DB. 816 may include retrieval of valid scan results of any common scan targets distributed to the updated first and second sets of scan targets by PS1 and/or PS2 from DB, which may be facilitated by ARB or done directly by PS1 and/or PS2.

ARB may then execute the PS1 and PS2 scans using remaining first and second sets of scan targets, i.e. scan targets of the first and second sets of scan targets that do not correspond to valid scan results stored in DB. PS1 and PS2 may thus obtain all desired scan results, either by performing a fresh scan or retrieving scan results from DB (which may be common scan results obtained by the other protocol stack instance in 818).

Possible distribution of common scan targets may be performed by ARB on e.g. a per-band basis. For example, PS1 and PS2 may each wish to perform a PLMN scan on a first band (containing a first plurality of carrier channels), a second band (containing a second plurality of carrier channels), and a third band (containing a second plurality of carrier channels). Accordingly, ARB may distribute the common scan targets to facilitate parallel coordination of the PS1 and PS2 scans by assigning PS1 to scan the first and second bands and PS2 to scan the third band, where PS1 and PS2 may then e.g. retrieve the common scan results obtained by the other protocol stack instance from DB or e.g. retrieve the common scan results obtained by the other protocol stack from a temporary scan result buffer dedicated for holding common scan results for quick retrieval. The first and second sets of scan results of PS1 and/or PS2 may also include additional "non-common" scan results (i.e. unique to one of the first or second set of scan results), which PS1 and/or PS2 may obtain independently as previously detailed.

Alternatively, carrier channel (i.e. scan targets) in a single band may be distributed. For example, in the scenario introduced above, ARB may assign the first band to PS1, the second band to PS2, and allocate part of the carrier channels of the third band to PS1 while allocating the remaining carrier channels of the third band to PS2. Many such similar variations for distribution and allocation of common scan targets between protocol instances may also be utilized.

Furthermore, a scenario may occur in which PS1 or PS2 completes a scan before scanning all of the first or second set of scan targets (or updated first and second set of scan targets in the case of distribution). For example, PS1 may be scanning all carrier channels over an entire first band during a PLMN scan while PS2 concurrently scans all carrier channels over an entire second band during a PLMN scan, where the carrier channels of the first band are common scan targets of both the PS1 and PS2 scans. PS1 may detect availability of the HPLMN of PS1, which PS1 may subsequently attempt to camp on in order to cease roaming. Accordingly, in certain cases PS1 may abandon scan of remaining carrier channels of the first band, thereby leaving the first band only partially scanned. As the carrier channels of the first band may be common scan targets to PS2, PS2 may also need scan results for the carrier channels of the first band. Accordingly, despite original distribution of the first band to PS1 by ARB (such as during 814), PS2 may complete the scan of the first band (such as e.g. after completion of scan of the carrier channels of the second band) in order to obtain all desired scan results.

Upon execution of 818, PS1 and PS2 may exchange common scan results (if any) that were previously distributed by ARB in 814, such as by retrieving the common scan results from DB or retrieving the common scan results from a temporary scan result buffer, which PS1 and PS2 may utilize to store common scan results (in addition to in DB) to allow fast access by other protocol stack instances at the conclusion of coordinated parallel scans. Alternatively, PS1 and PS2 may directly exchange common scan results.

ARB may determine in 806 that a preceding scan of the PS1 or PS2 scans is already executing, i.e. was initiated at a previous time. In order to parallelize the preceding PS1 or PS2 scan with the succeeding PS1 or PS2 scan, ARB may utilize several different common scan target distribution procedures. For example, ARB may allow the preceding PS1 or PS2 scan to continue on all of the assigned scan targets of the preceding PS1 or PS2 scan (i.e. the first or second set of scan targets depending on which of PS1 or PS2 is the preceding scan). ARB may then execute the succeeding PS1 or PS2 scan on any remaining scan targets of the succeeding PS1 or PS2 scan (i.e. scan targets of the succeeding PS1 or PS2 scan that are not common scan targets), e.g. while utilizing DB to access any valid scan results corresponding to scan targets of the succeeding PS1 or PS2 scan. ARB may then facilitate the sharing of common scan results as obtained by the preceding PS1 or PS2 scan with the succeeding PS1 or PS2 scan.

Alternatively, ARB may determine which, if any, of the common scan targets the preceding PS1 or PS2 scan has already scanned, e.g. which carrier channels the preceding PS1 or PS2 scan has already scanned to obtain scan results (or e.g. retrieved from DB as valid search results). If any of the common scan targets have not yet been scanned by the preceding PS1 or PS2 scan, ARB may distribute the remaining common scan targets to either the preceding PS1 or PS2 scan or the succeeding PS1 or PS2 scan, and allow both the PS1 and PS2 scans to execute concurrently in parallel, i.e. by initiating the succeeding PS1 or PS2 scan on any distributed common scan targets and any remaining scan targets of the succeeding PS1 or PS2 scan. ARB may perform the distribution of common scan targets on a per-band basis. For example, if the PS1 and PS2 scans both target all carrier channels in a specific band and the preceding PS1 or PS2 scan has already begun scanning the specific band, i.e. searching on the carrier channels of the specific band, ARB may decide not to distribute any scan targets (i.e. carrier channels) of the specific band to the succeeding PS1 or PS2 scan, and may instead allow the preceding PS1 or PS2 scan to continue scan on the specific band. ARB may then direct the succeeding PS1 or PS2 scan to initiate scan on other scan targets of the succeeding PS1 or PS2 scan, such as on a further specific band also targeted for scan by both PS1 and PS2.

As previously detailed, scan results obtained during a first type of scan may be subsequently retrieved during a second type of scan, e.g. PS1 may store cell scan results which are later retrieved and utilized by PS1 during a PLMN scan. It is appreciated that such differing types of scans may also be coordinated when timing conflicts arise by ARB, i.e. in serial or parallel, such as a PLMN scan by PS1 conflicting in time with a cell scan by PS2. Any common scan targets may thus be shared between the dissimilar scan types in accordance with a serial or parallel coordination scheme by ARB.

ARB may additionally apply dedicated coordination between multiple protocol stack instances during aforementioned High Priority PLMN (HPPLMN) scans. As previously detailed, returning to mobile terminal 100 of FIG. 1, both SIM1 and SIM2 may specify a Home PLMN (HPLMN), i.e. HPLMN1 for SIM1 and HPLMN2 for SIM2, that is preferred over all other PLMNs. Accordingly, PS1 and PS2 may both control baseband modem 106 in order to establish a connection, e.g. camp, on HPLMN1 and HPLMN2, if available. Thus, if HPLMN1 and HPLMN2 are different, PS1 and PS2 may seek to camp on HPLMN1 and HPLMN2 by way of baseband modem 106.

If one of HPLMN1/HPLMN2 is not available, PS1/PS2 may instead select the next-highest priority PLMN to camp on as a Visited PLMN (VPLMN), e.g. roaming. The PLMN priority hierarchy may be provided by SIM1 and SIM2 in the form of HPPLMN lists for SIM1 and SIM2. PS1/PS2 may then perform periodic HPPLMN scans to identify available PLMNs while remaining camped on VPLMN1/VPLMN2. If an HPLMN, Equivalent HPLMN (EHPLMN), or other PLMN having higher priority than VPLMN1/VPLMN2 is detected, PS1/PS2 may select the higher priority PLMN for registration and camping. If PS1/PS2 finds HPLMN1/HPLMN2 during an initial PLMN scan or subsequent HPPLMN scan, PS1/PS2 may camp on HPLMN1/HPLMN2 and cease performance of any HPPLMN scans, as the highest priority PLMN is available in HPLMN1/HPLMN2.

SIMs may supply a HPPLMN scan timer, which may dictate the periodicity of HPPLMN scans. Upon expiry of the HPPLMN scan timer, a protocol stack instance may control baseband modem 106 to perform an HPPLMN scan in order to attempt to identify higher priority PLMNs according to the HPPLMN list specified by the SIM. Exemplary HPPLMN scan timers may e.g. 30 minutes, 45 minutes, 60 minutes, etc., and may differ per-HPLMN and/or per-SIM.

Accordingly, in a multi-SIM design such as mobile terminal 100, PS1 and PS2 may both execute periodic HPPLMN scans according to respective HPPLMN scan timers HPPLMNT_1 and HPPLMNT_2. In a realization where PS1 and PS2 are executed independently, the PS1 and PS2 HPPLMN scans may demand two separate HPPLMN scans. As such HPPLMN scans may routinely scan the same bands (i.e. the PS1 and PS2 HPPLMN scans may both scan carrier channels on the same fully bands in order to detect PLMN IDs from cells on each carrier channel), such independent PS1 and PS2 HPPLMN scans may involve duplicate scans of the same bands (i.e. the same scan targets). For example, baseband modem 106 may need to scan all supported bands of mobile terminal 100 during an HPPLMN scan, e.g. as mandated by 3GPP.

Accordingly, baseband modem 106 may perform arbitration on the PS1 and PS2 HPPLMN scans in order to coordinate the HPPLMN scans in order to avoid redundant search of common scan targets (which may e.g. span over all carrier channels on one or more entire bands). Specifically, baseband modem 106 may adjust the timing offset of the HPPLMN timers and optionally the duration of the HPPLMN timers in order to coordinate the PS1 and PS2 HPPLMN scans in a parallel and/or serial fashion.

The HPPLMN scan timers HPPLMNT_1 and HPPLMNT_2 may either have equal or different durations, which may depend on the specified HPPLMN scan timer duration specified by SIM1 and SIM2.

In an exemplary aspect of the disclosure, ARB may coordinate PS1 and PS2 HPPLMN scans in substantially the same manner as detailed in the multi-SIM optimized PLMN/scan procedure 400 (serialized) or 800 (parallelized). Accordingly, ARB may determine when one of PS1/PS2 requests or indicates an HPPLMN scan. ARB may then determine if PS2/PS1 has also requested or indicated an HPPLMN scan. If PS2/PS1 has not requested or indicated an HPPLMN scan, ARB may trigger the pending PS1/PS2 HPPLMN scan. Before executing a fresh HPPLMN scan, ARB may access DB to determine if any scan targets (i.e. carrier channels and/or e.g. entire bands of carrier channels) correspond to scan results stored in DB. If scan results stored in DB correspond to scan targets of the PS1/PS2 scan, ARB may determine if the scan results are still valid. Assuming the validity timer is less than HPPLMN scan timer HPPLMNT_1/HPPLMNT_2, ARB may detect valid corresponding scan results if another protocol stack instance has recently performed a PLMN scan (either PLMN scan during initial PLMN selection, manual PLMN scan, HPPLMN scan, etc.). If valid corresponding scan results exist in DB, ARB may supply PS1/PS2 with the scan results. PS1/PS2 may then perform a fresh HPPLMN scan on the remaining PS1/PS2 scan targets (if any), thereby conserving power and reducing scan completion time.

Alternatively, the PS1 and PS2 HPPLMN scans may conflict, i.e. may occur at the same, substantially the same, or overlapping times. In such a case, ARB may utilize DB and/or a temporary scan result buffer to coordinate the PS1 and PS2 HPPLMN scans in serial or parallel. For example, ARB may identify whether common scan targets exist between the first set of scan targets corresponding to the PS1 HPPLMN scan and the second set of targets corresponding to the PS2 HPPLMN scan. In certain cases, HPPLMN scans may contain substantially the same targets (i.e. may target the same partial or entire bands of carrier channels for scan), similarly to the scenario detailed regarding message sequence chart 500 in FIG. 5.

Accordingly, ARB may utilize serialized coordination of the PS1 and PS2 HPPLMN scans in substantially the same manner as detailed regarding FIG. 4. ARB may suspend one of the PS1/PS2 scans and execute the PS2/PS1 scan. ARB may retrieve any valid scan results from DB and execute the PS2/PS1 scan on any remaining targets (and e.g. potentially saving any common scan results obtained via fresh scan or retrieval from DB in a temporary scan result buffer for quick access by PS1/PS2), where new scan results obtained via fresh scan may be stored in DB. After completion of the PS2/PS1 scan, ARB may resume the PS1/PS2 scan by retrieving any valid scan results from DB (or e.g. common scan results stored by PS2/PS1 in a temporary scan result buffer) and executing the PS1/PS2 scan on any remaining scan targets, where new scan results obtained via fresh scan may be stored in DB.

Alternatively, after positive identification of common scan targets, ARB may utilize parallelized coordination of PS1 and PS2 HPPLMN scans in substantially the same manner as detailed regarding FIG. 8. ARB may then distribute common scan targets (which may e.g. select carrier channels or entire bands of carrier channels) between the PS1 and PS2 HPPLMN scans such that each scan target only occurs in one of the first set of scan targets and the second set of scan targets. PS1 and PS2 may then execute the respective HPPLMN scans using the updated first and second sets of scan targets, where new scan results obtained via fresh scan may be stored in DB. Common scan results may similarly be exchanged by PS1 PS2 (i.e. corresponding to common scan targets that were previously distributed by ARB), either indirectly (through DB or a temporary scan result buffer) or directly (directly between PS1 and PS2).

The above-detailed scenarios may involve where the timing of HPPLMN scans may not be interrupted, i.e. both the PS1 and PS2 HPPPLMN scans may execute according to HPPLMN timers HPPLMNT_1 and HPPLMNT_2. Baseband modem 106 may thus only perform timing coordination between PS1 and PS2 if HPPLMN scans are conflicting.

In order to further conserve battery power and reduce scan completion time, baseband modem 106 may perform coordination between PS1 and PS2 HPPLMN scans in order to coordinate such HPPLMN scans to occur at substantially the same time, thus allowing for extensive HPPLMN scan result sharing. As the HPPLMN scans may occur substantially concurrently, HPPLMN scan results may always be shared by PS1 and PS2 as validity times may be less relevant.

Figure 9:
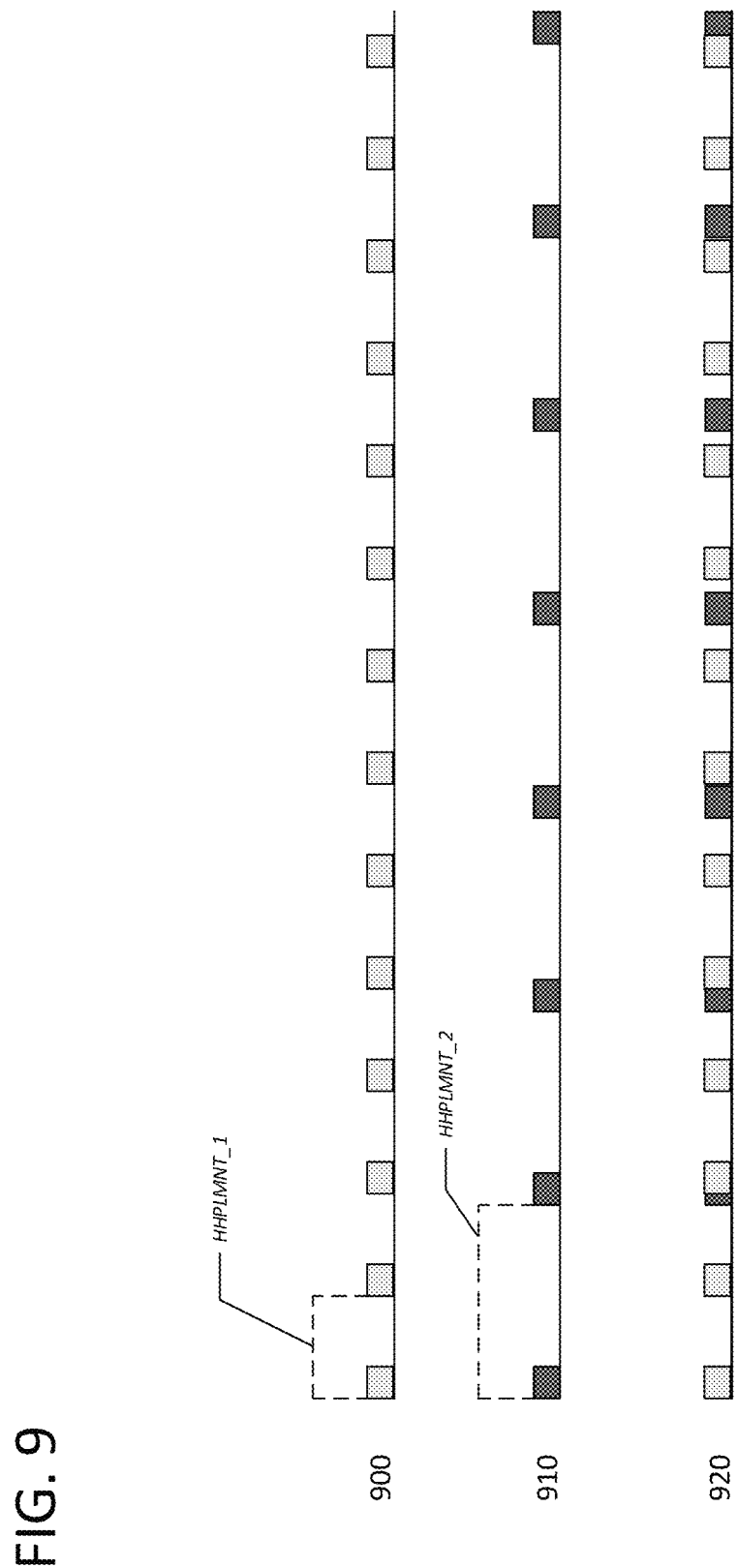
FIG. 9 shows a timing diagram illustrating a mobile network scan.

FIG. 9 shows exemplary timing diagrams 900, 910, and 920. Timing diagrams 900 and 910 may correspond to HPPLMN scans on PS1 and PS2 corresponding to HPPLMN scan timers HPPLMNT_1 and HPPLMNT_2, respectively. Timing diagram 920 may detail timing diagrams 900 and 910 overlaid on top of one another. It is appreciated that reference to PS1 and PS2 may refer to an arbitrary pair of protocol stack instances out of any two or more protocol stack instances. Furthermore, it appreciated that PS1 and PS2 may be any two arbitrary protocol stack instances in e.g. a multi-SIM design with any number of SIMs and corresponding protocol stack instances, such as two SIMs, three SIMs, four SIMs, etc. corresponding to two protocol stack instances, three protocol stack instances, four protocol stack instances, etc.

Each timing block may represent an HPPLMN scan on PS1 or PS2. As shown by timing diagram 920, PS1 and PS2 HPPLMN scans may be relatively dispersed, with some HPPLMN scans occurring at or around similar times and others occurring separately.

While the aforementioned multi-SIM scan optimization utilizing parallel or serial coordination with validity time database retrieval may offer some degree of scan result sharing, there may still exist numerous instances in which result sharing is not possible, e.g. when validity timers on scan results have expired. Furthermore, the inclusion of validity timers and the associated evaluation during retrieval from DB may require slight increases in processing power (e.g. in order to execute further logic to determine validity or expiry of scan results).

Accordingly, ARB may perform coordination between PS1 and PS2 HPPLMN scans by modifying the HPPLMN scan timers HPPLMNT_1 and HPPLMNT_2 and potentially the offset of HPPLMN scan timers HPPLMNT_1 and HPPLMNT_2 relative to one another.

Figure 10:
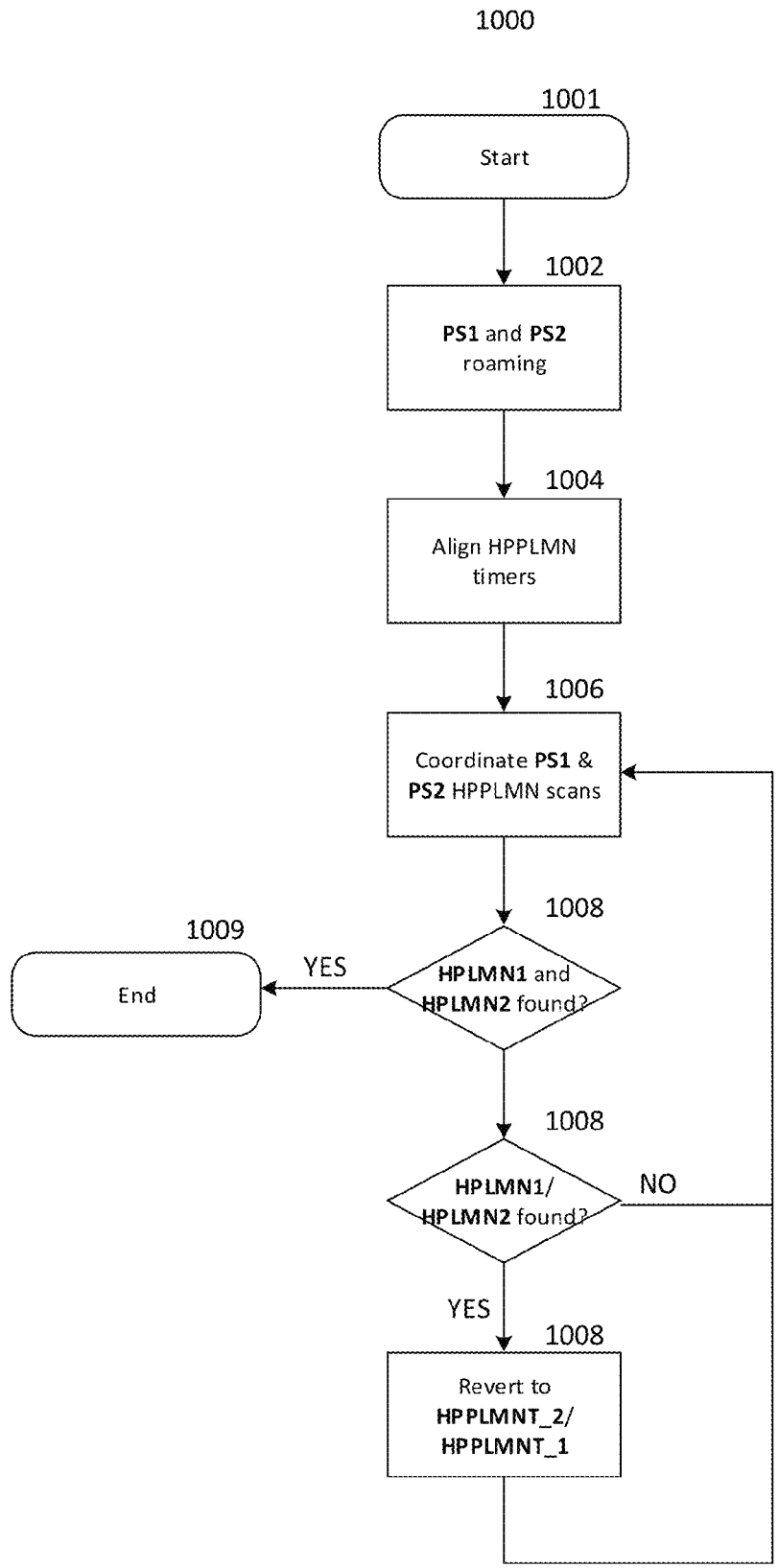
FIG. 10 shows a flow chart illustrating a coordinated multi-SIM mobile network scan procedure.

FIG. 10 shows a flow chart illustrating a multi-SIM optimized HPLMN scan procedure 1000 utilizing coordination of HPPLMN scans. The multi-SIM optimized HPLMN scan procedure 1000 may incorporate various components of baseband modem 106, including PS1, PS2, ARB, and DB. It is appreciated that reference to PS1 and PS2 may refer to any arbitrary pair of protocol stack instances, including any pair of protocol stack instances corresponding to the same radio access technology or any pair of protocol stack instances corresponding to different radio access technologies. Depending on the RAT capabilities of SIM1 and SIM2, arbitrator ARB may similarly perform the multi-SIM optimized PLMN and/or cell scan procedure 1000 on any two (or more) protocol instances. It is appreciated that reference to PS1 and PS2 may refer to an arbitrary pair of protocol stack instances out of any two or more protocol stack instances. Furthermore, it appreciated that PS1 and PS2 may be any two arbitrary protocol stack instances in e.g. a multi-SIM design with any number of SIMs and corresponding protocol stack instances, such as two SIMs, three SIMs, four SIMs, etc. corresponding to two protocol stack instances, three protocol stack instances, four protocol stack instances, etc.

Method 1000 may start in 1001. In 1002, PS1 and PS2 each in a roaming state, e.g. may be camped on VPLMN1 and VPLMN2, respectively, by virtue of broadband modem 106. Such a scenario may occur e.g. after an initial PLMN scan in which neither of PS1 or PS2 detected respective HPLMNs HPLMN1 and HPLMN2 of SIM1 and SIM2.

Accordingly, PS1 and PS2 may execute HPPLMN scans periodically occurring according to HPPLMN scan timers HPPLMNT_1 and HPPLMNT_2, in which PS1 and PS2 evaluate one or more bands (each containing a plurality of carrier channels, i.e. scan targets) in order to identify if HPLMN1 or HPLMN2 is available.

In order to coordinate the PS1 and the PS2 HPPLMN scans, ARB may adjust HPPLMNT_1 and HPPLMNT_2 in 1004 such that HPPLMNT_1 and HPPLMNT_2 have the same duration (i.e. same scan periodicity) and equal offset (i.e. occur at the same point in time). Accordingly, subsequent PS1 and PS2 HPPLMN scans may each occur at the same time. ARB may adjust HPPLMNT_1 and HPPLMNT_2 such that both HPPLMNT_1 and HPPLMNT_2 are equal to the original of HPPLMNT_1 and HPPLMNT_2 with the shortest periodicity. In other words, ARB may select the HPPLMN scan timer having the shortest duration, and set the other (or all other in the case of >2 protocol stack instances) HPPLMN scan timer to the shorter duration HPPLMN scan timer length.

For example, HPPLMNT_1 may be set to e.g. 30 minutes while HPPLMNT_2 may be set to e.g. 45 minutes. ARB may thus in 1004 select to set HPPLMNT_2 to 30 minutes, thus setting HPPLMNT_1 equal to HPPLMNT_2

Alternatively, if HPPLMNT_1 are equal HPPLMNT_2 as originally assigned (e.g. by SIM1 SIM2), the PS1 and PS2 HPPLMN scans may be slightly offset. In this case, ARB may align the PS1 and PS2 HPPLMN scans such that subsequent PS1 and PS2 HPPLMN scans occur at the same time.

ARB may thus align the PS1 and PS2 HPPLMN scans in 1004. ARB may then execute both HPPLMN scans in 1006, such as e.g. similarly to as done in procedures 400 or 800. For example, ARB may identify common scan targets between the PS1 and PS2 HPPLMN scans, which may include e.g. entire bands of carrier channels that PS1 and PS2 intend to search to perform a comprehensive search for HPLMN1 and HPLMN2, respectively.

Accordingly, if common search targets exist, ARB may coordinate the PS1 and PS2 HPPLMN scans in a serial or parallel manner in order to effectively utilize any valid shared scan results in DB (such as e.g. recently written into DB by PS1 or PS2 during a manual PLMN scan occurring between HPPLMN scans or cell scans) in addition to sharing common scan results between PS1 and PS2 (either directly or indirectly, e.g. through DB or a temporary scan result buffer). ARB may thus avoid redundant scan of common scan targets in 1004 by applying serial or parallel scan coordination.

As 3GPP has mandated that HPPLMN scans are to scan all supported bands of a mobile terminal, it is thus likely that the PS1 and PS2 HPPLMN scans will have common scan targets, which may in turn cover all carrier frequencies across one or more entire bands. The first set of scan targets may in fact be identical to the second set of scan targets, yielding a situation as in FIG. 6 in which PS2 may retrieve all scan results from DB instead of executing a fresh scan.

1006 may thus include selecting a "substitute" HPPLMN scan from the PS1 HPPLMN scan and the PS2 HPPLMN, i.e. selecting one of the PS1 or PS2 HPPLMN scan. 1006 may then execute the substitute HPPLMN scan on all scan targets of the selected HPPLMN scan, i.e. all scan targets of the PS1 or PS2 HPPLMN scan, which may be identical. 1006 may then share the obtained scan results between the PS1 and PS2 HPPLMN scans, such as by using DB, a temporary scan result buffer, or directly sharing the scan results between protocol stack instances.

If any scan targets remain for the HPPLMN scan not selected as the substitute HPPLMN scan, 1006 may then execute the non-selected HPPLMN scan on the remaining scan targets, e.g. while additionally utilizing DB to retrieve valid scan results. Such an approach may be substantially similar to the procedure detailed in FIG. 4, in which one scan is selected for suspension while the other scan is executed, i.e. serial coordination.

1006 may thus yield scan results for the PS1 and PS2 HPPLMN scans, where the scan results may include a total list of available PLMNs. If any of the available PLMNs are of higher priority than the VPLMN that PS1/PS2 is currently camped on (i.e. according to the HPPLMN list of SIM1 and SIM2), PS1/PS2 may register with and camp on the newly detected higher priority PLMN.

In an exemplary scenario, PS1 may be camped on PLMN_5 while PS1 is camped on PLMN_7. SIM1 may specify an HPPLMN list of (in order of priority from highest to lowest): PLMN_1, PLMN_2, PLMN_3, etc. SIM2 may specify an HPPLMN list of (in order of priority from highest to lowest): PLMN_1, PLMN_4, PLMN_6, etc.

ARB may then determine the corresponding bands to be searched to potentially detect PLMN_1, PLMN_2, PLMN_3, PLMN_4, and PLMN_6 to obtain a first set of scan targets (corresponding to PLMN_1, PLMN_2, and PLMN_3 for PS1) and a second set of scan targets (corresponding to PLMN_1, PLMN_4, and PLMN_6 for PS2). The first and second sets of scan targets may span across entire bands, i.e. may contain all carrier channels across one or more bands, in order to search entire bands for available PLMNs.

ARB may then identify any common scan targets (which may include entire bands e.g. all carrier channels within a given band) and appropriately coordinate (i.e. serial or parallel in the event of common scan targets) the PS1 and PS2 HPPLMN scans in order to obtain scan results corresponding to the first and second sets of scan targets (which may involve scanning using at the Access Strati layer of PS1 and PS2). PS1 and PS2 may additionally utilize DB in order to retrieve valid scan results in order to avoid redundant fresh scans.

Further to the exemplary scenario, ARB may report back available PLMNs as PLMN_2, PLMN_4, PLMN_5, PLMN_7, PLMN_9, and PLMN_11. As the SIM1 HPPLMN list includes PLMN_2 and the SIM2 HPPLMN list includes PLMN_4 (which may be determined at e.g. a Mobility Management module).

As PLMN_2 is of higher priority on the SIM1 HPPLMN list than PLMN_5, PS1 may thus register with and begin camping on PLMN_2. Similarly, as PLMN_4 is of higher priority on the SIM2 HPPLMN list than PLMN_7, PS2 may register with and begin camping on PLMN_4.

Accordingly, PS2 may have thus performed HPPLMN scan at 30 minutes in accordance with HPPLMNT_1 as opposed to the 45 minute timer of HPPLMNT_2. Furthermore, as opposed to performing redundant scans of common scan targets to search for HPPLMNs, PS1 and PS2 may perform a coordinated search, thereby reducing scan completion time through stored scan result retrieval from DB and common scan result sharing. Furthermore, power consumption may be reduced. Additionally, PS2 may begin camping on a higher priority PLMN at an earlier point in time.

Thus, since HPLMN1 and HPLMN2 were not found, ARB may proceed to 1008 to determine if one of HPLMN1 or HPLMN2 was found. As neither HPLMN1 nor HPLMN2 was detected, ARB may proceed back to 1006 to continue coordination of the PS1 and PS2 HPPLMN scans according to the shortest duration HPPLMN scan timer, e.g. HPPLMNT_1 with a scan timer of 30 minutes.

Alternatively, if both HPLMN1 and HPLMN2 were found, PS1 and PS2 may begin camping on corresponding home PLMNs HPLMN1 and HPLMN2. Further HPPLMN scans may thus not be necessary, as both PS1 and PS2 have selected the highest priority PLMN possible.

Alternatively, if one of HPLMN1 and HPLMN2 is found, ARB may determine whether to re-adjust the HPPLMN scan timer. For example, if HPLMN1 is detected, thereby allowing PS1 to camp on the highest priority PLMN possible, further HPPLMN scans may not be necessary for PS1. However, as PS2 is still roaming, i.e. is not camped on HPLMN2, PS2 may still require HPPLMN scans. Accordingly, ARB may revert back to the 45 minute scan timer of HPPLMNT_2, as the 30 minute scan timer of HPPLMN1 is no longer relevant.

Such coordinated HPPLMN scans may save considerable power compared to redundant scans of substantially the same bands (e.g. all supported bands as mandated by 3GPP) caused by offset HPPLMN scan timers. Quicker scan results may also be obtained via coordination and retrieval of scan results from a database.

Regardless if PS1 and PS2 begin roaming on VPLMNs at the same time, ARB may detect ongoing HPPLMN scans and perform coordination according to procedure 1000.

In addition to actively synchronize HPPLMN scans between PS1 and PS2, ARB (or e.g. another component of baseband modem 106) may coordinate scan scenarios between PS1 and PS2 to occur at substantially the same time, such as e.g. partially or fully overlapping bands. Such an approach may provide the advantage of more direct sharing of common scan results between PS1 and PS2.

Figure 11:
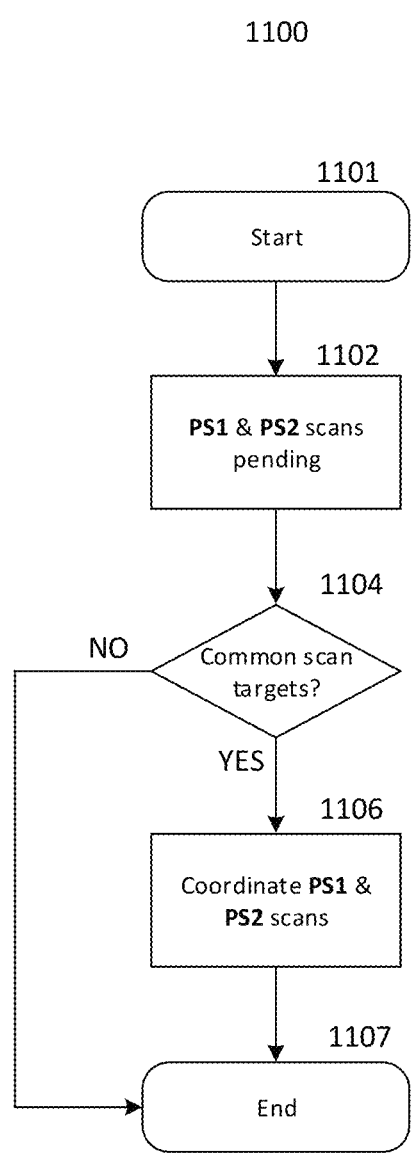
FIG. 11 shows a flow chart illustrating a coordinated multi-SIM scan procedure.

FIG. 11 shows a flow chart illustrating a multi-SIM optimized scan procedure 1100 utilizing coordination of scans. The multi-SIM optimized scan procedure 1100 may incorporate various components of baseband modem 106, including PS1, PS2, ARB, and DB. It is appreciated that reference to PS1 and PS2 may refer to any arbitrary pair of protocol stack instances. Depending on the RAT capabilities of SIM1 and SIM2, arbitrator ARB may similarly perform the multi-SIM optimized PLMN and/or cell scan procedure 1100 on any two (or more) protocol instances. It is appreciated that reference to PS1 and PS2 may refer to an arbitrary pair of protocol stack instances out of any two or more protocol stack instances. Furthermore, it appreciated that PS1 and PS2 may be any two arbitrary protocol stack instances in e.g. a multi-SIM design with any number of SIMs and corresponding protocol stack instances, such as two SIMs, three SIMs, four SIMs, etc. corresponding to two protocol stack instances, three protocol stack instances, four protocol stack instances, etc.

Further expanding on multi-SIM optimized HPPLMN scan procedure 1000, multi-SIM optimized scan procedure 1100 may be applied to essentially any type of scans by PS1 and PS2 to coordinate scans. For example, multi-SIM optimized scan procedure 1100 may be applied to manual HPPLMN scans, cell measurements during selection/reselection, measurement reporting using measurement gaps or Discontinuous Reception (DRX), etc.

Method 1100 may start in 1101. ARB may detect in 1102 that PS1 and PS2 scans are pending in 1192. For example, ARB (or e.g. another component of baseband modem 106) may indication that PS1 and PS2 both intended to perform scans. ARB may then identify if PS1 and PS2 have any common scan targets, i.e. carrier channels targeted for scan, which may span entire or partial bands of carrier channels If no common scan targets are detected in 1104, ARB may not perform any coordination between the PS1 and PS2 scans and may thus proceed to end in 1107. It is understood that although ARB may not coordinate the PS1 and PS2 scans, PS1 and/or PS2 may still access a shared result database, i.e. DB, to retrieve any valid scan results corresponding to scan targets of the PS1 and/or PS2 scans.

If ARB identifies common scan targets in 1104, ARB may proceed to coordinate the PS1 and PS2 scans in 1106. For example, ARB may coordinate the PS1 and PS2 scans in a serial manner, such as by delay one of the PS1 or PS2 scan while the other of the PS1 or PS2 scan executes, e.g. including scan on the common scan targets and e.g. including retrieving any valid scan results (potentially including scan results corresponding to common scan targets) from DB. Upon completion of the executed PS1 or PS2 scan, ARB may execute the suspended PS1 or PS2 scan on any remaining scan targets, i.e. scan targets of the suspended PS1 or PS2 scan that are not common scan targets. The previously suspended PS1 or PS2 scan may obtain the scan results corresponding to the common scan targets from e.g. DB, a temporary scan result buffer, directly from the initially executed PS1 or PS2 scan, etc. It is appreciated that the initially executed PS1 or PS2 scan may place common scan results in the temporary scan result buffer or provide them directly to the previously suspended PS1 or PS2 scan if the initially executed PS1 or PS2 scan retrieves the common scan results from DB. Such may reduce database access times of the previously suspended PS1 or PS2 scan.

Alternatively, ARB may coordinate the PS1 and PS2 scans in a parallel manner in 1106, such as by distributing each of the common scan targets to either PS1 or PS2 and executing the PS1 and PS2 scan at substantially the same time, i.e. fully or partially overlapping. The PS1 and PS2 scans may e.g. also utilize DB to retrieve valid scan results corresponding to any common or remaining scan results. The PS1 and PS2 scans may then share common scan results during or following completion of one or both of the PS1 and PS2 scans.

For example, one of the PS1 or PS2 scans may obtain a scan result corresponding to a common scan target, and may supply it directly to the other of the PS1 or PS2 scan while the PS1 or PS2 scan is still executing. Alternatively, one of the PS1 or PS2 scans may obtain a scan result corresponding to a common scan target, and may enter the corresponding scan result to DB while the PS1 or PS2 scan is still executing. Alternatively, one of the PS1 or PS2 scans may obtain a scan result corresponding to a common scan target, and may enter the corresponding scan result into a temporary scan result buffer while the one of the PS1 or PS2 scan is still executing.

Alternatively, one of the PS1 or PS2 scans may delay supply to the other of the PS1 or PS2 scans or entry into DB or a temporary scan result buffer until the one of the PS1 or PS2 scans has completed. Alternatively, one of the PS1 or PS2 scans may delay supply to the other of the PS1 or PS2 scans or entry into DB or a temporary scan result buffer until both of the PS1 or PS2 scans have completed. There thus exist many options for sharing of common scan results between PS1 and PS2, which may be similarly applied to e.g. any of the implementations described herein.

ARB may identify in 1102 that PS1 and PS2 scans are pending by e.g. receiving a request from PS1 and PS2 to perform a PLMN or cell scan. ARB may identify common scan targets in 1104 and coordinate the PS1 and PS2 scans in 1106 even if the PS1 is different from the PS2 scan, i.e. the PS1 scan is a PLMN scan and the PS2 scan is a cell scan, although the level of possible coordination and scan results sharing in such a scenario may appreciably depend on the scan targets of each scan.

In a particular example, a user may trigger a manual PLMN scan, which PS1 and PS2 may both identify and initiate scans for. As the exact implementation of PS1 and PS2 may differ, there exists no guarantee that PS1 and PS2 will perform the resulting PLMN scans at substantially the same time, i.e. as detailed regarding FIGS. 4 and 8. Accordingly, ARB may ensure the manual PLMN scans of PS1 and PS2 are properly coordinated in 1106, such as by serial or parallel coordination of scans or use of a substitute scan (i.e. selecting only one of the PS1 or PS2 scan to perform) in the event that the PS1 and PS2 scan targets are identical.

Alternatively, ARB may identify that PS1 and PS2 both intend to execute scans based on scheduling information, e.g. substantially similar as done in multi-SIM optimized HPPLMN scan procedure 1000 based on HPPLMN scan timers. Further scenarios using periodical or predictable scans may be similarly exploited to allow for scan result sharing.

For example, PS1 and PS2 may both be configured in a connected network state, and may be configured to perform cell measurements according to a periodical measurement gap configuration, such as e.g. measurements every 40 or 80 milliseconds. Alternatively, PS1 and PS2 may both be configured in an idle network state, and may be configured to perform cell measurements according to a periodical DRX configuration. It is appreciated that further scenarios involving periodic cell measurements may also be recognized. As these scans are periodic in nature, it may be possible for ARB to identify multiple future time periods in which PS1 and PS2 are to perform scans.

Accordingly, ARB may determine in 1104 if any common scan targets exist for the PS1 and PS2 scans, e.g. if cell measurements being performed by PS1 and PS2 overlap in any way. The existence of common scan targets during cell measurements may appreciably depend on the PLMN(s) that PS1 and PS2 are actively connected to or camping on.

If common scan targets exist, ARB may coordinate the periodic PS1 and PS2 scans in 1106. The PS1 and PS2 scans may have different or equivalent periods. If PS1 and PS2 have different periods, 1106 may include adjusting a timing offset between the periodic PS1 and PS2 scans, such that the next upcoming (or any single upcoming) instances of the PS1 and PS2 scans according to the differing periods may occur at substantially the same time (i.e. partially or fully overlapping in time) or at substantially close times (i.e. to allow for common scan results stored in DB be retrieved in valid state).

Alternatively, if the period of the cell measurements by PS1 and PS2 are equivalent, ARB may coordinate the periodic scans in 1106 by adjusting timing offset between the PS1 and PS2 scans such that multiple upcoming instances of the PS1 and PS2 scans occur at substantially the same time (i.e. partially or fully overlapping in time) or at substantially close times (i.e. to allow for common scan results stored in DB be retrieved in valid state). Such may ensure further future coordination and scan result sharing.

Alternatively, one of the PS1 or PS2 scans may have a period that is an integer multiple of the other of the PS1 and PS2 scans (such as e.g. a 40 millisecond measurement gap configuration for PS1 and an 80 millisecond measurement gap configuration for PS2, or e.g. a similar case in DRX cycle). ARB may similarly coordinate the periodic scans in 1106 by adjusting timing offset between the PS1 and PS2 scans such that multiple upcoming instances of the PS1 and PS2 scans occur at substantially the same time (i.e. partially or fully overlapping in time) or at substantially close times (i.e. to allow for common scan results stored in DB be retrieved in valid state). Such may ensure further future coordination and scan result sharing.

Alternative to a periodic schedule, PS1 and PS2 may simply receive significant advance notice that scans will be performed, which may accordingly be identified by ARB and subsequently utilized to coordinate PS1 and PS2 scans.

Figure 12:
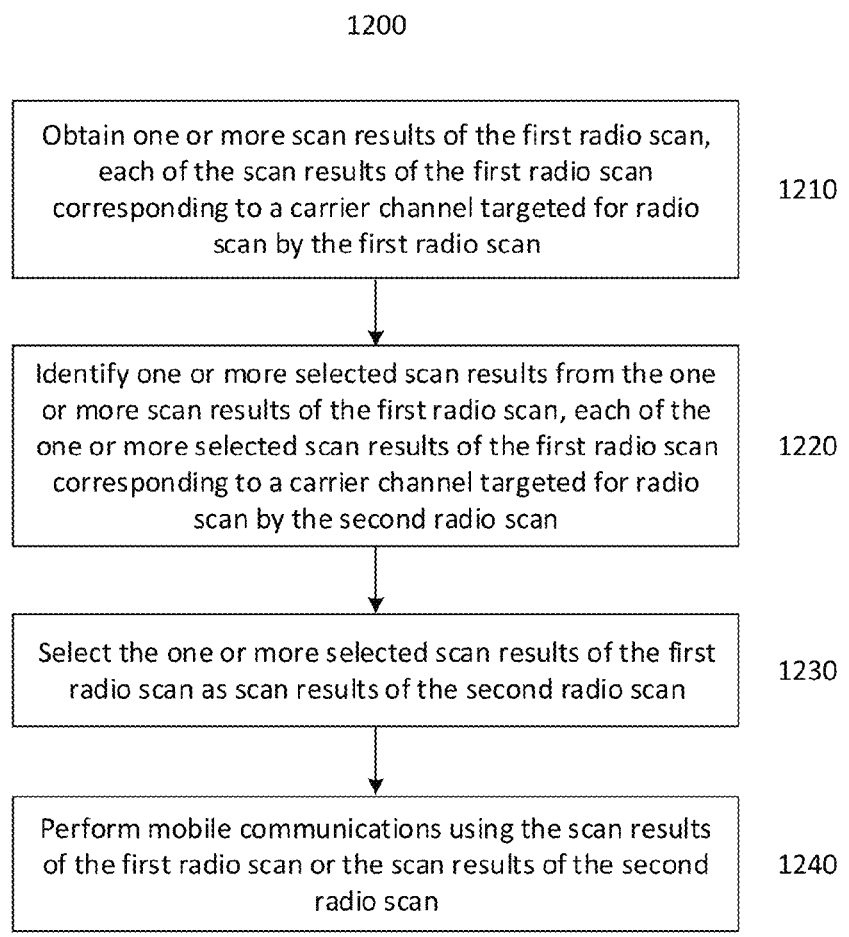
FIG. 12 shows a flow chart illustrating a method of detecting network access points on one or more carrier channels using a first radio scan and a second radio scan according to a first exemplary aspect of the disclosure.

FIG. 12 shows method 1200 of detecting network access points on one or more carrier channels using a first radio scan and a second radio scan. Method 1200 may include obtaining (1210) one or more scan results of the first radio scan, each of the scan results of the first radio scan corresponding to a carrier channel targeted for radio scan by the first radio scan, identifying (1220) one or more selected scan results from the one or more scan results of the first radio scan, each of the one or more selected scan results of the first radio scan corresponding to a carrier channel targeted for radio scan by the second radio scan, selecting (1230) the one or more selected scan results of the first radio scan as scan results of the second radio scan, and performing (1240) mobile communications using the scan results of the first radio scan or the scan results of the second radio scan.

In one or more further exemplary aspects of the disclosure, one or more of the features described above in reference to FIGS. 1-11 may be further incorporated into method 1200. In particular, method 1200 may be configured to perform further and/or alternate processes as detailed regarding baseband modem 106.

Figure 13:
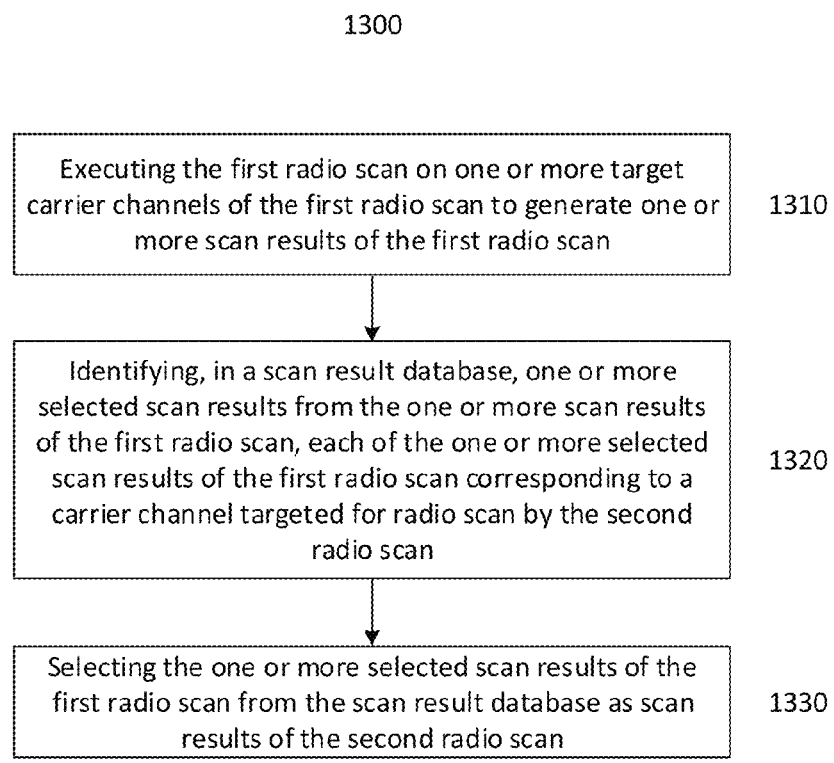
FIG. 13 shows a flow chart illustrating a method of detecting network access points on one or more carrier channels using a first radio scan and a second radio scan according to a second exemplary aspect of the disclosure.

FIG. 13 shows method 1300 of detecting network access points on one or more carrier channels using a first radio scan and a second radio scan. Method 1300 includes executing (1310) the first radio scan on one or more target carrier channels of the first radio scan to generate one or more scan results of the first radio scan, identifying (1320), in a scan result database, one or more selected scan results from the one or more scan results of the first radio scan, each of the one or more selected scan results of the first radio scan corresponding to a carrier channel targeted for radio scan by the second radio scan, and selecting (1330) the one or more selected scan results of the first radio scan from the scan result database as scan results of the second radio scan.

In one or more further exemplary aspects of the disclosure, one or more of the features described above in reference to FIGS. 1-11 may be further incorporated into method 1300. In particular, method 1300 may be configured to perform further and/or alternate processes as detailed regarding baseband modem 106.

Figure 14:
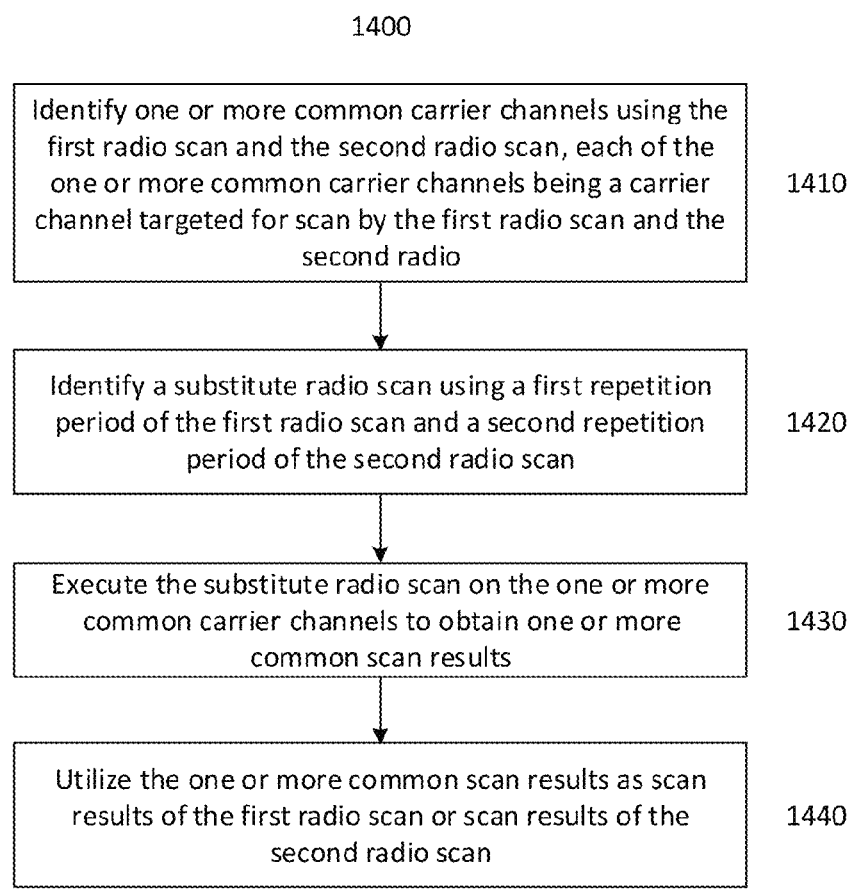
FIG. 14 shows a flow chart illustrating a method of detecting network access points on one or more carrier channels using a first radio scan and a second radio scan according to a third exemplary aspect of the disclosure.

FIG. 14 shows method 1400 of detecting network access points on one or more carrier channels using a first radio scan and a second radio scan. Method 1400 includes identifying (1410) one or more common carrier channels using the first radio scan and the second radio scan, each of the one or more common carrier channels being a carrier channel targeted for scan by the first radio scan and the second radio scan, identifying (1420) a substitute radio scan using a first repetition period of the first radio scan and a second repetition period of the second radio scan, executing (1430) the substitute radio scan on the one or more common carrier channels to obtain one or more common scan results, and utilizing (1440) the one or more common scan results as scan results of the first radio scan or scan results of the second radio scan.

In one or more further exemplary aspects of the disclosure, one or more of the features described above in reference to FIGS. 1-11 may be further incorporated into method 1400. In particular, method 1400 may be configured to perform further and/or alternate processes as detailed regarding baseband modem 106.

Accordingly, the multi-SIM PLMN/cell scan optimization procedure detailed herein may be implemented in order to reduce scan completion time and conserve power. It is understood that this disclosure is considered applicable to any number of protocol stack instances, such as any number of two or more protocol stack instances in a multi-SIM design including any number of two or more SIMs.

Although ARB has been detailed herein as a software component of baseband modem 106 (i.e. stored in baseband memory 106*b* and executed by digital processing circuit(s) 106*a*), it is appreciated that numerous other realizations may be utilized to obtain similar functionality, such as various types and/or combinations of digital processing circuitry.

It is appreciated that two separate dedicated modems may be provided in order to do both SIMs, have arbitrator and database (i.e. not confined to single modem) to support interaction between both modems.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

The following examples pertain to further aspects of the disclosure:

Example 1 is a method of detecting network access points on one or more carrier channels using a first radio scan and a second radio scan. The method includes obtaining one or more scan results of the first radio scan, each of the scan results of the first radio scan corresponding to a carrier channel targeted for radio scan by the first radio scan, identifying one or more selected scan results from the one or more scan results of the first radio scan, each of the one or more selected scan results of the first radio scan corresponding to a carrier channel targeted for radio scan by the second radio scan, selecting the one or more selected scan results of the first radio scan as scan results of the second radio scan, and performing mobile communications using the scan results of the first radio scan or the scan results of the second radio scan.

In Example 2, the subject matter of Example 1 can optionally include wherein the obtaining one or more scan results of the first radio scan includes executing the first radio scan on one or more carrier channels targeted for radio scan by the first radio scan to obtain the one or more scan results of the first radio scan.

In Example 3, the subject matter of Example 2 can optionally include storing the scan results of the first radio scan in a shared scan result database.

In Example 4, the subject matter of Example 2 or 3 can optionally include delaying execution of the second radio scan until the first radio scan has concluded, and executing the second radio scan on one or more remaining carrier channels targeted for radio scan by the second radio scan after the first radio scan has concluded.

In Example 5, the subject matter of Example 1 can optionally include wherein the obtaining one or more scan results of the first radio scan includes executing a substitute scan on one or more carrier channels corresponding to the one or more selected scan results to generate the one or more selected scan results.

In Example 6, the subject matter of Example 5 can optionally include selecting one of the first radio scan or the second radio as the substitute scan.

In Example 7, the subject matter of Example 5 can optionally include wherein the identifying one or more selected scan results from the one or more scan results of the first radio scan includes identifying all of the scan results of the radio scan as the one or more selected scan results.

In Example 8, the subject matter of Example 7 can optionally include wherein the scan results of the first radio scan are the same as the scan results of the second radio scan.

In Example 9, the subject matter of Example 5 can optionally include wherein the executing a substitute scan on one or more carrier channels corresponding to the one or more selected scan results to generate the one or more selected scan results further includes identifying a first radio scan period at which the first radio scan is configured to be periodically executed, identifying a second radio scan period at which the second radio scan is configured to be periodically executed, and executing the substitute scan using one of the first radio scan period or the second radio scan period.

In Example 10, the subject matter of Example 5 can optionally include wherein the executing a substitute scan on one or more carrier channels corresponding to the one or more selected scan results to generate the one or more selected scan results further includes identifying a first radio scan period at which the first radio scan is configured to be periodically executed, identifying a second radio scan period at which the second radio scan is configured to be periodically executed, selecting the first radio scan as the substitute scan if the first radio scan period is less than the second radio scan period or selecting the second radio scan as the substitute scan if the second radio scan period is less than the first radio scan period, and executing the substitute scan using one of the first radio scan period or the second radio scan period.

In Example 11, the subject matter of Example 10 can optionally include wherein the first radio scan and the second radio scan are High Priority Public Land Mobile Network (HPPLMN) scans, and wherein the first radio scan period is an HPPLMN scan timer of the first radio scan and the second radio scan period is an HPPLMN scan timer of the second radio scan.

In Example 12, the subject matter of Example 10 can optionally include wherein the executing the substitute scan using the first radio scan period and the second radio scan period includes identifying which of the first radio scan period or the second radio scan period is shorter in time duration as a selected scan period, and executing the substitute scan at a point in time according to the selected scan period.

In Example 13, the subject matter of Example 12 can optionally include periodically executing further substitute scans on the one or more carrier channels corresponding to the one or more selected scan results according to the selected scan period.

In Example 14, the subject matter of Example 12 can optionally include periodically executing further substitute scans according to the selected scan period until the substitute scan identifies a target mobile network on one of the one or more carrier channels corresponding to the one or more selected scan results.

In Example 15, the subject matter of Example 14 can optionally include wherein the target mobile network is a home mobile network corresponding to one of the first radio scan or the second radio scan, the method further including selecting one of the first radio scan or the second radio scan that does not correspond to the target mobile network as a remaining radio scan and selecting the first radio scan period or the second radio scan period as a remaining scan period, and periodically executing the remaining scan according to the remaining scan period.

In Example 16, the subject matter of Example 14 can optionally include wherein the first radio scan corresponds to a first protocol stack instance and the second radio scan corresponds to a second protocol stack instance, and wherein the target mobile network is a Home Public Land Mobile Network (HPLMN) of the first protocol stack or the second protocol stack.

In Example 17, the subject matter of Example 16 can optionally include wherein the first protocol stack instance corresponds to a first Subscriber Identity Module (SIM) and the second protocol stack instance corresponds to a second Subscriber Identity Module (SIM).

In Example 18, the subject matter of Example 1 can optionally include identifying a first radio scan period at which the first radio scan is configured to be periodically executed, identifying a second radio scan period at which the second radio scan is configured to be periodically executed, and coordinating the first radio scan and the second radio scan to execute concurrently based on the first radio scan period or the second radio scan period.

In Example 19, the subject matter of Example 18 can optionally include wherein the coordinating the first radio scan and the second radio scan to execute concurrently based on the first radio scan period or the second radio scan period includes identifying which of the first radio scan period or the second radio scan period is shorter in time duration as a selected scan period, and coordinating the first radio scan and second radio scan to periodically execute simultaneously at the selected scan period.

In Example 20, the subject matter of Example 19 can optionally include wherein the first radio scan and the second radio scan are High Priority Public Land Mobile Network (HPPLMN) scans, and wherein the first radio scan period is an HPPLMN scan timer of the first radio scan and the second radio scan period is an HPPLMN scan timer of the second radio scan.

In Example 21, the subject matter of Example 19 or 20 can optionally include repeatedly coordinating the first radio scan and the second radio scan to periodically execute simultaneously at the selected scan period until the first radio scan or the second radio scan identifies a target mobile network.

In Example 22, the subject matter of Example 21 can optionally include wherein the first radio scan corresponds to a first protocol stack instance and the second radio scan corresponds to a second protocol stack instance, and wherein the target mobile network is a Home Public Land Mobile Network (HPLMN) of the first protocol stack or the second protocol stack.

In Example 23, the subject matter of Example 22 can optionally include wherein the first protocol stack instance corresponds to a first Subscriber Identity Module (SIM) and the second protocol stack instance corresponds to a second Subscriber Identity Module (SIM).

In Example 24, the subject matter of any one of Examples 21 to 23 can optionally include wherein the target mobile network is a home mobile network corresponding to one of the first radio scan or the second radio scan, the method further including selecting one of the first radio scan or the second radio scan that does not correspond to the target mobile network as a remaining radio scan and selecting the first radio scan period or the second radio scan period as a remaining scan period, and periodically executing the remaining scan according to the remaining scan period.

In Example 25, the subject matter of any one of Examples 1 to 24 can optionally include wherein the first radio scan or the second radio scan is a mobile network scan, and wherein the performing mobile communications using the scan results of the first radio scan or the scan results of the second radio scan includes selecting a mobile communications network with which to establish a connection using the scan results of the first radio scan or the scan results of the second radio scan.

In Example 26, the subject matter of Example 25 can optionally include wherein the first radio scan or the second radio scan is a Public Land Mobile Network (PLMN) scan, and wherein selecting a mobile communications network with which to establish a connection using the scan results of the first radio scan or the scan results of the second radio scan includes selecting a detected PLMN to camp on using the scan results of the first radio scan or the scan results of the second radio scan.

In Example 27, the subject matter of Example 26 can optionally include wherein the scan results of the first radio scan or the scan results of the second radio scan include identification information of the detected PLMN.

In Example 28, the subject matter of Example 26 can optionally include executing the first radio scan or the second radio scan by receiving a wireless signal from a cell corresponding to the detected PLMN, processing the wireless signal to obtain identification information of the detected PLMN, and including the identification information of the detected PLMN as a scan result of the first radio scan or the second radio scan.

In Example 29, the subject matter of Example 1 can optionally include identifying one or more remaining carrier channels targeted for radio scan by the second radio scan, and executing the second radio scan on the one or more remaining carrier channels to generate one or more further scan results of the second radio scan.

In Example 30, the subject matter of Example 1 can optionally include wherein the identifying one or more selected scan results from the one or more scan results of the first radio scan includes comparing the carrier channels targeted for radio scan by the first radio scan to the carrier channel targeted for radio scan by the second radio scan to identify one or more common radio channels targeted for radio scan by both the first radio scan and the second radio scan.

In Example 31, the subject matter of Example 30 can optionally include selecting one or more scan results of the first radio scan corresponding to the one or more common radio channels as the one or more selected san results of the first radio scan.

In Example 32, the subject matter of any one of Examples 1 to 31 can optionally include wherein the first radio scan or the second radio scan is a cell scan, and wherein the performing mobile communications using the scan results of the first radio scan or the scan results of the second radio scan includes deciding whether or not to establish a connection a detected cell using the scan results of the first radio scan or the scan results of the second radio scan.

In Example 33, the subject matter of Example 32 can optionally include wherein the scan results of the first radio scan or the scan results of the second radio scan include identification information of the detected cell.

In Example 34, the subject matter of Example 32 can optionally include executing the first radio scan or the second radio scan by receiving a wireless signal from the detected cell, processing the wireless signal to obtain identification information of the detected cell, and including the identification information of the detected cell as a scan result of the first radio scan or the second radio scan.

In Example 35, the subject matter of Example 34 can optionally include processing the wireless signal to obtain a signal measurement of the detected cell, and including the signal measurement of the detected cell as a scan result of the first radio scan or the second radio scan.

In Example 36, the subject matter of Example 1 can optionally include wherein the selecting the one or more selected scan results of the first radio scan as scan results of the second radio scan includes retrieving the one or more selected scan results of the first radio scan from a scan result database, and including the one or more selected scan results of the first radio scan as scan results of the second radio scan.

In Example 37, the subject matter of any one of Examples 1 to 36 can optionally include wherein the selecting the one or more selected scan results of the first radio scan as scan results of the second radio scan includes identifying the one or more selected scan results of the first radio scan from a scan result database, determining if the one or more selected scan results of the first radio scan are still valid according to a validity time, and if the one or more selected scan results of the first radio scan are still valid, retrieving and including the one or more selected scan results of the first radio scan as scan results of the second radio scan.

In Example 38, the subject matter of Example 37 can optionally include wherein the determining if the one or more selected scan results of the first radio scan are still valid according to a validity time includes determining if the one or more selected scan results of the first radio scan are still valid based on one or more velocity measurements of a mobile device performing the first radio scan and the second radio scan.

In Example 39, the subject matter of Example 38 can optionally include determining the one or more velocity measurements based on the velocity of the mobile device.

In Example 40, the subject matter of Example 1 can optionally include executing the first radio scan and the second radio scan concurrently.

In Example 41, the subject matter of Example 40 can optionally include identifying a first set of one or more carrier channels targeted for radio scan by the first radio scan, identifying a second set of one or more carrier channels targeted for radio scan by the second radio scan, and identifying a common set of carrier channels that mutually appear in the first set of one or more carrier channels and the second set of one or more carrier channels.

In Example 42, the subject matter of Example 41 can optionally include executing the first radio scan and the second radio scan such that each of the common set of carrier channels is only scanned by one of the first radio scan or the second radio scan.

In Example 43, the subject matter of Example 42 can optionally include assigning each of the common set of carrier channels to either the first radio scan or the second radio scan.

In Example 44, the subject matter of any one of Examples 1 to 43 can optionally include identifying if any carrier channels targeted for radio scan by the first radio scan are targeted for radio scan by the second radio scan, and if none of the carrier channels targeted for radio scan by the first radio scan are targeted for radio scan by the second radio scan, executing the first radio scan and the second radio scan independently.

In Example 45, the subject matter of Example 44 can optionally include wherein the executing the first radio scan and the second radio scan independently includes executing the first radio scan and second radio scan concurrently.

In Example 46, the subject matter of Example 44 can optionally include wherein the executing the first radio scan and the second radio scan independently includes identifying a first set of one or more carrier channels targeted for radio scan by the first radio scan, identifying a second set of one or more carrier channels targeted for radio scan by the second radio scan, and executing the first radio scan on the first set of one or more carrier channels and the second radio scan on the second set of one or more carrier channels.

In Example 47, the subject matter of Example 1 can optionally include wherein the performing mobile communications using the scan results of the first radio scan or the scan results of the second radio scan includes utilizing the scan results of the first radio scan or the scan results of the second radio scan to transmit a measurement report.

In Example 48, the subject matter of Example 1 can optionally include wherein the performing mobile communications using the scan results of the first radio scan or the scan results of the second radio scan includes utilizing the scan results of the first radio scan radio or the scan results of the second radio scan to select a cell to establish a connection with.

In Example 49, the subject matter of Example 1 can optionally include wherein the performing mobile communications using the scan results of the first radio scan or the scan results of the second radio scan includes utilizing the scan results of the first radio scan or the scan results of the second radio scan to select a Public Land Mobile Network (PLMN) to establish a connection with.

In Example 50, the subject matter of Example Error! Reference source not found. can optionally include the utilizing the scan results of the first radio scan or the scan results of the second radio scan to select a Public Land Mobile Network (PLMN) to establish a connection with includes utilizing the scan results of the first radio scan or the scan results of the second radio scan to select a Public Land Mobile Network (PLMN) to establish a connection with after an Out of Coverage (OOC) scenario, a Limited Service scenario, or a mobile terminal power-on sequence.

In Example 51, the subject matter of any one of Examples 1 to 50 can optionally include wherein the first radio scan corresponds to a first protocol stack instance and the second radio scan corresponds to a second protocol stack instance.

In Example 52, the subject matter of Example 51 can optionally include wherein the first protocol stack instance and the second protocol stack instance are associated with the same radio access technology (RAT).

In Example 53, the subject matter of Example 51 can optionally include wherein the first protocol stack instance and the second protocol stack instance are associated with different radio access technologies (RAT).

In Example 54, the subject matter of Example 52 can optionally include wherein the radio access technology is a Long Term Evolution (LTE) radio access technology, a Universal Mobile Telecommunications System (UMTS) radio access technology, a Global System for Mobile Communications (GSM) radio access technology, a Code Division Multiple Access (CDMA) radio access technology, or a Time Division Synchronous Code Division Multiple Access (TD-SCDMA) multiple access technology.

Example 55 is a mobile terminal device having a radio processing circuit and a baseband processing circuit adapted to interact with the radio processing circuit. The mobile terminal device is configured to detect network access points on one or more carrier channels using a first radio scan and a second radio scan by obtaining one or more scan results of the first radio scan, each of the scan results of the first radio scan corresponding to a carrier channel targeted for radio scan by the first radio scan, identifying one or more selected scan results from the one or more scan results of the first radio scan, each of the one or more selected scan results of the first radio scan corresponding to a carrier channel targeted for radio scan by the second radio scan, and selecting the one or more selected scan results of the first radio scan as scan results of the second radio scan, and performing mobile communications using the scan results of the first radio scan or the scan results of the second radio scan.

In Example 56, the subject matter of Example 55 can optionally include a first Subscriber Identity Module (SIM) and a second Subscriber Identity Module (SIM).

In Example 57, the subject matter of Example 55 can optionally include wherein the mobile terminal device is further configured to execute a first protocol stack instance and a second protocol stack instance, the first protocol stack instance corresponding to a first Subscriber Identity Module (SIM) and the second protocol stack instance corresponding to a second Subscriber Identity Module (SIM).

In Example 58, the subject matter of Example 57 can optionally include wherein the first protocol stack instance and the second protocol stack instance are associated with the same radio access technology (RAT).

In Example 59, the subject matter of Example 57 can optionally include wherein the first protocol stack instance and the second protocol stack instance are associated with different radio access technologies (RAT).

In Example 60, the subject matter of Example 57 can optionally include wherein the radio access technology is a Long Term Evolution (LTE) radio access technology, a Universal Mobile Telecommunications System (UMTS) radio access technology, a Global System for Mobile Communications (GSM) radio access technology, a Code Division Multiple Access (CDMA) radio access technology, or a Time Division Synchronous Code Division Multiple Access (TD-SCDMA) multiple access technology.

In Example 61, the subject matter of Example 57 can optionally include wherein the mobile terminal device is configured to execute the first protocol stack instance and the second protocol stack instance at the baseband processing circuit.

In Example 62, the subject matter of Example 61 can optionally include wherein the baseband processing circuit is a baseband modem including digital processing circuitry adapted to execute the first protocol stack instance and the second protocol stack instance.

In Example 63, the subject matter of Example 57 can optionally include wherein the baseband modem further includes a memory configured to store first program code corresponding to the first protocol stack instance and second program code corresponding to the second protocol stack instance, and wherein the mobile terminal device is configured to execute the first protocol stack instance and the second protocol stack instance by executing the first program code and the second program code at the baseband processing circuit.

In Example 64, the subject matter of any one of Examples 55 to 63 can optionally include configured to obtain one or more scan results of the first radio scan by executing the first radio scan on one or more carrier channels targeted for radio scan by the first radio scan to obtain the one or more scan results of the first radio scan.

In Example 65, the subject matter of Example 64 can optionally include further configured to store the scan results of the first radio scan in a shared scan result database.

In Example 66, the subject matter of Example 64 can optionally include further configured to delay execution of the second radio scan until the first radio scan has concluded, and execute the second radio scan on one or more carrier channels targeted for radio scan by the second radio scan after the first radio scan has concluded.

In Example 67, the subject matter of Example 55 can optionally include configured to obtain one or more scan results of the first radio scan by executing a substitute scan on one or more carrier channels corresponding to the one or more selected scan results to generate the one or more selected scan results.

In Example 68, the subject matter of Example 67 can optionally include configured to select one of the first radio scan or the second radio as the substitute scan.

In Example 69, the subject matter of Example 67 can optionally include configured to identify one or more selected scan results from the one or more scan results of the first radio scan includes identifying all of the scan results of the radio scan as the one or more selected scan results.

In Example 70, the subject matter of Example 69 can optionally include wherein the scan results of the first radio scan are the same as the scan results of the second radio scan.

In Example 71, the subject matter of Example 67 can optionally include configured to execute a substitute scan on one or more carrier channels corresponding to the one or more selected scan results to generate the one or more selected scan results further by identifying a first radio scan period at which the first radio scan is configured to be periodically executed, identifying a second radio scan period at which the second radio scan is configured to be periodically executed, and executing the substitute scan using one of the first radio scan period or the second radio scan period.

In Example 72, the subject matter of Example 67 can optionally include configured to execute a substitute scan on one or more carrier channels corresponding to the one or more selected scan results to generate the one or more selected scan results further by identifying a first radio scan period at which the first radio scan is configured to be periodically executed, identifying a second radio scan period at which the second radio scan is configured to be periodically executed, selecting the first radio scan as the substitute scan if the first radio scan period is less than the second radio scan period or selecting the second radio scan as the substitute scan if the second radio scan period is less than the first radio scan period, and executing the substitute scan using one of the first radio scan period or the second radio scan period.

In Example 73, the subject matter of Example 72 can optionally include wherein the first radio scan and the second radio scan are High Priority Public Land Mobile Network (HPPLMN) scans, and wherein the first radio scan period is an HPPLMN scan timer of the first radio scan and the second radio scan period is an HPPLMN scan timer of the second radio scan.

In Example 74, the subject matter of Example 72 can optionally include configured to execute the substitute scan using the first radio scan period and the second radio scan period by identifying which of the first radio scan period or the second radio scan period is shorter in time duration as a selected scan period, and executing the substitute scan at a point in time according to the selected scan period.

In Example 75, the subject matter of Example 74 can optionally include further configure to periodically execute further substitute scans on the one or more carrier channels corresponding to the one or more selected scan results according to the selected scan period.

In Example 76, the subject matter of Example 74 can optionally include further configured to periodically execute further substitute scans according to the selected scan period until the substitute scan identifies a target mobile network on one of the one or more carrier channels corresponding to the one or more selected scan results.

In Example 77, the subject matter of Example 76 can optionally include wherein the target mobile network is a home mobile network corresponding to one of the first radio scan or the second radio scan, the mobile terminal device further configured to select one of the first radio scan or the second radio scan that does not correspond to the target mobile network as a remaining radio scan and selecting the first radio scan period or the second radio scan period as a remaining scan period, and periodically execute the remaining scan according to the remaining scan period.

In Example 78, the subject matter of Example 76 can optionally include wherein the first radio scan corresponds to a first protocol stack instance and the second radio scan corresponds to a second protocol stack instance, and wherein the target mobile network is a Home Public Land Mobile Network (HPPLMN) of the first protocol stack or the second protocol stack.

In Example 79, the subject matter of Example 78 can optionally include a first Subscriber Identity Module (SIM) and a second Subscriber Identity Module (SIM), wherein the first protocol stack instance corresponds to the first SIM and the second protocol stack instance corresponds to a second SIM.

In Example 80, the subject matter of Example 55 can optionally include further configured to identify a first radio scan period at which the first radio scan is configured to be periodically executed, identify a second radio scan period at which the second radio scan is configured to be periodically executed, and coordinate the first radio scan and the second radio scan to execute concurrently based on the first radio scan period or the second radio scan period.

In Example 81, the subject matter of Example 80 can optionally include configured to coordinate the first radio scan and the second radio scan to execute concurrently based on the first radio scan period or the second radio scan period by identifying which of the first radio scan period or the second radio scan period is shorter in time duration as a selected scan period, and coordinating the first radio scan and second radio scan to periodically execute simultaneously at the selected scan period.

In Example 82, the subject matter of Example 81 can optionally include wherein the first radio scan and the second radio scan are High Priority Public Land Mobile Network (HPPLMN) scans, and wherein the first radio scan period is an HPPLMN scan timer of the first radio scan and the second radio scan period is an HPPLMN scan timer of the second radio scan.

In Example 83, the subject matter of Example 81 or 82 can optionally include further configured to repeatedly coordinate the first radio scan and the second radio scan to periodically execute simultaneously at the selected scan period until the first radio scan or the second radio scan identifies a target mobile network.

In Example 84, the subject matter of Example 83 can optionally include further configured to execute a first protocol stack instance corresponding to the first radio scan and a second protocol stack instance corresponding to the second radio scan, and wherein the target mobile network is a Home Public Land Mobile Network (HPLMN) of the first protocol stack or the second protocol stack.

In Example 85, the subject matter of Example 84 can optionally include a first Subscriber Identity Module (SIM) and a second Subscriber Identity Module (SIM), wherein the target mobile network is an HPLMN of the first SIM or the second SIM.

In Example 86, the subject matter of any one of Examples 81 to 85 can optionally include wherein the target mobile network is a home mobile network corresponding to one of the first radio scan or the second radio scan, the mobile terminal device further configured to select one of the first radio scan or the second radio scan that does not correspond to the target mobile network as a remaining radio scan and select the first radio scan period or the second radio scan period as a remaining scan period, and periodically execute the remaining scan according to the remaining scan period.

In Example 87, the subject matter of any one of Examples 55 to 87 can optionally include wherein the first radio scan or the second radio scan is a mobile network scan, the mobile terminal device configured to perform mobile communications using the scan results of the first radio scan or the second radio scan by selecting a mobile communications network with which to establish a connection using the scan results of the first radio scan or the scan results of the second radio scan.

In Example 88, the subject matter of Example 87 can optionally include wherein the first radio scan or the second radio scan is a Public Land Mobile Network (PLMN) scan, the mobile terminal device configured to select a mobile communications network with which to establish a connection using the scan results of the first radio scan or the scan results of the second radio scan by selecting a detected PLMN to camp on using the scan results of the first radio scan or the scan results of the second radio scan.

In Example 89, the subject matter of Example 88 can optionally include wherein the scan results of the first radio scan or the scan results of the second radio scan include identification information of the detected PLMN.

In Example 90, the subject matter of Example 88 can optionally include further configured to execute the first radio scan or the second radio scan by receiving a wireless signal from a cell corresponding to the detected PLMN, processing the wireless signal to obtain identification information of the detected PLMN, and including the identification information of the detected PLMN as a scan result of the first radio scan or the second radio scan.

In Example 91, the subject matter of Example 55 can optionally include further configured to identify one or more remaining carrier channels targeted for radio scan by the second radio scan, and execute the second radio scan on the one or more remaining carrier channels to generate one or more further scan results of the second radio scan.

In Example 92, the subject matter of Example 55 can optionally include configured to identify one or more selected scan results from the one or more scan results of the first radio scan by comparing the carrier channels targeted for radio scan by the first radio scan to the carrier channel targeted for radio scan by the second radio scan to identify one or more common radio channels targeted for radio scan by both the first radio scan and the second radio scan.

In Example 93, the subject matter of Example 92 can optionally include further configured to select one or more scan results of the first radio scan corresponding to the one or more common radio channels as the one or more selected san results of the first radio scan.

In Example 94, the subject matter of any one of Examples 55 to 93 can optionally include wherein the first radio scan or the second radio scan is a cell scan, the mobile terminal device configured to perform mobile communications using the scan results of the first radio scan or the scan results of the second radio scan by deciding whether or not to establish a connection a detected cell using the scan results of the first radio scan or the scan results of the second radio scan.

In Example 95, the subject matter of Example 94 can optionally include wherein the scan results of the first radio scan or the scan results of the second radio scan include identification information of the detected cell.

In Example 96, the subject matter of Example 94 can optionally include further configured to execute the first radio scan or the second radio scan by receiving a wireless signal from the detected cell, processing the wireless signal to obtain identification information of the detected cell, and including the identification information of the detected cell as a scan result of the first radio scan or the second radio scan.

In Example 97, the subject matter of Example 96 can optionally include further configured to process the wireless signal to obtain a signal measurement of the detected cell, and including the signal measurement of the detected cell as a scan result of the first radio scan or the second radio scan.

In Example 98, the subject matter of Example 55 can optionally include configured to select the one or more selected scan results of the first radio scan as scan results of the second radio scan by retrieving the one or more selected scan results of the first radio scan from a scan result database, and including the one or more selected scan results of the first radio scan as scan results of the second radio scan.

In Example 99, the subject matter of any one of Examples 55 to 98 can optionally include configured to select the one or more selected scan results of the first radio scan as scan results of the second radio scan by identifying the one or more selected scan results of the first radio scan from a scan result database, determining if the one or more selected scan results of the first radio scan are still valid according to a validity time, and if the one or more selected scan results of the first radio scan are still valid, retrieving and including the one or more selected scan results of the first radio scan as scan results of the second radio scan.

In Example 100, the subject matter of Example 99 can optionally include configured to determine if the one or more selected scan results of the first radio scan are still valid according to a validity time by determining if the one or more selected scan results of the first radio scan are still valid based on one or more velocity measurements of a mobile device performing the first radio scan and the second radio scan.

In Example 101, the subject matter of Example 100 can optionally include further configured to determine the one or more velocity measurements based on the velocity of the mobile device.

In Example 102, the subject matter of Example 100 can optionally include a velocity detector configured to determine the one or more velocity measurements based on the velocity of the mobile device.

In Example 103, the subject matter of Example 55 can optionally include further configured to execute the first radio scan and the second radio scan concurrently.

In Example 104, the subject matter of Example 103 can optionally include further configured to identify a first set of one or more carrier channels targeted for radio scan by the first radio scan, identify a second set of one or more carrier channels targeted for radio scan by the second radio scan, and identify a common set of carrier channels that mutually appear in the first set of one or more carrier channels and the second set of one or more carrier channels.

In Example 105, the subject matter of Example 104 can optionally include further configured to execute the first radio scan and the second radio scan such that each of the common set of carrier channels is only scanned by one of the first radio scan or the second radio scan.

In Example 106, the subject matter of Example 105 can optionally include further configured to assign each of the common set of carrier channels to either the first radio scan or the second radio scan.

In Example 107, the subject matter of any one of Examples 55 to 106 can optionally include further configured to identify if any carrier channels targeted for radio scan by the first radio scan are targeted for radio scan by the second radio scan, and if none of the carrier channels targeted for radio scan by the first radio scan are targeted for radio scan by the second radio scan, execute the first radio scan and the second radio scan independently.

In Example 108, the subject matter of Example 107 can optionally include configured to execute the first radio scan and the second radio scan independently by executing the first radio scan and the second radio scan concurrently.

In Example 109, the subject matter of Example 107 can optionally include configured to execute the first radio scan and the second radio scan independently by identifying a first set of one or more carrier channels targeted for radio scan by the first radio scan, identifying a second set of one or more carrier channels targeted for radio scan by the second radio scan, and executing the first radio scan on the first set of one or more carrier channels and the second radio scan on the second set of one or more carrier channels.

In Example 110, the subject matter of Example 55 can optionally include configured to perform mobile communications using the scan results of the first radio scan or the scan results of the second radio scan by utilizing the scan results of the first radio scan or the scan results of the second radio scan to transmit a measurement report.

In Example 111, the subject matter of Example 55 can optionally include configured to perform mobile communications using the scan results of the first radio scan or the scan results of the second radio scan by utilizing the scan results of the first radio scan radio or the scan results of the second radio scan to select a cell to establish a connection with.

In Example 112, the subject matter of Example 55 can optionally include configured to perform mobile communications using the scan results of the first radio scan or the scan results of the second radio scan by utilizing the scan results of the first radio scan or the scan results of the second radio scan to select a Public Land Mobile Network (PLMN) to establish a connection with.

In Example 113, the subject matter of Example 112 can optionally include configured to utilize the scan results of the first radio scan or the scan results of the second radio scan to select a Public Land Mobile Network (PLMN) to establish a connection with by utilizing the scan results of the first radio scan or the scan results of the second radio scan to select a Public Land Mobile Network (PLMN) to establish a connection with after an Out of Coverage (OOC) scenario, a Limited Service scenario, or a mobile terminal power-on sequence.

Example 114 is a mobile baseband modem having one or more digital processing circuits and a memory. The mobile baseband modem is configured to detect network access points on one or more carrier channels using a first radio scan and a second radio scan by obtaining one or more scan results of the first radio scan, each of the scan results of the first radio scan corresponding to a carrier channel targeted for radio scan by the first radio scan, identifying one or more selected scan results from the one or more scan results of the first radio scan, each of the one or more selected scan results of the first radio scan corresponding to a carrier channel targeted for radio scan by the second radio scan, and selecting the one or more selected scan results of the first radio scan as scan results of the second radio scan, and performing mobile communications using the scan results of the first radio scan or the scan results of the second radio scan.

In Example 115, the subject matter of Example 114 can optionally include further configured to interact with a first Subscriber Identity Module (SIM) and a second Subscriber Identity Module (SIM).

In Example 116, the subject matter of Example 114 can optionally include further configured to execute a first protocol stack instance and a second protocol stack instance, the first protocol stack instance corresponding to a first Subscriber Identity Module (SIM) and the second protocol stack instance corresponding to a second Subscriber Identity Module (SIM).

In Example 117, the subject matter of Example 116 can optionally include wherein the first protocol stack instance and the second protocol stack instance are associated with the same radio access technology (RAT).

In Example 118, the subject matter of Example 116 can optionally include wherein the first protocol stack instance and the second protocol stack instance are associated with different radio access technologies (RAT).

In Example 119, the subject matter of Example 117 can optionally include wherein the radio access technology is a Long Term Evolution (LTE) radio access technology, a Universal Mobile Telecommunications System (UMTS) radio access technology, a Global System for Mobile Communications (GSM) radio access technology, a Code Division Multiple Access (CDMA) radio access technology, or a Time Division Synchronous Code Division Multiple Access (TD-SCDMA) multiple access technology.

In Example 120, the subject matter of Example 116 can optionally include further configured to execute the first protocol stack instance and the second protocol stack instance.

In Example 121, the subject matter of Example 120 can optionally include configured to execute the first protocol stack instance and the second protocol stack instance on the one or more digital processing circuits.

In Example 122, the subject matter of Example 116 can optionally include further configured to store first program code corresponding to the first protocol stack instance and second program code corresponding to the second protocol stack instance in the memory.

In Example 123, the subject matter of any one of Examples 114 to 122 can optionally include configured to obtain one or more scan results of the first radio scan by executing the first radio scan on one or more carrier channels targeted for radio scan by the first radio scan to obtain the one or more scan results of the first radio scan.

In Example 124, the subject matter of Example 123 can optionally include further configured to store the scan results of the first radio scan in a shared scan result database.

In Example 125, the subject matter of Example 123 can optionally include further configured to delay execution of the second radio scan until the first radio scan has concluded, and execute the second radio scan on one or more carrier channels targeted for radio scan by the second radio scan after the first radio scan has concluded.

In Example 126, the subject matter of Example 114 can optionally include configured to obtain one or more scan results of the first radio scan by executing a substitute scan on one or more carrier channels corresponding to the one or more selected scan results to generate the one or more selected scan results.

In Example 127, the subject matter of Example 126 can optionally include configured to select one of the first radio scan or the second radio as the substitute scan.

In Example 128, the subject matter of Example 126 can optionally include configured to identify one or more selected scan results from the one or more scan results of the first radio scan includes identifying all of the scan results of the radio scan as the one or more selected scan results.

In Example 129, the subject matter of Example 128 can optionally include wherein the scan results of the first radio scan are the same as the scan results of the second radio scan.

In Example 130, the subject matter of Example 126 can optionally include configured to execute a substitute scan on one or more carrier channels corresponding to the one or more selected scan results to generate the one or more selected scan results further by identifying a first radio scan period at which the first radio scan is configured to be periodically executed, identifying a second radio scan period at which the second radio scan is configured to be periodically executed, and executing the substitute scan using one of the first radio scan period or the second radio scan period.

In Example 131, the subject matter of Example 126 can optionally include configured to execute a substitute scan on one or more carrier channels corresponding to the one or more selected scan results to generate the one or more selected scan results further by identifying a first radio scan period at which the first radio scan is configured to be periodically executed, identifying a second radio scan period at which the second radio scan is configured to be periodically executed, selecting the first radio scan as the substitute scan if the first radio scan period is less than the second radio scan period or selecting the second radio scan as the substitute scan if the second radio scan period is less than the first radio scan period, and executing the substitute scan using one of the first radio scan period or the second radio scan period.

In Example 132, the subject matter of Example 131 can optionally include wherein the first radio scan and the second radio scan are High Priority Public Land Mobile Network (HPPLMN) scans, and wherein the first radio scan period is an HPPLMN scan timer of the first radio scan and the second radio scan period is an HPPLMN scan timer of the second radio scan.

In Example 133, the subject matter of Example 131 can optionally include configured to execute the substitute scan using the first radio scan period and the second radio scan period by identifying which of the first radio scan period or the second radio scan period is shorter in time duration as a selected scan period, and executing the substitute scan at a point in time according to the selected scan period.

In Example 134, the subject matter of Example 133 can optionally include further configure to periodically execute further substitute scans on the one or more carrier channels corresponding to the one or more selected scan results according to the selected scan period.

In Example 135, the subject matter of Example 133 can optionally include further configured to periodically execute further substitute scans according to the selected scan period until the substitute scan identifies a target mobile network on one of the one or more carrier channels corresponding to the one or more selected scan results.

In Example 136, the subject matter of Example 135 can optionally include wherein the target mobile network is a home mobile network corresponding to one of the first radio scan or the second radio scan, the mobile baseband modem further configured to select one of the first radio scan or the second radio scan that does not correspond to the target mobile network as a remaining radio scan and selecting the first radio scan period or the second radio scan period as a remaining scan period, and periodically execute the remaining scan according to the remaining scan period.

In Example 137, the subject matter of Example 135 can optionally include wherein the first radio scan corresponds to a first protocol stack instance and the second radio scan corresponds to a second protocol stack instance, and wherein the target mobile network is a Home Public Land Mobile Network (HPLMN) of the first protocol stack or the second protocol stack.

In Example 138, the subject matter of Example 137 can optionally include further adapted to interact with a first Subscriber Identity Module (SIM) and a second Subscriber Identity Module (SIM), wherein the first protocol stack instance corresponds to the first SIM and the second protocol stack instance corresponds to a second SIM.

In Example 139, the subject matter of Example 114 can optionally include further configured to identify a first radio scan period at which the first radio scan is configured to be periodically executed, identify a second radio scan period at which the second radio scan is configured to be periodically executed, and coordinate the first radio scan and the second radio scan to execute concurrently based on the first radio scan period or the second radio scan period.

In Example 140, the subject matter of Example 139 can optionally include configured to coordinate the first radio scan and the second radio scan to execute concurrently based on the first radio scan period or the second radio scan period by identifying which of the first radio scan period or the second radio scan period is shorter in time duration as a selected scan period, and coordinating the first radio scan and second radio scan to periodically execute simultaneously at the selected scan period.

In Example 141, the subject matter of Example 140 can optionally include wherein the first radio scan and the second radio scan are High Priority Public Land Mobile Network (HPPLMN) scans, and wherein the first radio scan period is an HPPLMN scan timer of the first radio scan and the second radio scan period is an HPPLMN scan timer of the second radio scan.

In Example 142, the subject matter of Example 140 or 141 can optionally include further configured to repeatedly coordinate the first radio scan and the second radio scan to periodically execute simultaneously at the selected scan period until the first radio scan or the second radio scan identifies a target mobile network.

In Example 143, the subject matter of Example 142 can optionally include further configured to execute a first protocol stack instance corresponding to the first radio scan and a second protocol stack instance corresponding to the second radio scan, and wherein the target mobile network is a Home Public Land Mobile Network (HPLMN) of the first protocol stack or the second protocol stack.

In Example 144, the subject matter of Example 143 can optionally include configured to interact with a first Subscriber Identity Module (SIM) and a second Subscriber Identity Module (SIM), wherein the target mobile network is an HPLMN of the first SIM or the second SIM.

In Example 145, the subject matter of any one of Examples 140 to 144 can optionally include wherein the target mobile network is a home mobile network corresponding to one of the first radio scan or the second radio scan, the mobile baseband modem further configured to select one of the first radio scan or the second radio scan that does not correspond to the target mobile network as a remaining radio scan and select the first radio scan period or the second radio scan period as a remaining scan period, and periodically execute the remaining scan according to the remaining scan period.

In Example 146, the subject matter of any one of Examples 114 to 145 can optionally include wherein the first radio scan or the second radio scan is a mobile network scan, the mobile baseband modem configured to perform mobile communications using the scan results of the first radio scan or the second radio scan by selecting a mobile communications network with which to establish a connection using the scan results of the first radio scan or the scan results of the second radio scan.

In Example 147, the subject matter of Example 146 can optionally include wherein the first radio scan or the second radio scan is a Public Land Mobile Network (PLMN) scan, the mobile baseband modem configured to select a mobile communications network with which to establish a connection using the scan results of the first radio scan or the scan results of the second radio scan by selecting a detected PLMN to camp on using the scan results of the first radio scan or the scan results of the second radio scan.

In Example 148, the subject matter of Example 147 can optionally include wherein the scan results of the first radio scan or the scan results of the second radio scan include identification information of the detected PLMN.

In Example 149, the subject matter of Example 147 can optionally include further configured to execute the first radio scan or the second radio scan by receiving a wireless signal from a cell corresponding to the detected PLMN, processing the wireless signal to obtain identification information of the detected PLMN, and including the identification information of the detected PLMN as a scan result of the first radio scan or the second radio scan.

In Example 150, the subject matter of Example 114 can optionally include further configured to identify one or more remaining carrier channels targeted for radio scan by the second radio scan, and execute the second radio scan on the one or more remaining carrier channels to generate one or more further scan results of the second radio scan.

In Example 151, the subject matter of Example 114 can optionally include configured to identify one or more selected scan results from the one or more scan results of the first radio scan by comparing the carrier channels targeted for radio scan by the first radio scan to the carrier channel targeted for radio scan by the second radio scan to identify one or more common radio channels targeted for radio scan by both the first radio scan and the second radio scan.

In Example 152, the subject matter of Example 151 can optionally include further configured to select one or more scan results of the first radio scan corresponding to the one or more common radio channels as the one or more selected san results of the first radio scan.

In Example 153, the subject matter of any one of Examples 114 to 152 can optionally include wherein the first radio scan or the second radio scan is a cell scan, the mobile baseband modem configured to perform mobile communications using the scan results of the first radio scan or the scan results of the second radio scan by deciding whether or not to establish a connection a detected cell using the scan results of the first radio scan or the scan results of the second radio scan.

In Example 154, the subject matter of Example 153 can optionally include wherein the scan results of the first radio scan or the scan results of the second radio scan include identification information of the detected cell.

In Example 155, the subject matter of Example 153 can optionally include further configured to execute the first radio scan or the second radio scan by receiving a wireless signal from the detected cell, processing the wireless signal to obtain identification information of the detected cell, and including the identification information of the detected cell as a scan result of the first radio scan or the second radio scan.

In Example 156, the subject matter of Example 155 can optionally include further configured to process the wireless signal to obtain a signal measurement of the detected cell, and including the signal measurement of the detected cell as a scan result of the first radio scan or the second radio scan.

In Example 157, the subject matter of Example 114 can optionally include configured to select the one or more selected scan results of the first radio scan as scan results of the second radio scan by retrieving the one or more selected scan results of the first radio scan from a scan result database, and including the one or more selected scan results of the first radio scan as scan results of the second radio scan.

In Example 158, the subject matter of any one of Examples 114 to 157 can optionally include optionally include configured to select the one or more selected scan results of the first radio scan as scan results of the second radio scan by identifying the one or more selected scan results of the first radio scan from a scan result database, determining if the one or more selected scan results of the first radio scan are still valid according to a validity time, and if the one or more selected scan results of the first radio scan are still valid, retrieving and including the one or more selected scan results of the first radio scan as scan results of the second radio scan.

In Example 159, the subject matter of Example 158 can optionally include configured to determine if the one or more selected scan results of the first radio scan are still valid according to a validity time by determining if the one or more selected scan results of the first radio scan are still valid based on one or more velocity measurements of a mobile device performing the first radio scan and the second radio scan.

In Example 160, the subject matter of Example 159 can optionally include further configured to determine the one or more velocity measurements based on the velocity of the mobile device.

In Example 161, the subject matter of Example 114 can optionally include further configured to execute the first radio scan and the second radio scan concurrently.

In Example 162, the subject matter of Example 161 can optionally include further configured to identify a first set of one or more carrier channels targeted for radio scan by the first radio scan, identify a second set of one or more carrier channels targeted for radio scan by the second radio scan, and identify a common set of carrier channels that mutually appear in the first set of one or more carrier channels and the second set of one or more carrier channels.

In Example 163, the subject matter of Example 162 can optionally include further configured to execute the first radio scan and the second radio scan such that each of the common set of carrier channels is only scanned by one of the first radio scan or the second radio scan.

In Example 164, the subject matter of Example 163 can optionally include further configured to assign each of the common set of carrier channels to either the first radio scan or the second radio scan.

In Example 165, the subject matter of any one of Examples 114 to 164 can optionally include optionally include further configured to identify if any carrier channels targeted for radio scan by the first radio scan are targeted for radio scan by the second radio scan, and if none of the carrier channels targeted for radio scan by the first radio scan are targeted for radio scan by the second radio scan, execute the first radio scan and the second radio scan independently.

In Example 166, the subject matter of Example 165 can optionally include configured to execute the first radio scan and the second radio scan independently by executing the first radio scan and the second radio scan concurrently.

In Example 167, the subject matter of Example 165 can optionally include configured to execute the first radio scan and the second radio scan independently by identifying a first set of one or more carrier channels targeted for radio scan by the first radio scan, identifying a second set of one or more carrier channels targeted for radio scan by the second radio scan, and executing the first radio scan on the first set of one or more carrier channels and the second radio scan on the second set of one or more carrier channels.

In Example 168, the subject matter of Example 114 can optionally include configured to perform mobile communications using the scan results of the first radio scan or the scan results of the second radio scan by utilizing the scan results of the first radio scan or the scan results of the second radio scan to transmit a measurement report.

In Example 169, the subject matter of Example 114 can optionally include configured to perform mobile communications using the scan results of the first radio scan or the scan results of the second radio scan by utilizing the scan results of the first radio scan radio or the scan results of the second radio scan to select a cell to establish a connection with.

In Example 170, the subject matter of Example 114 can optionally include configured to perform mobile communications using the scan results of the first radio scan or the scan results of the second radio scan by utilizing the scan results of the first radio scan or the scan results of the second radio scan to select a Public Land Mobile Network (PLMN) to establish a connection with.

In Example 171, the subject matter of Example 170 can optionally include configured to utilize the scan results of the first radio scan or the scan results of the second radio scan to select a Public Land Mobile Network (PLMN) to establish a connection with by utilizing the scan results of the first radio scan or the scan results of the second radio scan to select a Public Land Mobile Network (PLMN) to establish a connection with after an Out of Coverage (OOC) scenario, a Limited Service scenario, or a mobile terminal power-on sequence.

Example 172 is a method of detecting network access points on one or more carrier channels using a first radio scan and a second radio scan. The method includes executing the first radio scan on one or more target carrier channels of the first radio scan to generate one or more scan results of the first radio scan, identifying, in a scan result database, one or more selected scan results from the one or more scan results of the first radio scan, each of the one or more selected scan results of the first radio scan corresponding to a carrier channel targeted for radio scan by the second radio scan, and selecting the one or more selected scan results of the first radio scan from the scan result database as scan results of the second radio scan.

In Example 173, the subject matter of Example 172 can optionally include performing mobile communications using the scan results of the first radio scan or the scan results of the second radio scan.

In Example 174, the subject matter of Example 173 can optionally include wherein the performing mobile communications using the scan results of the first radio scan or the scan results of the second radio scan includes utilizing the scan results of the first radio scan or the scan results of the second radio scan to transmit a measurement report.

In Example 175, the subject matter of Example 173 can optionally include wherein the performing mobile communications using the scan results of the first radio scan or the scan results of the second radio scan includes utilizing the scan results of the first radio scan radio or the scan results of the second radio scan to select a cell to establish a connection with.

In Example 176, the subject matter of Example 173 can optionally include wherein the performing mobile communications using the scan results of the first radio scan or the scan results of the second radio scan includes utilizing the scan results of the first radio scan or the scan results of the second radio scan to select a Public Land Mobile Network (PLMN) to establish a connection with.

In Example 177, the subject matter of Example 176 can optionally include the utilizing the scan results of the first radio scan or the scan results of the second radio scan to select a Public Land Mobile Network (PLMN) to establish a connection with includes utilizing the scan results of the first radio scan or the scan results of the second radio scan to select a Public Land Mobile Network (PLMN) to establish a connection with after an Out of Coverage (OOC) scenario, a Limited Service scenario, or a mobile terminal power-on sequence.

In Example 178, the subject matter of Example 173 can optionally include wherein the first radio scan or the second radio scan is a mobile network scan, and wherein the performing mobile communications using the scan results of the first radio scan or the scan results of the second radio scan includes selecting a mobile communications network with which to establish a connection using the scan results of the first radio scan or the scan results of the second radio scan.

In Example 179, the subject matter of Example 178 can optionally include wherein the first radio scan or the second radio scan is a Public Land Mobile Network (PLMN) scan, and wherein selecting a mobile communications network with which to establish a connection using the scan results of the first radio scan or the scan results of the second radio scan includes selecting a detected PLMN to camp on using the scan results of the first radio scan or the scan results of the second radio scan.

In Example 180, the subject matter of Example 179 can optionally include wherein the scan results of the first radio scan or the scan results of the second radio scan include identification information of the detected PLMN.

In Example 181, the subject matter of Example 179 can optionally include executing the first radio scan or the second radio scan by receiving a wireless signal from a cell corresponding to the detected PLMN, processing the wireless signal to obtain identification information of the detected PLMN, and including the identification information of the detected PLMN as a scan result of the first radio scan or the second radio scan.

In Example 182, the subject matter of any one of Examples 172 to 181 can optionally include storing the scan results of the first radio scan in a shared scan result database.

In Example 183, the subject matter of Example 172 can optionally include wherein the first radio scan or the second radio scan is a cell scan, and wherein the performing mobile communications using the scan results of the first radio scan or the scan results of the second radio scan includes deciding whether or not to establish a connection a detected cell using the scan results of the first radio scan or the scan results of the second radio scan.

In Example 184, the subject matter of Example 183 can optionally include wherein the scan results of the first radio scan or the scan results of the second radio scan include identification information of the detected cell.

In Example 185, the subject matter of Example 184 can optionally include executing the first radio scan or the second radio scan by receiving a wireless signal from the detected cell, processing the wireless signal to obtain identification information of the detected cell, and including the identification information of the detected cell as a scan result of the first radio scan or the second radio scan.

In Example 186, the subject matter of Example 185 can optionally include processing the wireless signal to obtain a signal measurement of the detected cell, and including the signal measurement of the detected cell as a scan result of the first radio scan or the second radio scan.

In Example 187, the subject matter of Example 172 can optionally include delaying execution of the second radio scan until the first radio scan has concluded, and executing the second radio scan on one or more remaining carrier channels targeted for radio scan by the second radio scan after the first radio scan has concluded.

In Example 188, the subject matter of Example 172 can optionally include wherein the obtaining one or more scan results of the first radio scan includes executing a substitute scan on one or more carrier channels corresponding to the one or more selected scan results to generate the one or more selected scan results.

In Example 189, the subject matter of Example 188 can optionally include selecting one of the first radio scan or the second radio as the substitute scan.

In Example 190, the subject matter of Example 188 can optionally include wherein the identifying one or more selected scan results from the one or more scan results of the first radio scan includes identifying all of the scan results of the radio scan as the one or more selected scan results.

In Example 191, the subject matter of Example 190 can optionally include wherein the scan results of the first radio scan are the same as the scan results of the second radio scan.

In Example 192, the subject matter of Example 188 can optionally include wherein the executing a substitute scan on one or more carrier channels corresponding to the one or more selected scan results to generate the one or more selected scan results further includes identifying a first radio scan period at which the first radio scan is configured to be periodically executed, identifying a second radio scan period at which the second radio scan is configured to be periodically executed, and executing the substitute scan using one of the first radio scan period or the second radio scan period.

In Example 193, the subject matter of Example 188 can optionally include wherein the executing a substitute scan on one or more carrier channels corresponding to the one or more selected scan results to generate the one or more selected scan results further includes identifying a first radio scan period at which the first radio scan is configured to be periodically executed, identifying a second radio scan period at which the second radio scan is configured to be periodically executed, selecting the first radio scan as the substitute scan if the first radio scan period is less than the second radio scan period or selecting the second radio scan as the substitute scan if the second radio scan period is less than the first radio scan period, and executing the substitute scan using one of the first radio scan period or the second radio scan period.

In Example 194, the subject matter of Example 193 can optionally include wherein the first radio scan and the second radio scan are High Priority Public Land Mobile Network (HPPLMN) scans, and wherein the first radio scan period is an HPPLMN scan timer of the first radio scan and the second radio scan period is an HPPLMN scan timer of the second radio scan.

In Example 195, the subject matter of Example 193 can optionally include wherein the executing the substitute scan using the first radio scan period and the second radio scan period includes identifying which of the first radio scan period or the second radio scan period is shorter in time duration as a selected scan period, and executing the substitute scan at a point in time according to the selected scan period.

In Example 196, the subject matter of Example 195 can optionally include periodically executing further substitute scans on the one or more carrier channels corresponding to the one or more selected scan results according to the selected scan period.

In Example 197, the subject matter of Example 195 can optionally include periodically executing further substitute scans according to the selected scan period until the substitute scan identifies a target mobile network on one of the one or more carrier channels corresponding to the one or more selected scan results.

In Example 198, the subject matter of Example 197 can optionally include wherein the target mobile network is a home mobile network corresponding to one of the first radio scan or the second radio scan, the method further including selecting one of the first radio scan or the second radio scan that does not correspond to the target mobile network as a remaining radio scan and selecting the first radio scan period or the second radio scan period as a remaining scan period, and periodically executing the remaining scan according to the remaining scan period.

In Example 199, the subject matter of Example 197 can optionally include wherein the first radio scan corresponds to a first protocol stack instance and the second radio scan corresponds to a second protocol stack instance, and wherein the target mobile network is a Home Public Land Mobile Network (HPLMN) of the first protocol stack or the second protocol stack.

In Example 200, the subject matter of Example 199 can optionally include wherein the first protocol stack instance corresponds to a first Subscriber Identity Module (SIM) and the second protocol stack instance corresponds to a second Subscriber Identity Module (SIM).

In Example 201, the subject matter of Example 172 can optionally include identifying a first radio scan period at which the first radio scan is configured to be periodically executed, identifying a second radio scan period at which the second radio scan is configured to be periodically executed, and coordinating the first radio scan and the second radio scan to execute concurrently based on the first radio scan period or the second radio scan period.

In Example 202, the subject matter of Example 201 can optionally include wherein the coordinating the coordinating the first radio scan and the second radio scan to execute concurrently based on the first radio scan period or the second radio scan period includes identifying which of the first radio scan period or the second radio scan period is shorter in time duration as a selected scan period, and coordinating the first radio scan and second radio scan to periodically execute simultaneously at the selected scan period.

In Example 203, the subject matter of Example 202 can optionally include wherein the first radio scan and the second radio scan are High Priority Public Land Mobile Network (HPPLMN) scans, and wherein the first radio scan period is an HPPLMN scan timer of the first radio scan and the second radio scan period is an HPPLMN scan timer of the second radio scan.

In Example 204, the subject matter of Example 202 can optionally include repeatedly coordinating the first radio scan and the second radio scan to periodically execute simultaneously at the selected scan period until the first radio scan or the second radio scan identifies a target mobile network.

In Example 205, the subject matter of Example 204 can optionally include wherein the first radio scan corresponds to a first protocol stack instance and the second radio scan corresponds to a second protocol stack instance, and wherein the target mobile network is a Home Public Land Mobile Network (HPLMN) of the first protocol stack or the second protocol stack.

In Example 206, the subject matter of Example 205 can optionally include wherein the first protocol stack instance corresponds to a first Subscriber Identity Module (SIM) and the second protocol stack instance corresponds to a second Subscriber Identity Module (SIM).

In Example 207, the subject matter of Example 204 can optionally include wherein the target mobile network is a home mobile network corresponding to one of the first radio scan or the second radio scan, the method further including selecting one of the first radio scan or the second radio scan that does not correspond to the target mobile network as a remaining radio scan and selecting the first radio scan period or the second radio scan period as a remaining scan period, and periodically executing the remaining scan according to the remaining scan period.

In Example 208, the subject matter of Example 172 can optionally include identifying one or more remaining carrier channels targeted for radio scan by the second radio scan, and executing the second radio scan on the one or more remaining carrier channels to generate one or more further scan results of the second radio scan.

In Example 209, the subject matter of any one of Examples 172 to 208 can optionally include wherein the identifying one or more selected scan results from the one or more scan results of the first radio scan includes comparing the carrier channels targeted for radio scan by the first radio scan to the carrier channel targeted for radio scan by the second radio scan to identify one or more common radio channels targeted for radio scan by both the first radio scan and the second radio scan.

In Example 210, the subject matter of Example 209 can optionally include selecting one or more scan results of the first radio scan corresponding to the one or more common radio channels as the one or more selected san results of the first radio scan.

In Example 211, the subject matter of any one of Examples 172 to 210 can optionally include wherein the selecting the one or more selected scan results of the first radio scan from the scan result database as scan results of the second radio scan includes retrieving the one or more selected scan results of the first radio scan from the scan result database.

In Example 212, the subject matter of any one of Examples 172 to 211 can optionally include wherein the selecting the one or more selected scan results of the first radio scan from the scan result database as scan results of the second radio scan includes identifying the one or more selected scan results of the first radio scan from a scan result database, determining if the one or more selected scan results of the first radio scan are still valid according to a validity time, and if the one or more selected scan results of the first radio scan are still valid, selecting the one or more selected scan results of the first radio scan as scan results of the second radio scan.

In Example 213, the subject matter of Example 212 can optionally include determining the one or more velocity measurements based on the velocity of the mobile device.

In Example 214, the subject matter of Example 172 can optionally include executing the first radio scan and the second radio scan concurrently.

In Example 215, the subject matter of Example 214 can optionally include identifying a first set of one or more carrier channels targeted for radio scan by the first radio scan, identifying a second set of one or more carrier channels targeted for radio scan by the second radio scan, and identifying a common set of carrier channels that mutually appear in the first set of one or more carrier channels and the second set of one or more carrier channels.

In Example 216, the subject matter of Example 215 can optionally include executing the first radio scan and the second radio scan such that each of the common set of carrier channels is only scanned by one of the first radio scan or the second radio scan.

In Example 217, the subject matter of Example 216 can optionally include assigning each of the common set of carrier channels to either the first radio scan or the second radio scan.

In Example 218, the subject matter of Example 172 can optionally include wherein the first radio scan corresponds to a first protocol stack instance and the second radio scan corresponds to a second protocol stack instance.

In Example 219, the subject matter of Example 218 can optionally include wherein the first protocol stack instance and the second protocol stack instance are associated with the same radio access technology (RAT).

In Example 220, the subject matter of Example 218 can optionally include wherein the first protocol stack instance and the second protocol stack instance are associated with different radio access technologies (RAT).

In Example 221, the subject matter of Example 219 can optionally include wherein the radio access technology is a Long Term Evolution (LTE) radio access technology, a Universal Mobile Telecommunications System (UMTS) radio access technology, a Global System for Mobile Communications (GSM) radio access technology, a Code Division Multiple Access (CDMA) radio access technology, or a Time Division Synchronous Code Division Multiple Access (TD-SCDMA) multiple access technology.

In Example 222, the subject matter of Example 172 can optionally include identifying if any carrier channels targeted for radio scan by the first radio scan are targeted for radio scan by the second radio scan, and if none of the carrier channels targeted for radio scan by the first radio scan are targeted for radio scan by the second radio scan, executing the first radio scan and the second radio scan independently.

In Example 223, the subject matter of Example 222 can optionally include wherein the executing the first radio scan and the second radio scan independently includes executing the first radio scan and second radio scan concurrently.

In Example 224, the subject matter of Example 222 can optionally include wherein the executing the first radio scan and the second radio scan independently includes identifying a first set of one or more carrier channels targeted for radio scan by the first radio scan, identifying a second set of one or more carrier channels targeted for radio scan by the second radio scan, and executing the first radio scan on the first set of one or more carrier channels and the second radio scan on the second set of one or more carrier channels.

Example 225 is a method of detecting network access points on one or more carrier channels using a first radio scan and a second radio scan. The method includes identifying one or more common carrier channels using the first radio scan and the second radio scan, each of the one or more common carrier channels being a carrier channel targeted for scan by the first radio scan and the second radio scan, identifying a substitute radio scan using a first repetition period of the first radio scan and a second repetition period of the second radio scan, executing the substitute radio scan on the one or more common carrier channels to obtain one or more common scan results, and utilizing the one or more common scan results as scan results of the first radio scan or scan results of the second radio scan.

In Example 226, the subject matter of Example 225 can optionally include performing mobile communications using the scan results of the first radio scan or the scan results of the second radio scan.

In Example 227, the subject matter of Example 226 can optionally include wherein the performing mobile communications using the scan results of the first radio scan or the scan results of the second radio scan includes selecting a target mobile network with which to establish a connection using the scan results of the first radio scan or the scan results of the second radio scan.

In Example 228, the subject matter of Example 225 can optionally include selecting a target mobile network with which to establish a connection using the scan results of the first radio scan or the scan results of the second radio scan.

In Example 229, the subject matter of Example 228 can optionally include wherein the first radio scan corresponds to a first Subscriber Identity Module (SIM) and the second radio scan corresponds to a second Subscriber Identity Module (SIM), and wherein the target mobile network is a Home Public Land Mobile Network (HPLMN) of the first SIM or the second SIM.

In Example 230, the subject matter of any one of Examples 225 to 229 can optionally include selecting either the first radio scan or the second radio scan as the substitute radio scan based on the first repetition period the second repetition period.

In Example 231, the subject matter of Example 230 can optionally include wherein the selecting either the first radio scan or the second radio scan as the substitute radio scan based on the first repetition period the second repetition period includes if the first repetition period is less than the second repetition period, selecting the first radio scan as the substitute radio scan, and if the first repetition period is greater than the second repetition period, selecting the second radio scan as the substitute radio scan.

In Example 232, the subject matter of any one of Examples 225 to 231 can optionally include identifying one or more remaining carrier channels targeted for scan by the first radio scan, and executing the first radio scan on the one or more remaining carrier channels to complete the scan results of the first radio scan.

In Example 233, the subject matter of Example 232 can optionally include storing the scan results of the first radio scan in a scan result database.

In Example 234, the subject matter of Example 225 can optionally include wherein the executing the substitute radio scan on the one or more common carrier channels to obtain one or more common scan results includes executing the substitute radio scan according to the first repetition period and the second repetition period on the one or more common carrier channels to obtain one or more common scan results.

In Example 235, the subject matter of Example 234 can optionally include repeatedly executing the substitute radio scan according to the first repetition period or the second repetition period.

In Example 236, the subject matter of Example 234 can optionally include repeatedly executing the substitute radio scan according to the first repetition period or the second repetition period until a first mobile network or a second mobile network is detected by the substitute radio scan.

In Example 237, the subject matter of Example 236 can optionally include wherein the first radio scan corresponds to a first Subscriber Identity Module (SIM) and the second radio scan corresponds to a second Subscriber Identity Module (SIM), and wherein the first mobile network is a Home Public Land Mobile Network (HPLMN) of the first SIM and the second mobile network is a Home Public Land Mobile Network (HPLMN) of the second SIM.

In Example 238, the subject matter of Example 225 can optionally include wherein the first radio scan and the second radio scan are mobile network scans.

In Example 239, the subject matter of Example 225 can optionally include wherein the first radio scan and the second radio scan are Higher Priority Public Land Mobile Network (HPPLMN) scans, and wherein the first repetition period is a first HPPLMN scan timer of the first radio scan and the second repetition period is a second HPPLMN scan time of the second radio scan.

In Example 240, the subject matter of Example 225 can optionally include wherein the executing the substitute radio scan on the one or more common carrier channels to obtain one or more common scan results includes detecting a target cell on a first carrier channel of the common carrier channels, identifying mobile network identification information of the target cell, and including the mobile network identification information in the one or more common scan results.

In Example 241, the subject matter of Example 240 can optionally include selecting a mobile network with which to establish a connection using the mobile network identification information in the one or more common scan results.

In Example 242, the subject matter of any one of Examples 225 to 241 can optionally include retrieving one or more stored scan results from a scan result database, and utilizing the one or more stored scan as scan results of the first radio scan or scan results of the second radio scan.

In Example 243, the subject matter of Example 242 can optionally include wherein each of the one or more stored scan results correspond to a carrier channel being targeted for scan by the first radio scan or the second radio scan.

In Example 244, the subject matter of Example 225 can optionally include identifying one or more stored scan results in a scan result database corresponding to carrier channels targeted for scan by the first radio scan or the second radio scan, identifying if the one or more stored scan results are valid according to a validity time, and if the one or more stored scan results are valid, utilizing the one or more stored scan as scan results of the first radio scan or scan results of the second radio scan.

In Example 245, the subject matter of Example 244 can optionally include calculating the validity time based on the velocity of a mobile terminal.

Example 246 is a mobile terminal device having a radio processing circuit and a baseband processing circuit adapted to interact with the radio processing circuit. The mobile terminal device is configured to detect network access points on one or more carrier channels using a first radio scan and a second radio scan by identifying one or more common carrier channels using the first radio scan and the second radio scan, each of the one or more common carrier channels being a carrier channel targeted for scan by the first radio scan and the second radio scan, identifying a substitute radio scan using a first repetition period of the first radio scan and a second repetition period of the second radio scan, executing the substitute radio scan on the one or more common carrier channels to obtain one or more common scan results, and utilizing the one or more common scan results as scan results of the first radio scan or scan results of the second radio scan.

In Example 247, the subject matter of Example 246 can optionally include further configured to perform mobile communications using the scan results of the first radio scan or the scan results of the second radio scan.

In Example 248, the subject matter of Example 247 can optionally include configured to perform mobile communications using the scan results of the first radio scan or the scan results of the second radio scan by selecting a target mobile network with which to establish a connection using the scan results of the first radio scan or the scan results of the second radio scan.

In Example 249, the subject matter of Example 248 can optionally include further configured to select a target mobile network with which to establish a connection using the scan results of the first radio scan or the scan results of the second radio scan.

In Example 250, the subject matter of Example 249 can optionally include a first Subscriber Identity Module (SIM) corresponding to the first radio scan and a second Subscriber Identity Module (SIM) corresponding to the second radio scan, wherein the target mobile network is a Home Public Land Mobile Network (HPLMN) of the first SIM or the second SIM.

In Example 251, the subject matter of any one of Examples 246 to 250 can optionally include further configured to select either the first radio scan or the second radio scan as the substitute radio scan based on the first repetition period the second repetition period.

In Example 252, the subject matter of Example 251 can optionally include configured to select either the first radio scan or the second radio scan as the substitute radio scan based on the first repetition period the second repetition period by if the first repetition period is less than the second repetition period, selecting the first radio scan as the substitute radio scan, and if the first repetition period is greater than the second repetition period, selecting the second radio scan as the substitute radio scan.

In Example 253, the subject matter of any one of Examples 246 to 252 can optionally include further configured to identifying one or more remaining carrier channels targeted for scan by the first radio scan, and executing the first radio scan on the one or more remaining carrier channels to complete the scan results of the first radio scan.

In Example 254, the subject matter of Example 253 can optionally include further configured to store the scan results of the first radio scan in a scan result database.

In Example 255, the subject matter of Example 246 can optionally include configured to execute the substitute radio scan on the one or more common carrier channels to obtain one or more common scan results by executing the substitute radio scan according to the first repetition period and the second repetition period on the one or more common carrier channels to obtain one or more common scan results.

In Example 256, the subject matter of Example 255 can optionally include further configured to repeatedly execute the substitute radio scan according to the first repetition period or the second repetition period.

In Example 257, the subject matter of Example 255 can optionally include further configured to repeatedly execute the substitute radio scan according to the first repetition period or the second repetition period until a first mobile network or a second mobile network is detected by the substitute radio scan.

In Example 258, the subject matter of Example 257 can optionally include a first Subscriber Identity Module (SIM) corresponding to the first radio scan and a second Subscriber Identity Module (SIM) corresponding to the second radio scan, and wherein the first mobile network is a Home Public Land Mobile Network (HPLMN) of the first SIM and the second mobile network is a Home Public Land Mobile Network (HPLMN) of the second SIM.

In Example 259, the subject matter of Example 246 can optionally include wherein the first radio scan and the second radio scan are mobile network scans.

In Example 260, the subject matter of Example 246 can optionally include wherein the first radio scan and the second radio scan are Higher Priority Public Land Mobile Network (HPPLMN) scans, and wherein the first repetition period is a first HPPLMN scan timer of the first radio scan and the second repetition period is a second HPPLMN scan time of the second radio scan.

In Example 261, the subject matter of Example 246 can optionally include configured to execute substitute radio scan on the one or more common carrier channels to obtain one or more common scan results by detecting a target cell on a first carrier channel of the common carrier channels, identifying mobile network identification information of the target cell, and including the mobile network identification information in the one or more common scan results.

In Example 262, the subject matter of Example 261 can optionally include further configured to select a mobile network with which to establish a connection using the mobile network identification information in the one or more common scan results.

In Example 263, the subject matter of any one of Examples 246 to 262 can optionally include further configured to retrieve one or more stored scan results from a scan result database, and utilize the one or more stored scan as scan results of the first radio scan or scan results of the second radio scan.

In Example 264, the subject matter of Example 263 can optionally include wherein each of the one or more stored scan results correspond to a carrier channel being targeted for scan by the first radio scan or the second radio scan.

In Example 265, the subject matter of Example 246 can optionally include further configured to identify one or more stored scan results in a scan result database corresponding to carrier channels targeted for scan by the first radio scan or the second radio scan, identify if the one or more stored scan results are valid according to a validity time, and if the one or more stored scan results are valid, utilize the one or more stored scan as scan results of the first radio scan or scan results of the second radio scan.

In Example 266, the subject matter of Example 265 can optionally include further configured to calculate the validity time based on the velocity of a mobile terminal.

In Example 267, the subject matter of Example 1 can optionally include further comprising: selecting one or more scan results of the first radio scan or one or more scan results of the second radio scan as scan results of a third radio scan.

In Example 268, the subject matter of Example 55 can optionally include wherein the first radio scan corresponds to a first protocol stack instance, the second radio scan corresponds to a second protocol stack instance, and the third radio scan corresponds to a third protocol stack instance.

In Example 269, the subject matter of Example 1 can optionally include further comprising: applying one or more scan results of the first radio scan or one or more scan results of the second radio scan to perform one or more radio scans.

In Example 270, the subject matter of Example 57 can optionally include wherein the first radio scan corresponds to a first protocol stack instance, the second radio scan corresponds to a second protocol stack instance, and the one or more radio scans respectively correspond to one or more protocol stack instances.

In Example 271, the subject matter of Example 1 can optionally include further comprising: selecting one or more scan results of one or more radio scans as scan results of the second radio scan.

In Example 272, the subject matter of Example 59 can optionally include wherein the first radio scan corresponds to a first protocol stack instance, the second radio scan corresponds to a second protocol stack instance, and the one or more radio scans respectively correspond to one or more protocol stack instance.

In Example 273, the subject matter of Example 61 can optionally include further configured to: select one or more scan results of the first radio scan or one or more scan results of the second radio scan as scan results of a third radio scan.

In Example 274, the subject matter of Example 120 can optionally include wherein the first radio scan corresponds to a first protocol stack instance, the second radio scan corresponds to a second protocol stack instance, and the third radio scan corresponds to a third protocol stack instance.

In Example 275, the subject matter of Example 121 can optionally include further comprising a first Subscriber Identity Module (SIM) corresponding to the first protocol stack instance, a second Subscriber Identity Module (SIM) corresponding to the second protocol stack instance, and a third Subscriber Identity Module (SIM) corresponding to the third protocol stack instance.

In Example 276, the subject matter of Example 61 can optionally include further configured to: apply one or more scan results of the first radio scan or one or more scan results of the second radio scan to perform one or more radio scans.

In Example 277, the subject matter of Example 123 can optionally include wherein the first radio scan corresponds to a first protocol stack instance, the second radio scan corresponds to a second protocol stack instance, and the one or more radio scans respectively correspond to one or more protocol stack instances.

In Example 278, the subject matter of Example 124 can optionally include further comprising a first Subscriber Identity Module (SIM) corresponding to the first protocol stack instance, a second Subscriber Identity Module (SIM) corresponding to the second protocol stack instance, and one or more Subscriber Identity Modules (SIM) respectively corresponding to the one or more protocol stack instances.

In Example 279, the subject matter of Example 61 can optionally include further configured to: select one or more scan results of one or more radio scans as scan results of the second radio scan.

In Example 280, the subject matter of Example 126 can optionally include wherein the first radio scan corresponds to a first protocol stack instance, the second radio scan corresponds to a second protocol stack instance, and the one or more radio scans respectively correspond to one or more protocol stack instance.

In Example 281, the subject matter of Example 127 can optionally include further comprising a first Subscriber Identity Module (SIM) corresponding to the first protocol stack instance, a second Subscriber Identity Module (SIM) corresponding to the second protocol stack instance, and one or more Subscriber Identity Modules (SIM) respectively corresponding to the one or more protocol stack instances.

In Example 282, the subject matter of Example 129 can optionally include further configured to: select one or more scan results of the first radio scan or one or more scan results of the second radio scan as scan results of a third radio scan.

In Example 283, the subject matter of Example 187 can optionally include wherein the first radio scan corresponds to a first protocol stack instance, the second radio scan corresponds to a second protocol stack instance, and the third radio scan corresponds to a third protocol stack instance.

In Example 284, the subject matter of Example 188 can optionally include wherein the mobile baseband modem is configured to interact with a first Subscriber Identity Module (SIM) corresponding to the first protocol stack instance, a second Subscriber Identity Module (SIM) corresponding to the second protocol stack instance, and a third Subscriber Identity Module (SIM) corresponding to the third protocol stack instance.

In Example 285, the subject matter of Example 129 can optionally include further configured to: apply one or more scan results of the first radio scan or one or more scan results of the second radio scan to perform one or more radio scans.

In Example 286, the subject matter of Example 190 can optionally include wherein the first radio scan corresponds to a first protocol stack instance, the second radio scan corresponds to a second protocol stack instance, and the one or more radio scans respectively correspond to one or more protocol stack instances.

In Example 287, the subject matter of Example 191 can optionally include wherein the mobile baseband modem is adapted to interact with a first Subscriber Identity Module (SIM) corresponding to the first protocol stack instance, a second Subscriber Identity Module (SIM) corresponding to the second protocol stack instance, and one or more Subscriber Identity Modules (SIM) respectively corresponding to the one or more protocol stack instances.

In Example 288, the subject matter of Example 129 can optionally include further configured to: select one or more scan results of one or more radio scans as scan results of the second radio scan.

In Example 289, the subject matter of Example 193 can optionally include wherein the first radio scan corresponds to a first protocol stack instance, the second radio scan corresponds to a second protocol stack instance, and the one or more radio scans respectively correspond to one or more protocol stack instance.

In Example 290, the subject matter of Example 194 can optionally include wherein the mobile baseband modem is adapted to interact with a first Subscriber Identity Module (SIM) corresponding to the first protocol stack instance, a second Subscriber Identity Module (SIM) corresponding to the second protocol stack instance, and one or more Subscriber Identity Modules (SIM) respectively corresponding to the one or more protocol stack instances.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device having a radio processing circuit and a baseband processing circuit adapted to interact with the radio processing circuit, the mobile terminal device configured to detect network access points on one or more carrier channels using a first radio scan and a second radio scan by:
    obtaining one or more scan targets of the first radio scan, each of the scan targets of the first radio scan corresponding to a carrier channel targeted for radio scan by the first radio scan;
    selecting one or more scan targets from the one or more scan targets of the first radio scan, each of the one or more identified scan targets of the first radio scan corresponding to a carrier channel targeted for radio scan by the second radio scan, by:
        identifying the one or more identified scan targets of the first radio scan from a scan target database;

determining if the one or more identified scan targets of the first radio scan are still valid according to a validity time;

if the one or more identified scan targets of the first radio scan are still valid, retrieving and including the one or more identified scan targets of the first radio scan as scan targets of the second radio scan;

synchronizing the first radio scan with the second radio scan according to the one or more identified scan targets targeted by both the first radio scan and the second radio scan;

performing mobile communications using scan results of the first radio scan or the scan results of the second radio scan.

2. The mobile terminal device of claim 1, wherein the mobile terminal device is further configured to execute a first protocol stack instance and a second protocol stack instance, the first protocol stack instance corresponding to a first Subscriber Identity Module (SIM) and the second protocol stack instance corresponding to a second Subscriber Identity Module (SIM).

3. The mobile terminal device of claim 1, configured to obtain one or more scan targets of the first radio scan by:

executing the first radio scan on one or more carrier channels targeted for radio scan by the first radio scan to obtain the one or more scan targets of the first radio scan.

4. The mobile terminal device of claim 3, further configured to:

delay execution of the second radio scan until the first radio scan has concluded; and execute the second radio scan on one or more carrier channels targeted for radio scan by the second radio scan after the first radio scan has concluded.

5. The mobile terminal device of claim 1, configured to obtain one or more scan targets of the first radio scan by:

executing a substitute scan on one or more carrier channels corresponding to the one or more identified scan targets to generate the one or more identified scan targets.

6. The mobile terminal device of claim 5, configured to execute a substitute scan on one or more carrier channels corresponding to the one or more identified scan targets to generate the one or more identified scan targets further by:

identifying a first scan period at which the first radio scan is configured to be periodically executed;

identifying a second scan period at which the second radio scan is configured to be periodically executed;

selecting the first radio scan as the substitute scan if the first scan period is less than the second scan period or selecting the second radio scan as the substitute scan if the second scan period is less than the first scan period; and executing the substitute scan using one of the first scan period or the second scan period.

7. The mobile terminal device of claim 6, wherein the first radio scan and the second radio scan are High Priority Public Land Mobile Network (HPPLMN) scans, and wherein the first scan period is an HPPLMN scan timer of the first radio scan and the second scan period is an HPPLMN scan timer of the second radio scan.

8. The mobile terminal device of claim 6, configured to execute the substitute scan using the first scan period and the second scan period by:

identifying which of the first scan period or the second scan period is shorter in time duration as a selected scan period; and executing the substitute scan at a point in time according to the selected scan period.

9. The mobile terminal device of claim 8, further configured to periodically execute further substitute scans according to the selected scan period until the substitute scan identifies a target mobile network on one of the one or more carrier channels corresponding to the one or more identified scan targets.

10. The mobile terminal device of claim 1, further configured to:

identify one or more remaining carrier channels targeted for radio scan by the second radio scan; and execute the second radio scan on the one or more remaining carrier channels to generate one or more further scan targets of the second radio scan.

11. The mobile terminal device of claim 1, configured to determine if the one or more identified scan targets of the first radio scan are still valid according to a validity time by:

determining if the one or more identified scan targets of the first radio scan are still valid based on one or more velocity measurements of a mobile device performing the first radio scan and the second radio scan.

12. A mobile baseband modem having one or more digital processing circuits and a memory, the mobile baseband modem configured to detect network access points on one or more carrier channels using a first radio scan and a second radio scan by:

obtaining one or more scan targets of the first radio scan, each of the scan targets of the first radio scan corresponding to a carrier channel targeted for radio scan by the first radio scan;

selecting one or more identified scan targets from the one or more scan targets of the first radio scan, each of the one or more identified scan targets of the first radio scan corresponding to a carrier channel targeted for radio scan by the second radio scan, by:

identifying the one or more identified scan targets of the first radio scan from a scan target database;

determining if the one or more identified scan targets of the first radio scan are still valid according to a validity time;

if the one or more identified scan targets of the first radio scan are still valid, retrieving and including the one or more identified scan targets of the first radio scan as scan targets of the second radio scan; and selecting the one or more identified scan targets of the first radio scan as scan targets of the second radio scan; and performing mobile communications using scan results of the first scan or the scan results of the second scan.

13. The mobile baseband modem of claim 12, configured to obtain one or more scan targets of the first radio scan by:

executing the first radio scan on one or more carrier channels targeted for radio scan by the first radio scan to obtain the one or more scan targets of the first radio scan.

14. The mobile baseband modem of claim 13, further configured to:

delay execution of the second radio scan until the first radio scan has concluded; and execute the second radio scan on one or more carrier channels targeted for radio scan by the second radio scan after the first radio scan has concluded.

15. The mobile baseband modem of claim 12, further configured to execute the first radio scan and the second radio scan concurrently.

16. The mobile baseband modem of claim 12, further configured to:

identify if any carrier channels targeted for radio scan by the first radio scan are targeted for radio scan by the second radio scan; and if none of the carrier channels targeted for radio scan by the first radio scan are targeted for radio scan by the second radio scan, execute the first radio scan and the second radio scan independently.

\* \* \* \* \*